United States Patent
Ikeya

(10) Patent No.: US 10,641,217 B2
(45) Date of Patent: May 5, 2020

(54) DEFORMATION INHIBITING DEVICE FOR FUEL TANK, AND FUEL TANK DEVICE INCORPORATING THE DEFORMATION INHIBITING DEVICE

(71) Applicant: AISAN KOGYO KABUSHIKI KAISHA, Obu-shi, Aichi-ken (JP)

(72) Inventor: Masaki Ikeya, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 33 days.

(21) Appl. No.: 15/981,741

(22) Filed: May 16, 2018

(65) Prior Publication Data
US 2018/0335002 A1    Nov. 22, 2018

(30) Foreign Application Priority Data
May 17, 2017  (JP) .................................. 2017-098312

(51) Int. Cl.
*B60K 15/03* (2006.01)
*F02M 37/00* (2006.01)

(52) U.S. Cl.
CPC ......... *F02M 37/0011* (2013.01); *B60K 15/03* (2013.01); *B60K 2015/03217* (2013.01); *B60K 2015/03243* (2013.01); *B60K 2015/03328* (2013.01)

(58) Field of Classification Search
CPC .......... B60K 15/03; B60K 2015/03328; B60K 2015/03243; B60K 2015/03217; B60K 2015/03453; B60K 2015/03256; B60K 2015/03289; B60K 15/05; F02M 37/0011
USPC ........................................ 220/653, 651, 562
See application file for complete search history.

(56) References Cited

U.S. PATENT DOCUMENTS 4,858,778 A * 8/1989 Patrick .................. B64D 37/04
                                                          220/562
2016/0263990 A1    9/2016 Gebert et al.

FOREIGN PATENT DOCUMENTS

JP    2011005950 A    1/2011
JP    2016536193 A    11/2016

* cited by examiner

*Primary Examiner* — Stephen J Castellano
(74) *Attorney, Agent, or Firm* — Conley Rose, P.C.

(57) ABSTRACT

A deformation inhibiting device for inhibiting deformation of a fuel tank includes a strut member. The strut member includes a bottom support portion and a top support portion configured to support a bottom wall portion and a top wall portion, respectively, of the fuel tank when the strut member is disposed within the fuel tank. The strut member is deformable or movable between an arrangement state for arrangement within the fuel tank and an insertion enabled state configured to be inserted into the fuel tank via the opening.

17 Claims, 36 Drawing Sheets

DEFORMATION INHIBITING DEVICE FOR FUEL TANK, AND FUEL TANK DEVICE INCORPORATING THE DEFORMATION INHIBITING DEVICE

CROSS-REFERENCE TO RELATED APPLICATIONS

The present application claims priority to Japanese Patent Application No. 2017-098312 filed May 17, 2017, which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates to a deformation inhibiting device for inhibiting deformation of a fuel tank and also relates to a fuel tank device incorporating the deformation inhibiting device.

JP-A-2016-536193 (also published as US2016/0263990) discloses a known deformation inhibiting device for inhibiting deformation of a fuel tank. The deformation of the fuel tank may be caused, for example, due to a change in temperature, a change in atmospheric pressure, or a change in the internal pressure of the fuel tank caused by a change in the fuel level within the fuel tank. In JP-A-2016-536193, the fuel tank includes a top wall portion and a bottom wall portion. An opening is formed in the top wall portion. A strut member serving as a standoff member is arranged between the top wall portion and the bottom wall portion so as to be coaxially aligned with the opening. The strut member has a cylindrical tubular shape with an inner diameter larger than the diameter of the opening. The fuel tank is formed by molding upper and lower halves (preforms) and joining them together. The strut member is fixedly positioned between the upper and lower halves during the molding process of the upper and lower halves.

In the case of JP-A-2016-536193, it is necessary that the strut member is interposed between the upper half and the lower half of the fuel tank. Therefore, the manufacturing process of the fuel tank is relatively complicated and expensive equipment is necessary for manufacturing the fuel tank, resulting in an increase in the manufacturing cost.

SUMMARY

In one aspect according to the present disclosure, a deformation inhibiting device may inhibit deformation of a fuel tank. The fuel tank may include a top wall portion, a bottom wall portion and an opening formed in the top wall portion. The deformation inhibiting device may include a strut member. The strut member may include a bottom support portion and a top support portion configured to respectively support the bottom wall portion and the top wall portion of the fuel tank when the strut member is arranged within the fuel tank. The strut member may be deformable or movable between an arrangement state for arrangement within the fuel tank and an insertion enabled state capable of being inserted into the fuel tank via the opening.

Therefore, the strut member having deformed or changed into the insertion enabled state may be inserted into the fuel tank via the opening and may be deformed or changed into the arrangement state after insertion into the fuel tank. In the arrangement state, the strut member may be interposed between the top wall portion and the bottom wall portion of the fuel tank. Therefore, the strut member may serve as a standoff member between the top wall portion and the bottom wall portion. Hence, it is possible to inhibit deformation, in particular contraction deformation, of the fuel tank caused by a change in the internal pressure of the fuel tank. Further, the deformation inhibiting device may be arranged within the fuel tank without need of separating the fuel tank into upper and lower portions. Therefore, it may be possible to reduce the manufacturing cost of the fuel tank.

In one embodiment, the strut member may be a plurality of strut members, the deformation inhibiting device may further include a joint member configured to join the plurality of strut members to each other.

With this embodiment, the plurality of strut members may be inserted into the fuel tank at one time together with the joint member. Therefore, in comparison with the case where the plurality of strut members are inserted into the fuel tank separately from each other, it may be possible to reduce the number of necessary assembling steps.

In another embodiment, the top support portion may be formed with an engaging portion that is configured to contact an inner peripheral surface of the opening of the fuel tank.

With this embodiment, it is possible to inhibit movement of the top support portion in an outward direction with respect to the opening through contact with the inner peripheral surface of the opening.

In a further embodiment, the top support portion may include a projection projecting outward in a horizontal direction. A guide portion may be formed between the projection and a part of an outer peripheral surface of the strut member on a lower side of the projection, so that the guide portion connects the projection to the part of the outer peripheral surface.

With this embodiment, the guide portion may contact with or slide on the inner peripheral surface of the opening of the fuel tank when the strut member is inserted into the opening. Therefore, it may be possible to inhibit potential damage to the guide portion and the inner peripheral surface of the opening caused by abutment or engagement between them. Further, the guide portion may reinforce the strength of the projection.

In a further embodiment, the strut member is configured such that an in-tank component for arrangement within the fuel tank is capable of being disposed at the strut member.

Therefore, the in-tank component can be inserted into the opening together with the strut member. As a result, it is possible to improve the operability of the assembling operation for assembling the in-tank component into the fuel tank.

In another aspect according to the present disclosure, a fuel tank device may include a fuel tank, an attaching member and a deformation inhibiting device. The fuel tank may include a top wall portion, a bottom wall portion and an opening formed in the top wall portion. The attaching member may be attached to an opening edge portion of the opening of the fuel tank. The deformation inhibiting device may inhibit deformation of the fuel tank and may include a strut member. The strut member may include a bottom support portion and a top support portion configured to respectively support the bottom wall portion and the top wall portion of the fuel tank when the strut member is arranged within the fuel tank. The strut member may be deformable or movable between an arrangement state for arrangement within the fuel tank and an insertion enabled state capable of being inserted into the fuel tank via the opening. The attachment member may include a restricting portion configured to restrict movement of the top support portion of the strut member in a direction inward with respect to the opening.

With this arrangement, the movement of the top support portion of the strut member in the direction inward with respect to the opening can be restricted by the restricting portion of the attachment member.

In one embodiment, the fuel tank device may further include a fixing device and a connection device. The fixing device may fixedly join the deformation inhibiting device to the bottom wall portion of the fuel tank. The connection device may connect the deformation inhibiting device and the attachment member relative to each other so as to be movable in a vertical direction within a predetermined range.

With this embodiment, it is possible to inhibit expansion deformation of the fuel tank caused by the change in the internal pressure.

In a further embodiment, the fuel tank device may further include a cup member configured to temporarily store a part of the fuel within the fuel tank, and the cup member may be further configured to restrict movement of the strut member inwardly with respect to the opening.

With this embodiment, the movement of the strut member inwardly with respect to the opening can be restricted by the cup member.

In a still further embodiment, the strut member may be a plurality of strut members, and the fuel tank device may further include a fuel pump unit configured to feed fuel from within the fuel tank to an outside of the fuel tank. The fuel pump unit may be disposed within a space surrounded by the plurality of strut members.

With this embodiment, the fuel pump unit may be compactly arranged by using the space surrounded by the plurality of strut members.

DETAILED DESCRIPTION

Each of the additional features and teachings disclosed above and below may be utilized separately or in conjunction with other features and teachings to provide improved deformation inhibiting devices for inhibiting deformation of fuel tanks and fuel tank devices incorporating the deformation inhibiting devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

Embodiments will now be described with reference to the drawings.

Figure 1:
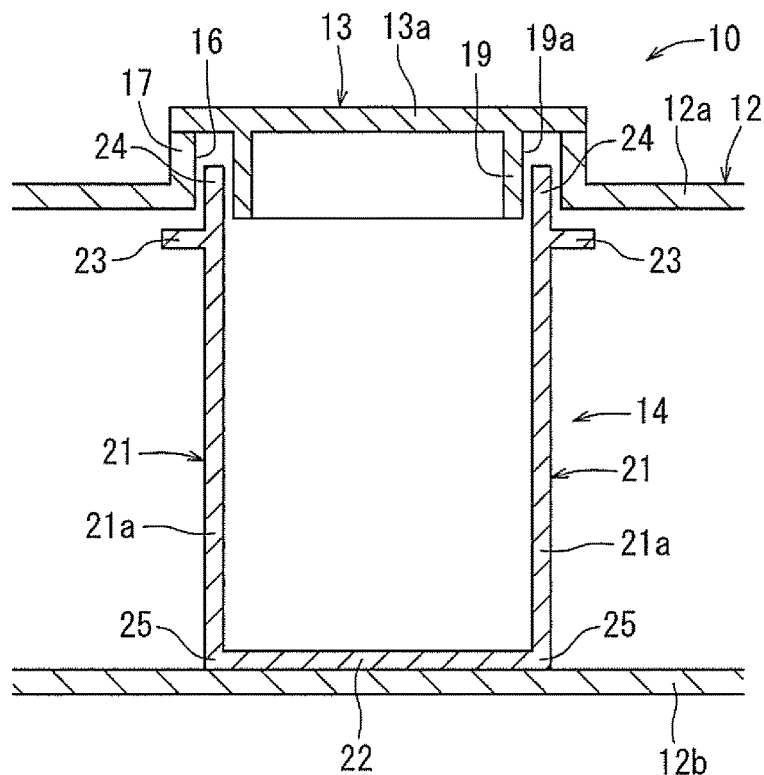
FIG. 1 is a cross-sectional side view schematically illustrating a fuel tank device according to a first embodiment.

Referring now to FIG. 1, a fuel tank device 10 according to a first embodiment may generally include a fuel tank 12, a cover member 13 and a deformation inhibiting device 14 disposed within the fuel tank 12. The fuel tank 12 may be installed on a vehicle, such as an automobile (not shown), for feeding fuel to an internal combustion engine (not shown) of the vehicle.

The fuel tank 12 may be made of resin and may be formed to have a shape of a hollow container including a top wall portion 12a and a bottom wall portion 12b. The fuel tank 12 may be a one-piece member and may be molded, for example, by a blow-molding process. A circular opening 16 may be formed in a substantially central portion of the top wall portion 12a. An opening edge portion 17 is formed on the top wall portion 12a and surrounds the opening 16. The opening edge portion 17 may have a cylindrical tubular shape and may protrude upward from the top wall portion 12a. A liquid fuel, such as gasoline, may be stored in the fuel tank 12. The fuel tank 12 may be deformed, for example, due to a change in an internal pressure within the fuel tank 12, to cause a change in the distance between the top wall portion 12a and the bottom wall portion 12b. For purposes of clarity and further explanation, in the following description, the deformation causing a decrease in the distance between the top wall portion 12a and the bottom wall portion 12b will be referred to as a contraction deformation, and the deformation causing an increase in the distance between the top wall portion 12a and the bottom wall portion 12b will be referred to as an expansion deformation.

The cover member 13 may include a cover plate portion 13a as a primary portion. The cover plate portion 13a may have a circular plate-shape. A fitting tube portion 19 having a cylindrical tubular shape may be formed on the lower surface of the cover plate portion 13a so as to be coaxial therewith. An outer peripheral surface 19a of the fitting tube portion 19 may have a cylindrical shape. The cover member 13 may be made of resin and may be formed as a one-piece member by a resin-molding process. The cover member 13 may be attached to the opening edge portion 17 for closing the opening 16. More specifically, the cover member 13 may be arranged such that the outer peripheral portion of the cover plate portion 13a is placed on (contacts) the opening edge portion 17 of the top wall portion 12a. The fitting tube portion 19 may be fitted into the opening edge portion 17 while a predetermined gap may be formed between the fitting tube portion 19 and the opening edge portion 17. The cover member 13 may be fixed in position relative to the fuel tank 12 by using a suitable fixation device (not shown). Although not shown in the drawings, a suitable seal member, such as an O-ring, may be interposed between the cover member 13 and the opening edge portion 17.

Figure 3:
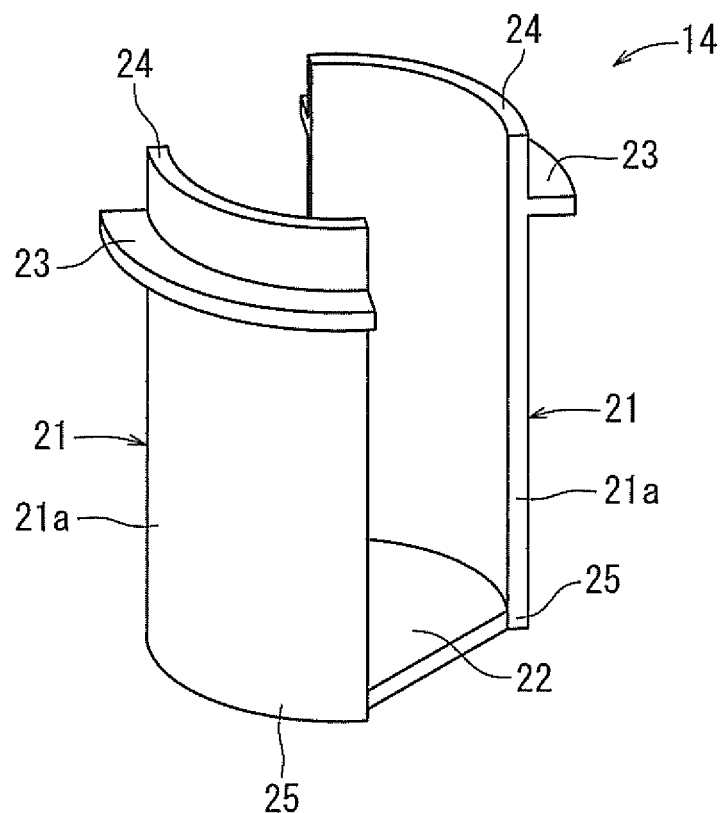
FIG. 3 is a perspective view of a deformation inhibiting device for the fuel tank shown in FIG. 1.
Figure 4:
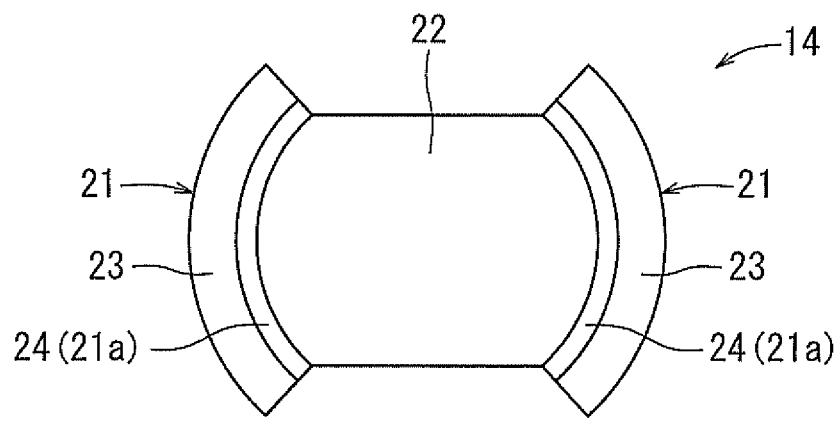
FIG. 4 is a plan view of the deformation inhibiting device of FIG. 3.

The deformation inhibiting device 14 may be arranged within the fuel tank 12 through insertion into the opening 16 before the cover member 13 is attached to the fuel tank 12. As shown in FIG. 3, the deformation inhibiting device 14 may include a pair of left and right strut portions 21 and a joint plate 22. As shown in FIG. 4, the joint plate 22 may have a substantially oblong shape with opposite left and right curved edges that are curved along circular arcs about the center of the joint plate 22 as viewed in a plan view. The bottom support portions 25 of the strut portions 21 may be joined to the left and right curved edges of the joint plate 22.

Each of the strut portions 21 may include, as a primary portion, a column portion 21a having a shape of a curved plate curved along an arc about a center that may coincide with the center of the circular arcs of the curved edges of the joint plate 22. The column portion 21a may include a top support portion 23 and a bottom support portion 25. The bottom support portion 25 is located at the lower end of the column portion 21a. The bottom support portions 25 of the column portions 21a may be joined to the left and right curved edges of the joint plate 22, so that the column portions 21a extend vertically upward from the left and right curved edges of the joint plate 22. The top support portion 23 may be formed on the radially outer surface of the column portion 21a at a position proximal to the upper end of the column portion 21a. The top support portion 23 may have a shape elongated along an arc and may protrude radially outward from the column portion 21a. An engaging portion 24 may be formed by a part of the column portion 21a positioned upward of the top support portion 23. The column portions 21a of the strut portions 21 may be arranged to be symmetrical with each other in the left-to-right direction. The deformation inhibiting device 14 may be made of resin and may be formed as a one-piece member by a resin-molding process.

Figure 5:
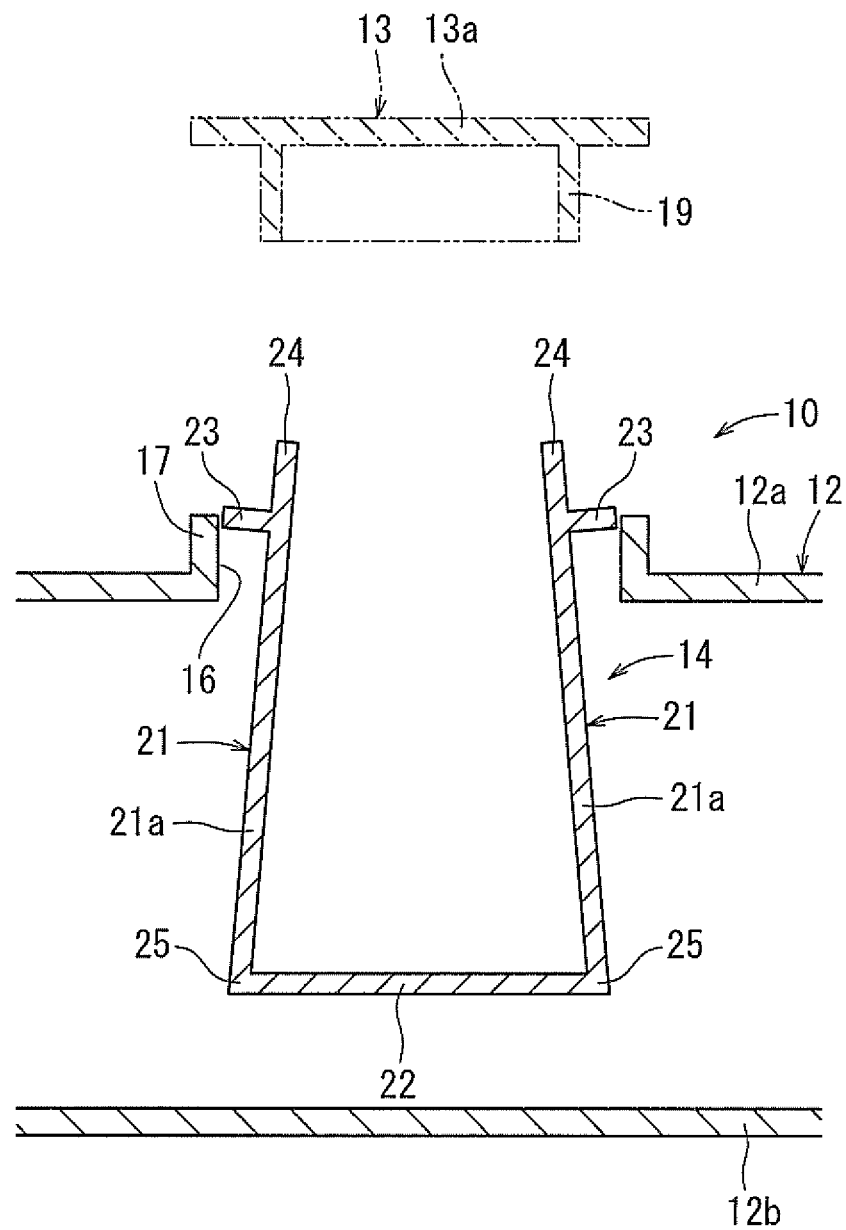
FIG. 5 is a cross-sectional side view schematically illustrating a state in the middle of an insertion process of the deformation inhibiting device of FIG. 3 into the fuel tank.

The column portions 21a of the strut portions 21 may be capable of elastically deforming (flexing) in directions radially inward in the horizontal direction (i.e., opposite directions toward each other) as shown in FIG. 5. In this embodiment, the joint plate 22 is sized to be capable of inserting into the fuel tank 12 via the opening 16. Further, the strut portions 21, except for their upper end portions having the top support portions 23, are sized to be capable of inserting into the fuel tank 12 via the opening 16. When no radial load is applied to the strut portions 21 (see FIGS. 1 and 2), the distance between the outer ends of the top support portions 23 is larger than the diameter of the opening 16. Therefore, the upper end portions having the top support portions 23 of the strut portions 21 may not pass through the opening 16. However, by causing the column portions 21a to elastically deform toward each other, the distance between the outer ends of the top support portions 23 may be reduced to be smaller than the diameter of the opening 16, so that the upper end portions having the top support portions 23 of the strut portions 21 can pass through the opening 16.

The operation for assembling the deformation inhibiting device 14 into the fuel tank 12 that is in a normal state without being deformed to contract or expand will now be described. The user may move or flex the column portions 21a of the strut portions 21 toward each other to cause their elastic deformation until the distance between the outer ends of the top support portions 23 becomes smaller than the diameter of the opening 16. To this end, for example, the user may pinch the upper ends (i.e., the engaging portions 24) of the column portions 21a with fingers of the user or by using a suitable pinching tool. With the deformation inhibiting device 14 held in this state, the user may insert the deformation inhibiting device 14 into the fuel tank 12 through the opening 16 from the upper side, so that the deformation inhibiting device 14 can pass through the opening 16 as shown in FIG. 5. The user may lower the deformation inhibiting device 14 until the joint plate 22 and the bottom support portions 25 of the column portions 21a of the strut portions 21 contact the bottom wall portion 12b of the fuel tank 12. After that, the user may release the pinching force applied to the upper ends of the column portion 21a, so that column portions 21a may elastically return to their original shapes. Therefore, the deformation inhibiting device 14 may be arranged as shown in FIG. 1, where the column portions 21a are positioned to be substantially coaxial with the opening 16.

In this way, the deformation inhibiting device 14 may be assembled within the fuel tank 12 such that the pair of strut portions 21 are interposed between the top wall portion 12a and the bottom wall portion 12b of the fuel tank 12. More specifically, as shown in FIG. 1, top support portions 23 of the strut portions 21 may face the lower surface of the top wall portion 12a (more specifically, the opening edge portion 17) to be proximal thereto or spaced therefrom by a small distance in the vertical direction. The engaging portions 24 of the strut portions 21 may slidably contact or may be positioned proximal to the inner circumferential edge of the opening 16 (more specifically, the inner peripheral surface of the opening edge portion 17) in the radial direction. In this way, the strut portions 21 may be arranged or interposed between the top wall portion 12a and the bottom wall portion 12b of the fuel tank 12 so as to serve as standoff members. The bottom support portion 25 of the strut portions 21 as well as the joint plate 22 may be normally held in contact with the bottom wall portion 12b of the fuel tank 12 by the weight of the tank deformation inhibiting device 14.

After assembling the tank deformation inhibiting device 14 into the fuel tank 12, the cover member 13 may be attached to the fuel tank 12 for closing the opening 16 of the fuel tank 12 as shown in FIG. 1. In the closed state shown in FIG. 1, the fitting tube portion 19 may slidably contact or may be positioned proximal to the radially inner surfaces of the engaging portions 24 of the strut portions 21 in the radial direction. In other words, the engaging portions 24 may be positioned between the opening edge portion 17 and the fitting tube portion 19.

Figure 2:
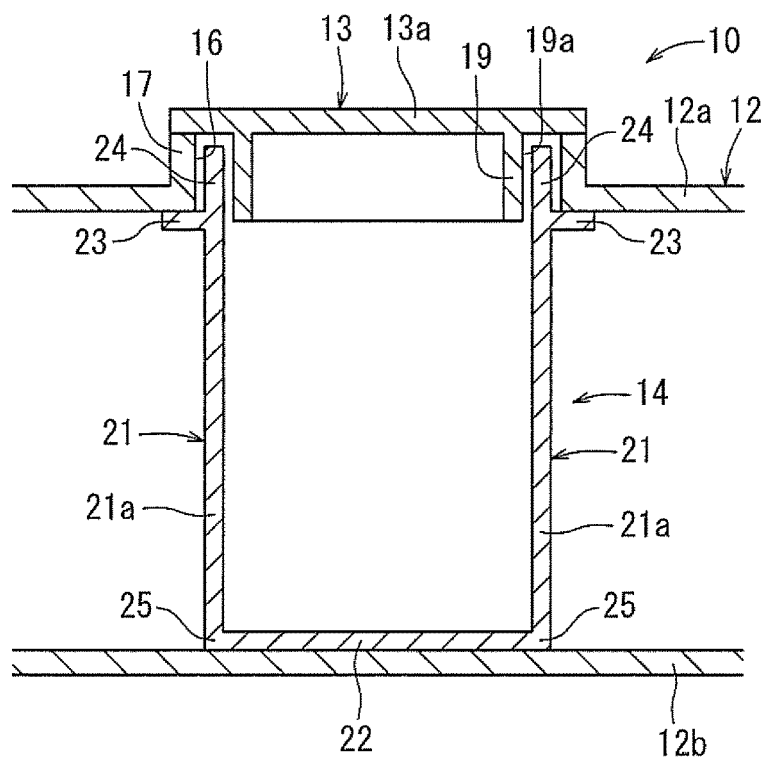
FIG. 2 is a cross-sectional side view of the fuel tank device of FIG. 1 but illustrating a state where a fuel tank is deformed to contract.

With the deformation inhibiting device 14 according to the first embodiment described above, when the fuel tank 12 is deformed to contract by a change in the internal pressure of the fuel tank 12, the top wall portion 12a (more specifically, the opening edge portion 17 and its peripheral portion) may contact the top support portions 23 of the strut portions 21 as shown in FIG. 2. Therefore, the strut portions 21 may serve as struts between the top wall portion 12a and the bottom wall portion 12b of the fuel tank 12. As a result, it may be possible to restrict the contraction deformation of the fuel tank 12. When the change in the internal pressure of the fuel tank 12 is released from this state to recover the original internal pressure, the fuel tank 12 may be deformed to expand, so that the top wall portion 12a of the fuel tank 12 may move away from the top support portions 23 of the strut portions 21 to the original position shown in FIG. 1.

According to the deformation inhibiting device 14 of the first embodiment, the deformation inhibiting device 14 may be arranged within the fuel tank 12 without need of dividing the fuel tank 12 into an upper portion and a lower portion. This may reduce the manufacturing cost of the fuel tank 12. In addition, the manufacturing process of the fuel tank 12 may be simplified and the cost for the manufacturing equipment may be reduced.

The central portions of the top wall portion 12a and the bottom wall portion 12b are located the greatest distance from the lateral wall of the fuel tank 12 and may be prone to flexion. Therefore, the amount of deformation caused by the change in the internal pressure may be large at the central portions of the top wall portion 12a and the bottom wall portion 12b. Supporting these central portions by the strut portions 21 of the deformation inhibiting device 14 may effectively inhibit the contraction deformation of the fuel tank 12.

Further, because the strut portions 21 serve as struts between the top wall portion 12a and the bottom wall portion 12b of the fuel tank 12, it may be possible to avoid application of a load (that may be produced by the deformation) to the cover member 13. Therefore, the cover member 13 may not receive a substantial load produced by the contraction deformation of the fuel tank 12.

Furthermore, because the engaging portions 24 of the deformation inhibiting device 14 face the inner peripheral edge of the opening 16 of the fuel tank 12 in the radial direction, it may be possible to prevent the strut portions 21 from moving in the radially outward direction. Therefore, it may be possible to prevent the deformation inhibiting device 14 from moving in the radial direction with respect to the opening 16.

In addition, because the engaging portions 24 of the deformation inhibiting device 14 face the outer circumferential surface of the fitting tube portion 19 of the cover member 13, it may be possible to further reliably prevent the deformation inhibiting device 14 from moving in the radial direction.

Furthermore, because the strut portions 21 are joined to each other via the joint plate 22, both of the strut portions 21 can be inserted into the fuel tank 12 together with the joint plate 22. Therefore, in comparison with the case where the strut portions 21 are inserted into the fuel tank 12 separately from each other, it is possible to reduce the number of the steps necessary for the assembling operation.

Further, because there is no need of dividing the fuel tank 12 into an upper portion and a lower portion, it is possible to easily arrange the deformation inhibiting device 14 within the fuel tank 12. Therefore, the manufacturing process of the fuel tank device 10 may be simplified and the cost for the manufacturing equipment may be reduced.

In particular, a fuel tank manufacture by a blow-molding process can be used as the fuel tank 12, so that it may be possible to further reduce the manufacturing cost of the fuel tank device 10. Further, the deformation inhibiting device 14 of this embodiment can be advantageously used in conjunction with the blow-molded fuel tank, because the space occupied by the deformation inhibiting device 14 may be small. In addition, the freedom in a layout of the deformation inhibiting device 14 within the fuel tank is relatively high.

Figure 6:
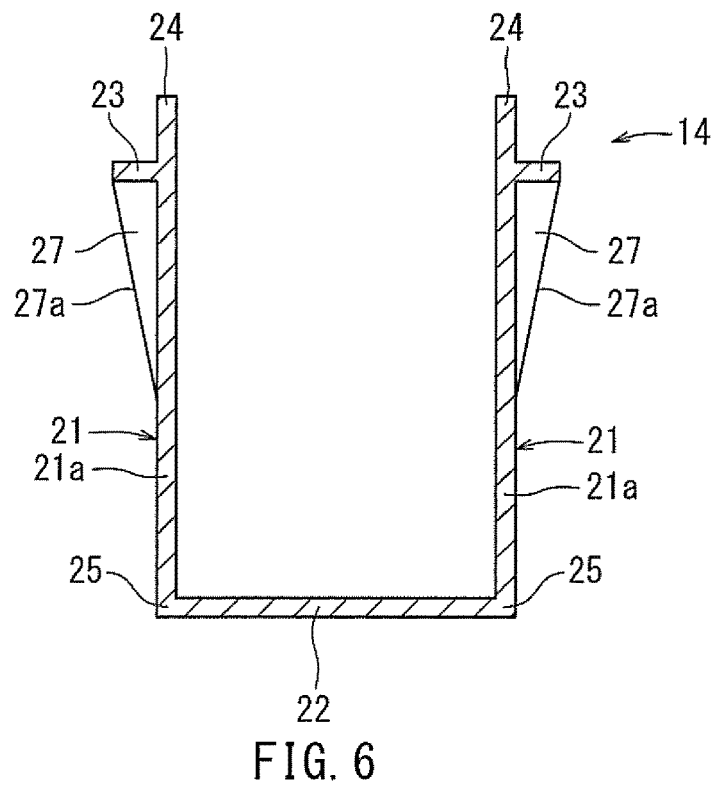
FIG. 6 is a cross-sectional side view schematically illustrating a deformation inhibiting device according to a second embodiment.

Second to thirtieth embodiments will now be described with reference to FIGS. 6 to 69. These embodiments are modifications of the first embodiment. Therefore, in FIGS. 6 to 69, like members are given the same reference numerals as the first embodiment and the description of these members will not be repeated.

A second embodiment will now be described with reference to FIGS. 6 and 7. As shown in FIG. 6, in this embodiment, a guide portion 27 is formed on each of the strut portions 21 of the deformation inhibiting device 14 to extend along the outer surface of the corresponding strut portion 21 between the top support portion 23 and a point on the outer surface of the strut portion 21 located on the lower side of the top support portion 23. More specifically, the guide portion 27 may have a shape of a right triangle corresponding to a shape of the corner portion defined by the top support portion 23 and a part of the outer surface of the strut portion 21 on the lower side of the top support portion 23. An oblique edge 27a corresponding to the hypotenuse of the right triangle of the guide portion 27 may extend between the radially outer end of the top support portion 23 and the point of the outer surface of the strut portion 21. Therefore, the oblique edge 27a inclines radially outward in the upward direction from the point on the outer surface of the strut portion 21 to the radially outer end of the top support portion 23.

Figure 7:
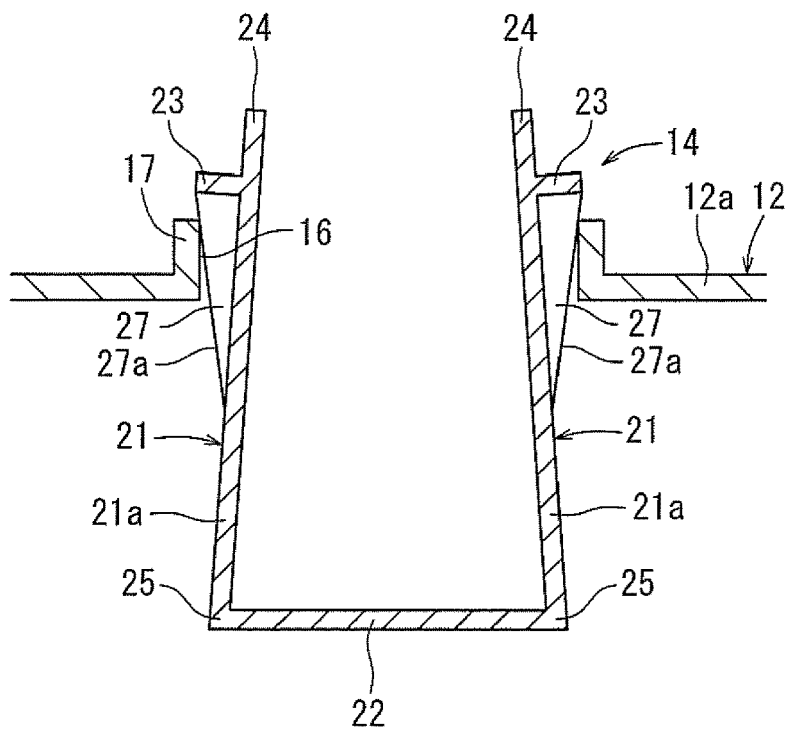
FIG. 7 is a cross-sectional side view schematically illustrating a state in the middle of an insertion process of the deformation inhibiting device shown in FIG. 6 into a fuel tank.

According to the second embodiment, as the deformation inhibiting device 14 is inserted into the fuel tank 12 through the opening 16 from above, the oblique edges 27a of the guide portions 27 of the strut portions 21 may contact the inner peripheral surface of the opening 16 of the fuel tank 12, so that the strut portions 21 may be biased to be elastically deformed or flexed toward each other (i.e., in the radially inward direction) as shown in FIG. 7. Therefore, the deformation inhibiting device 14 can be smoothly inserted into the fuel tank 12 without need of pinching the upper ends of the strut portions 21 with fingers of the user or by using a pinching tool. In other words, the guide portions 27 serve to inhibit potential engagement of the top support portions 23 with the opening edge portion 17 of the opening 16 during insertion of the deformation inhibiting device 14 into the fuel tank 12. Further, the guide portions 27 may serve as reinforcing portions for improving the mechanical strength of the top support portions 23.

The guide portion 27 may be arranged at a central position with respect to the circumferential direction of each of the strut portions 21. Alternatively, each of the strut portions 21 may include a plurality of guide portions 27 arranged so as to be adequately spaced from each other in the circumferential direction of the corresponding strut portion 21.

Figure 8:
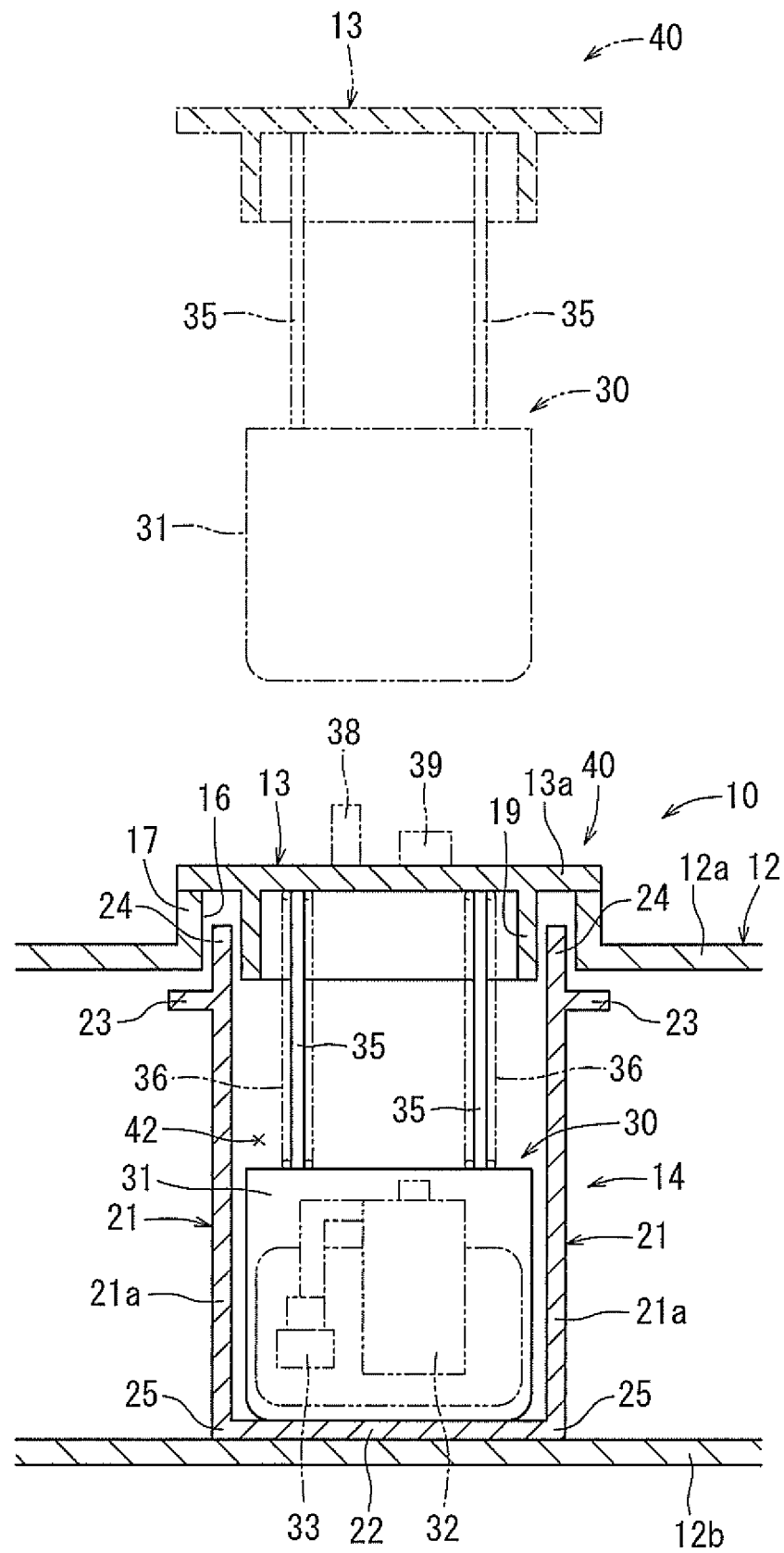
FIG. 8 is a cross-sectional side view schematically illustrating a fuel tank device according to a third embodiment.

A third embodiment will now be described with reference to FIG. 8. As shown in FIG. 8, the fuel tank device 10 of this embodiment may include a fuel pump unit 30 that can feed fuel from within the fuel tank 12 to the internal combustion engine, i.e. a target outside of the fuel tank 12. The fuel pump unit 30 may generally include a reserve cup 31, a fuel pump 32 and a pressure regulator 33. The reserve cup 31 may serve to store a part of fuel within the fuel tank 12 and may be formed to have a bottomed cylindrical tubular shape with an upper opening. The fuel pump 32 may pump the fuel from within the reserve cup 31 for feeding the fuel to the engine. The pressure regulator 33 may regulate the pressure of the fuel before feeding to the engine.

The reserve cup 31 may be connected to the cover member 13 via a plurality of connection shafts 35 (e.g., two connection shafts 35) in a manner suspended from the cover member 13 such that the reserve cap 31 can move vertically along the connection shafts 35 within a predetermined range. Biasing members 36 may be interposed between the cover member 13 and the reservoir cup 31 for biasing the cover member 13 and the reservoir cup 31 in directions away from each other. The biasing members 36 may be coil springs that are fitted on the connection shafts 35.

Further, in this embodiment, the cover member 13 may include a fuel discharge port 38 and an electric connector 39. The fuel may be discharged to the outside of the fuel tank 12 via the fuel discharge port 38. The electric power may be supplied to the fuel pump 32 via the electric connector 39. The fuel pump unit 30, the cover member 13, the connection shafts 35, etc. may constitute a fuel supply device 40. In FIG. 8, the fuel supply device 40 before installation into the fuel tank 12 is illustrated by two-dot chain lines.

The fuel supply device 40 may be installed into the fuel tank 12 by inserting the fuel pump unit 30 into the fuel tank 12 via the opening 16 and subsequently fixing the cover member 13 to the fuel tank 12. In the installed state of the fuel supply device 40, the fuel pump unit 30 may be located within a space 42 defined (surrounded) between the strut portions 21 of the deformation inhibiting device 14.

Further, in the installed state, the reserve cup 31 may be placed on the joint plate 22 of the deformation inhibiting device 14 and may be pressed against the joint plate 22 by the biasing force of the biasing members 36. The reserve cup 31 may have an outer diameter that is slightly smaller than the inner diameter of the column portions 21a of the strut portions 21. Therefore, the reserve cup 31 may serve to restrict movement of the strut portions 21 in directions toward each other.

According to this embodiment, the fuel pump unit 30 can be arranged within the space 42 defined between (surrounded by) the strut portions 21 of the deformation inhibiting device 14. Therefore, a combination of the deformation inhibiting device 14 and the fuel pump unit 30 is compact in design.

Further, it is possible to arrange the fuel pump unit 30 at the central region of the fuel tank 12, i.e. at a position that enables to ensure a fuel suctioning performance of the fuel pump unit 30 even when the surface of the fuel is inclined.

Further, the reserve cup 31 can restrict deformation of the strut portions 21 of the deformation inhibiting device 14 in directions toward the center of the opening 16.

A fourth embodiment will now be described with reference to FIG. 9. This embodiment corresponds to the fuel tank device 10 of the second embodiment (see FIG. 6) with modification of the guide portions 27 of the deformation inhibiting device 14. Further, in this embodiment, the fuel tank device 10 is provided with the fuel pump unit 30 as described in connection with the third embodiment (see FIG. 8).

Figure 9:
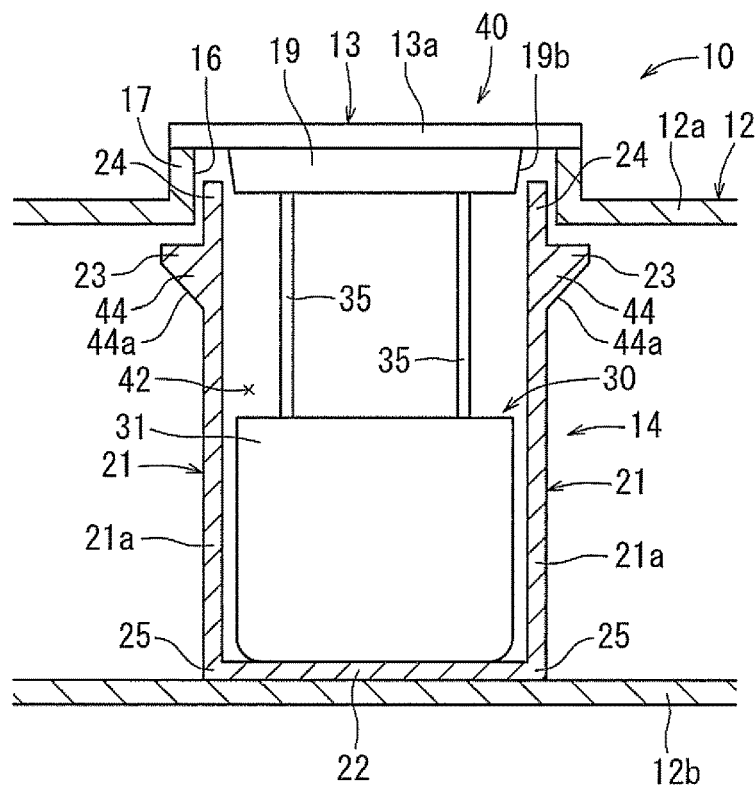
FIG. 9 is a cross-sectional side view schematically illustrating a fuel tank device according to a fourth embodiment.

As shown in FIG. 9, according to this embodiment, a guide portion 44 is formed on each of the strut portions 21 of the deformation inhibiting device 14 to extend along the outer surface of the corresponding strut portion 21 between the top support portion 23 and a point on the outer surface of the strut portion 21 located on the lower side of the top support portion 23. More specifically, the guide portion 44 may have a shape of a right triangle, in a vertical cross section, corresponding to a shape of the corner portion defined by the top support portion 23 and a part of the outer surface of the strut portion 21 on the lower side of the top support portion 23. An oblique surface 44a corresponding to the hypotenuse of the right triangle of the guide portion 44 may extend between the radially outer end of the top support portion 23 and the point of the outer surface of the strut portion 21. Therefore, the oblique surface 44a inclines radially outward in the upward direction from the point on the outer surface of the strut portion 21 to the radially outer end of the top support portion 23. For example, the guide portion 44 may extend in the circumferential direction along the entire length of the support portion 23. Alternatively, a plurality of guide portions may be arranged so as to be spaced from each other in the circumferential direction.

According to the fourth embodiment, as the deformation inhibiting device 14 is inserted into the fuel tank 12 through the opening 16 from above, the oblique surfaces 44a of the guide portions 44 of the strut portions 21 may contact the inner peripheral surface of the opening 16 of the fuel tank 12, so that the strut portions 21 may be biased to be elastically deformed or flexed toward each other. Therefore, the deformation inhibiting device 14 can be smoothly inserted into the fuel tank 12 without need of pinching the upper ends of the strut portions 21 with fingers of the user or by using a pinching tool. In other words, the guide portions 44 serve to inhibit potential engagement of the top support portions 23 with the opening edge portion 17 of the opening 16 during insertion of the deformation inhibiting device 14 into the fuel tank 12. Further, the guide portions 44 may serve as reinforcing portions for improving the mechanical strength of the top support portions 23.

Further, in this embodiment, the outer peripheral surface of the fitting tube portion 19 of the cover member 13 is formed to be tapered such that its outer diameter decreases in the downward direction. Therefore, the positioning of the cover member 13 relative to the opening 16 of the fuel tank 12 for fitting the cover member 13 with the opening 16 can be facilitated.

Figure 10:
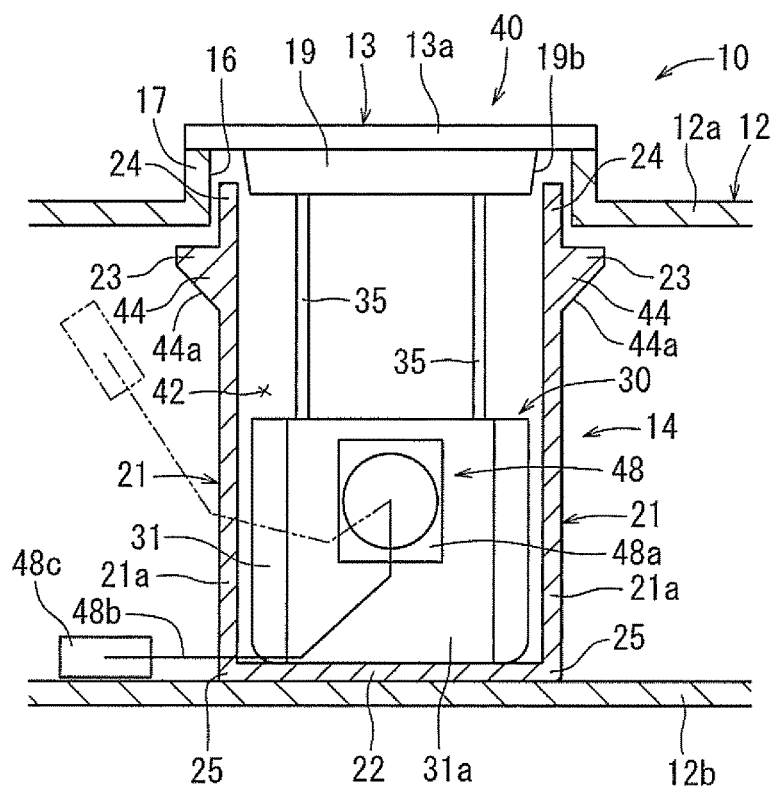
FIG. 10 is a cross-sectional side view schematically illustrating a fuel tank device according to a fifth embodiment.
Figure 11:
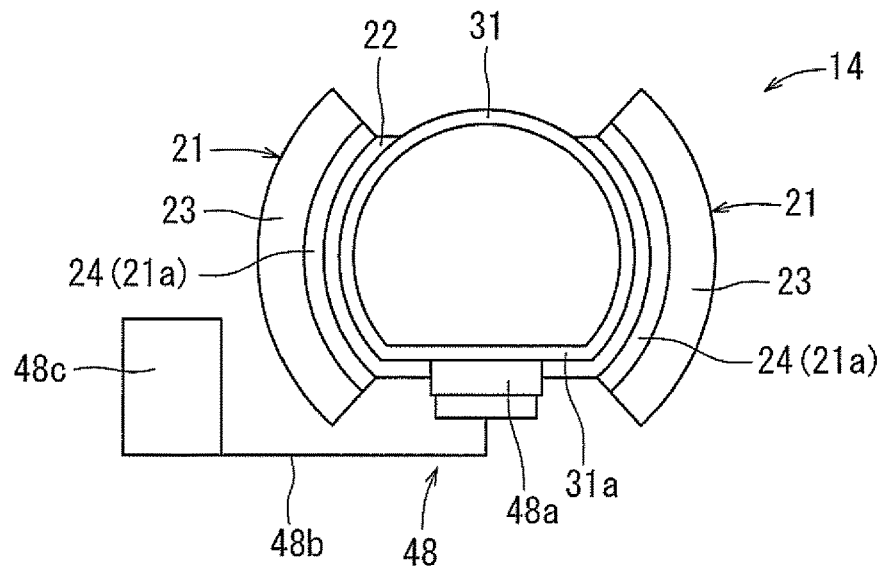
FIG. 11 is a plan view schematically illustrating a deformation inhibiting device and a reserve cup of the fuel tank device according to the fifth embodiment.

A fifth embodiment will now be described with reference to FIGS. 10 and 11. The fifth embodiment is a modification of the fourth embodiment shown in FIG. 9 and is different from the fourth embodiment in that a flat wall portion 31a is formed on the front portion (lower portion as viewed in FIG. 11) of the reserve cup 31. As shown FIG. 11, the flat wall portion 31a may be exposed (face) to one (front side one in this embodiment) of the openings defined between the strut portions 21 of the deformation inhibiting device 14. A sender gauge 48 serving as a fuel level sensor for the fuel within the fuel tank 12 may be attached to the front surface of the flat wall portion 31a.

The sender gauge 48 may include a gauge body 48a attached to the front surface of the flat wall portion 31a, an arm 48b supported in a cantilever manner by a rotary member of the gauge body 48a, and a float 48c attached to the free end of the arm 48b. The gauge body 48a may be electrically connected to a signal connector (not shown) disposed at the cover member 13 and may output, as a fuel level signal, a position of the float 48c that may move up and down according to the residual fuel amount within the fuel tank 12. The fuel level signal may be transmitted to an external device (not shown) via the signal connector.

According to this embodiment, the sender gauge 48 may be arranged in the central region of the fuel tank 12, where the fuel level can be accurately detected by the sender gauge 48. Further, the sender gauge 48 can be easily arranged by utilizing one of the openings defined between the strut portions 21 of the deformation inhibiting device 14.

Figure 12:
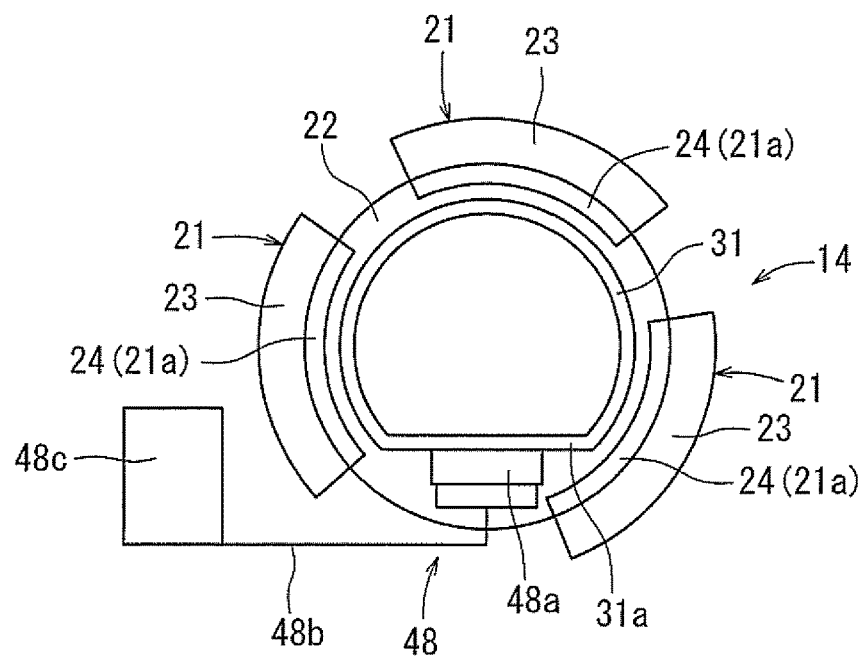
FIG. 12 is a plan view schematically illustrating a deformation inhibiting device according to a sixth embodiment.

A sixth embodiment will now be described with reference to FIG. 12. The sixth embodiment is a modification of the fifth embodiment shown in FIGS. 10 and 11 and is different from the fifth embodiment in the configuration of the deformation inhibiting device 14. In this embodiment, the deformation inhibiting device 14 may include three strut portions 21 spaced from each other in the circumferential direction. The flat wall portion 31a of the reserve cup 31 may be exposed at the opening formed between two of the strut portions that are disposed on the front side (lower side as viewed in FIG. 12) and are arranged adjacent to each other in the left-to-right direction. In this connection, the joint plate 22 may have a substantially circular shape.

Figure 13:
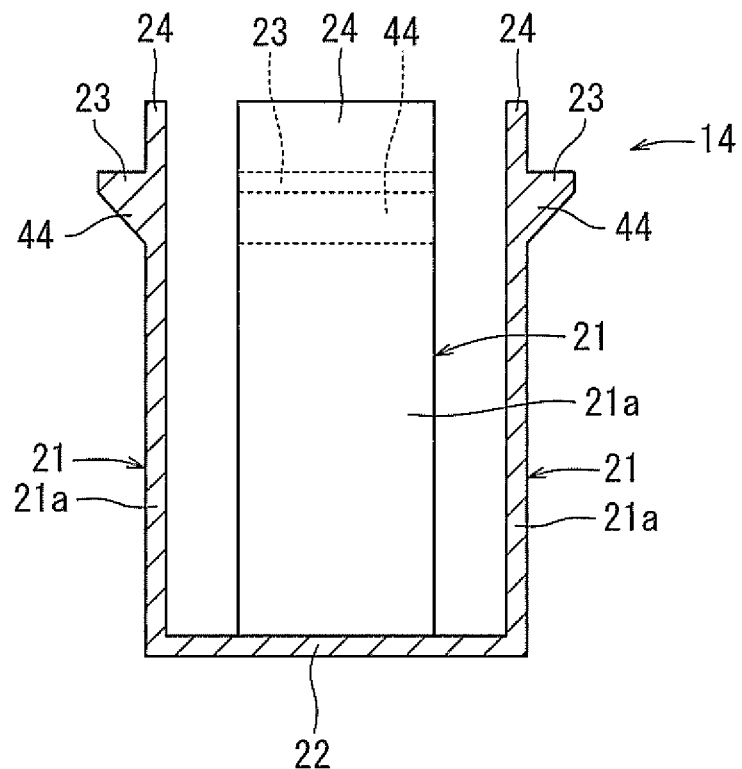
FIG. 13 is a cross-sectional side view schematically illustrating a deformation inhibiting device according to a seventh embodiment.
Figure 14:
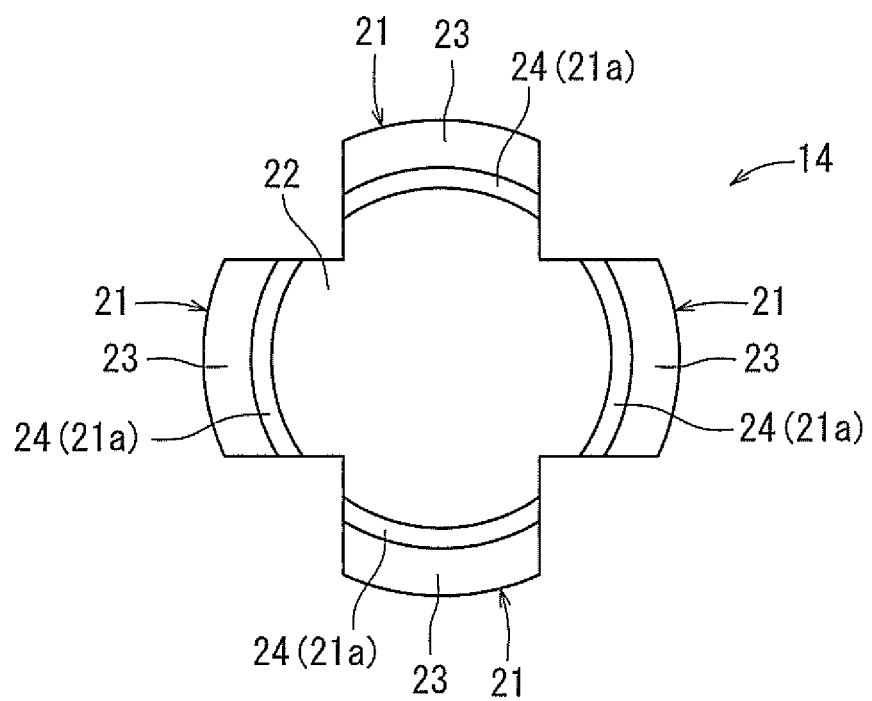
FIG. 14 is a plan view schematically illustrating the deformation inhibiting device shown in FIG. 13.

A seventh embodiment will now be described with reference to FIGS. 13 and 14. The seventh embodiment is a modification of the fourth embodiment shown in FIG. 9 and is different from the fourth embodiment in the configuration of the deformation inhibiting device 14. As shown in FIGS. 13 and 14, the deformation inhibiting device 14 may include four uniformly circumferentially-spaced strut portions 21. In this connection, the joint plate 22 may have an X or cross shape.

Figure 15:
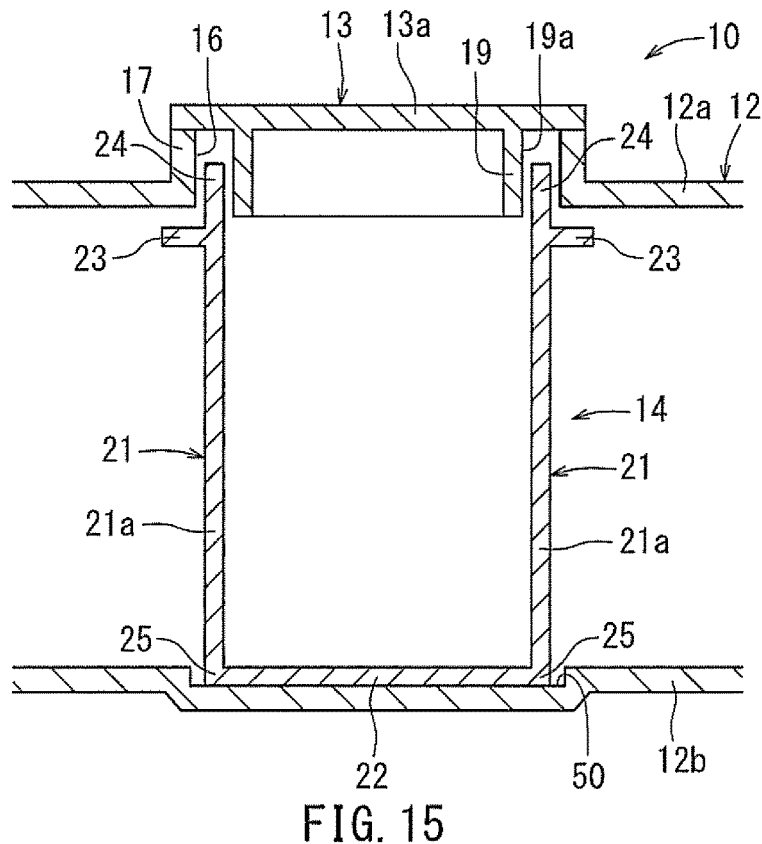
FIG. 15 is a cross-sectional side view schematically illustrating a fuel tank device according to an eighth embodiment.

An eighth embodiment will now be described with reference to FIG. 15. The eighth embodiment is a modification of the first embodiment shown in FIG. 1 and is different from the first embodiment in the configuration of the fuel tank 12. As shown in FIG. 15, the bottom wall portion 12b of the fuel tank 12 may be formed with a fitting step portion 50 configured to fit with the joint plate 22 and the bottom support portions 25 of the deformation inhibiting device 14. Fitting the joint plate 22 and the bottom support portions 25 with the fitting step portion 50 can position the deformation inhibiting device 14 in the horizontal direction relative to the bottom wall portion 12b of the fuel tank 12. In other words, it is possible to inhibit accidental shifting movement of the deformation inhibiting device 14 in the horizontal direction. In an alternative embodiment not shown, the bottom wall portion 12b may be formed with a convex portion(s) arranged to surround the joint plate 22 and the bottom support portions 25. Also with this alternative embodiment, it is possible to inhibit accidental shifting movement of the deformation inhibiting device 14 in the horizontal direction.

A ninth embodiment will now be described with reference to FIGS. 16 to 21. The ninth embodiment is a modification of the first embodiment shown in FIG. 1 and is different from the first embodiment in that a pair of left and right fixing mechanisms 52 are provided between the fuel tank 12 and the deformation inhibiting device 14 for fixedly connecting the deformation inhibiting device 14 to the fuel tank 12. Each of the left and right fixing mechanisms 52 is configured as a so-called twist lock mechanism that can cause engagement of the bottom wall portion 12b of the fuel tank 12 with the deformation inhibiting device 14 in a removal prevented state as the deformation inhibiting device 14 is rotated in a state where the joint plate 22 of the deformation inhibiting device 14 is placed on the bottom wall portion 12b of the fuel tank 12. More specifically, each of the left and right fixing mechanisms 52 may include an engaging member 53 disposed at the bottom wall portion 12b of the fuel tank 12 and may further include an engaging recess 55 formed in the lower end portion of the deformation inhibiting device 14 for engagement with the engaging member 53.

Figure 16:
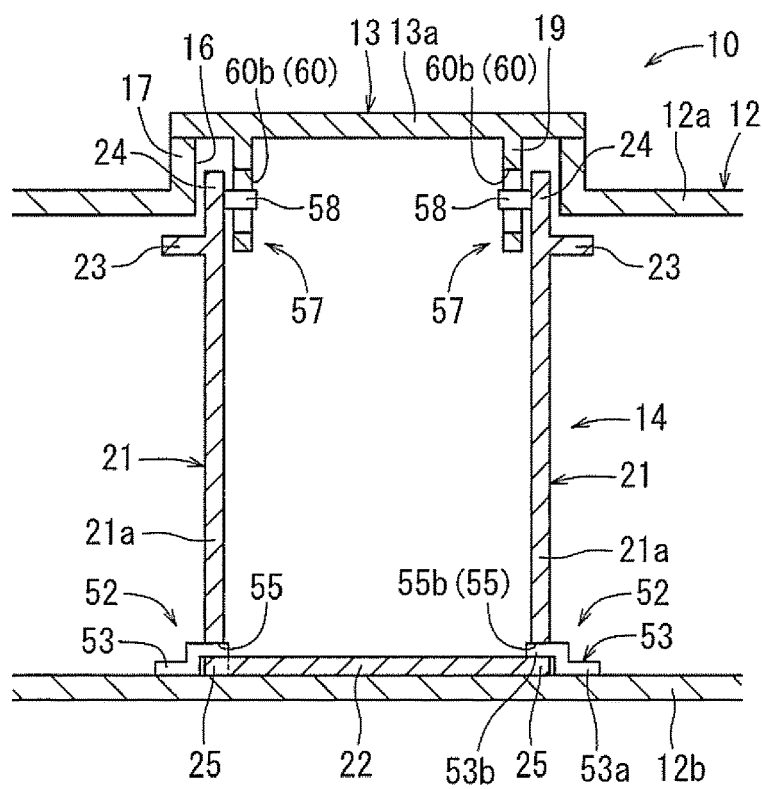
FIG. 16 is a cross-sectional side view schematically illustrating a fuel tank device according to a ninth embodiment.
Figure 17:
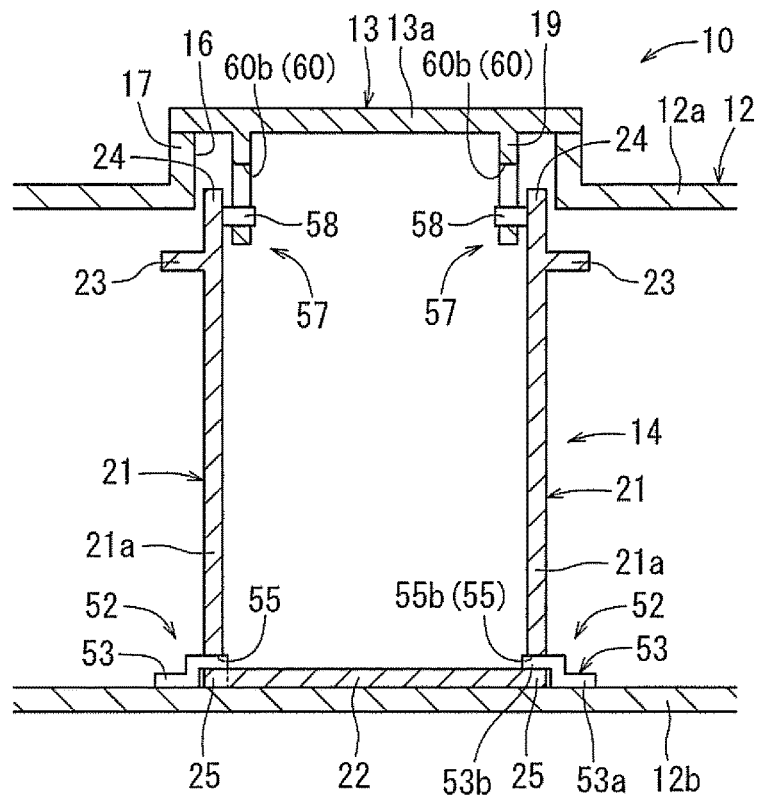
FIG. 17 is a cross-sectional side view of the fuel tank device of FIG. 16 but showing a state where a fuel tank has been deformed to expand.
Figure 18:
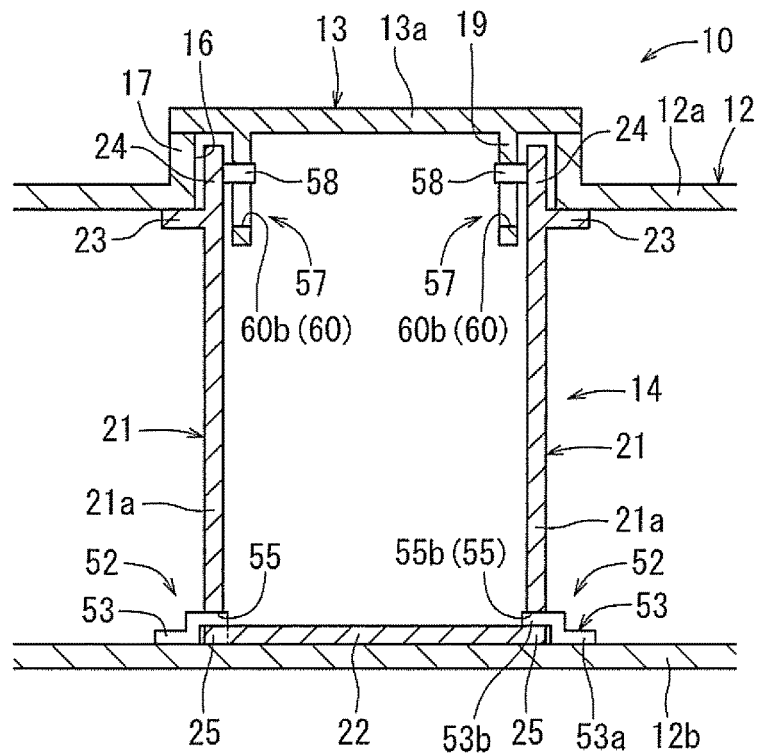
FIG. 18 is a cross-sectional side view similar to FIG. 16 but showing a state where the fuel tank has been deformed to contract.
Figure 19:
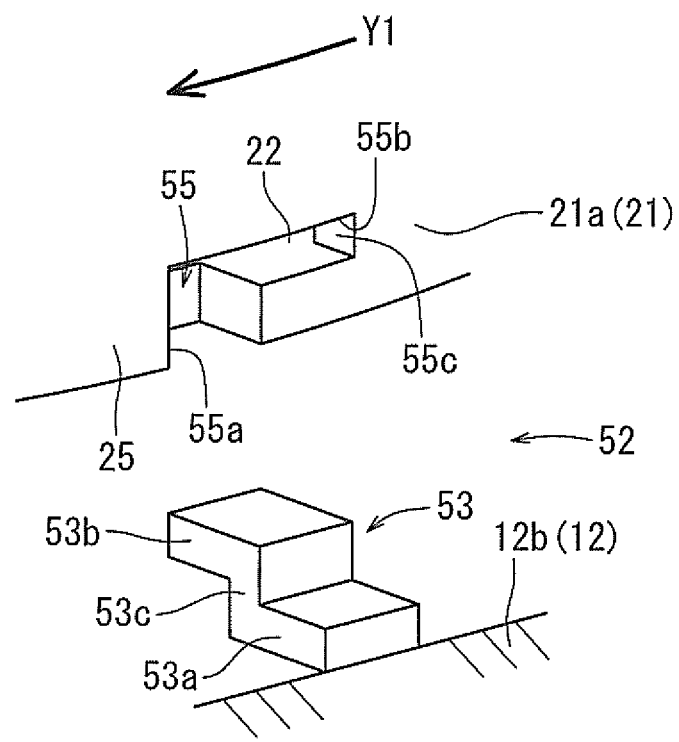
FIG. 19 is an exploded perspective view of one of left and right fixing mechanisms of the fuel tank device shown in FIG. 16
Figure 20:
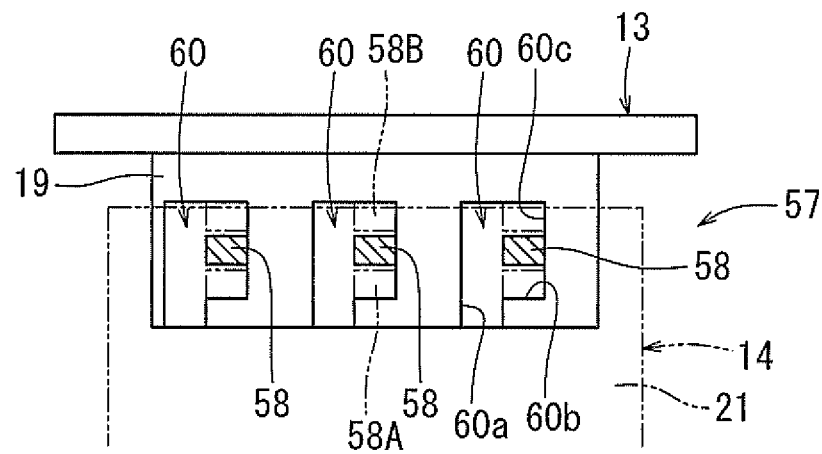
FIG. 20 is a schematic side view of one of left and right connection mechanisms of the fuel tank device shown in FIG. 16

As shown in FIG. 19, the engaging member 53 may have a substantially Z-shape and may include a fixed portion 53a formed at one end of the engaging member 53 and fixedly attached to the bottom wall portion 12b, an engaging portion 53b formed at the other end of the engaging member 53 and spaced upward from the bottom wall portion 12b by a given gap, and an uprising portion 53c connecting between the fixed portion 53a and the engaging portion 53b. As shown in FIG. 16, the engaging portion 53b may be located radially inward of the fixed portion 53a with respect to a radial direction about the axis of the opening 16. In other words, the fixed portion 53a may be located radially outward of the engaging portion 53b with respect to the radial direction about the axis of the opening 16.

As shown in FIG. 19, the engaging recess 55 may have a substantially inverted L-shape and may include a vertical recess portion 55a and a horizontal recess portion 55b. The vertical recess portion 55a may extend vertically and may have a lower end opened downward. The horizontal recess portion 55b may extend horizontally in the circumferential direction (more specifically, leftward (counterclockwise) as viewed in a plan view) from the upper end of the vertical recess portion 55a.

As the deformation inhibiting device 14 is inserted into the fuel tank 12, the engaging portions 53b of the engaging members 53 may be each engaged with the vertical recess portion 55a of the corresponding engaging recess 55. Subsequently, the deformation inhibiting device 14 may be rotated rightward (clockwise) as viewed in a plan view (see arrow Y1 in FIG. 19) relative to the fuel tank 12, so that the engaging portions 53b may be each engaged with the horizontal recess portion 55b of the corresponding engaging recess 55 (see FIG. 16). The rotation of the deformation inhibiting device 14 may be stopped when the engaging portions 53b abut recess end surfaces 55c (see FIG. 19) of the respective horizontal recess portions 55b. In this way, the deformation inhibiting device 14 may be fixedly joined to (locked against) the fuel tank 12 in a state where the deformation inhibiting device 14 is prevented from moving upward relative to the bottom wall portion 12b.

Further, in this embodiment, a pair of left and right connection mechanisms 57 may be provided between the cover member 13 and the deformation inhibiting device 14. Each of the left and right connection mechanisms 57 is configured as a so-called twist lock mechanism that can connect the cover member 13 to the deformation inhibiting device 14 such that the cover member 13 can move vertically relative to the deformation inhibiting device 14 within a predetermined range. More specifically, as the cover member 13 is rotated while it is positioned to close the opening 16 of the fuel tank 12, each of the left and right connection mechanisms 57 may connect the cover member 13 to the deformation inhibiting device 14 such that the cover member 13 can move vertically relative to the deformation inhibiting device 14 within the predetermined range.

Figure 21:
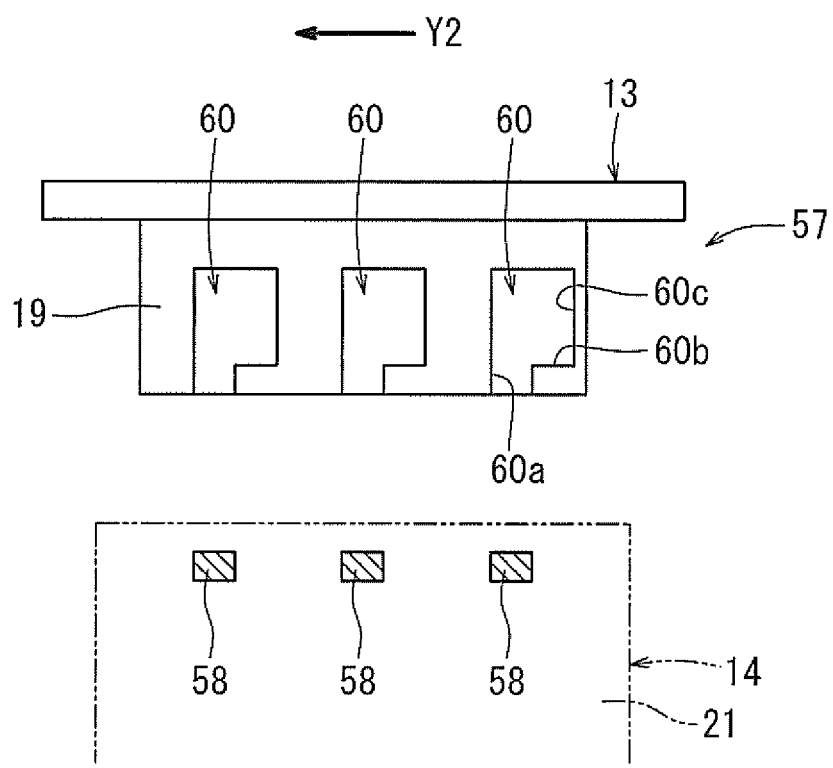
FIG. 21 is an exploded schematic side view of the left and right connection mechanisms.

As shown in FIG. 21, each of the left and right connection mechanisms 57 may include a plurality of engaging pins 58 and a plurality of engaging recesses 60. In this embodiment, each of the fixing mechanisms 57 may include three engaging pins 58 and three engaging recesses 60 corresponding to the number of the engaging pins 58. The engaging pins 58 may protrude radially inward from inner peripheral surface of a corresponding one of the engaging portions 24 of the deformation inhibiting device 14. The engaging recesses 60 may be formed in the fitting tube portion 19 of the cover member 13 for engagement with the engaging pins 58. For example, the engaging pins 58 may be uniformly circumferentially-spaced spaced from each other in the circumferential direction of the inner peripheral surface of the corresponding engaging portion 24 and may have a rectangular bar-shape.

The engaging recesses 60 may be formed in the fitting tube portion 19 at positions corresponding to the positions of the engaging pins 58. Each of the engaging recess 60 may have a substantially inverted L-shape and may include a vertical recess portion 60a and a horizontal recess portion 60b. The vertical recess portion 60a may extend vertically and may have a lower end opened downward. The horizontal recess portion 60b may extend horizontally in the circumferential direction (more specifically, leftward (counterclockwise) as viewed in a plan view) from the upper end of the vertical recess portion 60a.

As the cover member 13 is positioned to close the opening 16 of the fuel tank 12, the engaging pins 58 of the fitting tube portion 19 may be each engaged with the vertical recess portion 60a of the corresponding engaging recess 60. Subsequently, the cover member 13 may be rotated rightward (clockwise) as viewed in a plan view (see arrow Y2 in FIG. 21) relative to the fuel tank 12, so that the engaging pins 58 may be each engaged with the horizontal recess portion 60b of the corresponding engaging recess 60 while each engaging pin 58 can move vertically along the horizontal recess portion 60b within the predetermined range (see FIG. 20). The rotation of the cover member 13 may be stopped when the engaging pins 58 abut recess end surfaces 60c (see FIG. 21) of the respective horizontal recess portions 60b. In this way, the cover member 13 may be joined to the deformation inhibiting device 14 in a state where cover member 13 can move vertically relative to the deformation inhibiting device 14 within the predetermined range (see FIG. 16). In this state, the cover member 13 may be fixedly attached to the fuel tank 12 by using a suitable fixing device (not shown).

Therefore, according to this embodiment, the rotation of the deformation inhibiting device 14 in the right direction (clockwise direction) (see arrow Y1 in FIG. 19) may be restricted through abutment between the engaging portion 53b of the engaging member 53 and the recess end surface 55c of the horizontal recess portion 55b of the engaging recess 55 of each of the left and right fixing mechanisms 52. On the other hand, the rotation of the deformation inhibiting device 14 in the left direction (counterclockwise direction) may be restricted through abutment between the engaging pins 58 and the recess end surfaces 60c of the horizontal recess portions 60b of the engaging recesses 60 of each of the left and right connection mechanisms 57 (see FIG. 20). As a result, the deformation inhibiting device 14 may be prevented from rotating in both opposite directions in the circumferential direction. The deformation inhibiting device 14 may be removed by reversing the order of the assembling steps described above.

In a normal state of the fuel tank device 10, each of the engaging pins 58 may be located at a substantially central position in the vertical direction of the horizontal recess portion 60b of the corresponding engaging recess 60 (see FIG. 16).

If the fuel tank 12 expands due to the change in the internal pressure, the engaging pins 58 may contact the lower surfaces of the corresponding horizontal recess portions 60b (see "58A" indicted by two-dot chain lines in FIG. 20) as the expansion proceeds. Therefore, it is possible to inhibit excessive expansion deformation of the fuel tank 12. When the change in the internal pressure of the fuel tank 12 is released from this state to recover the original internal pressure (e.g. the atmospheric pressure), the fuel tank 12 may be deformed to contract, so that the engaging pins 58 may move away from the lower surfaces of the corresponding horizontal recess portions 60b.

On the other hand, if the fuel tank 12 contracts due to the change in the internal pressure, the engaging pins 58 may contact the upper surfaces of the corresponding horizontal recess portions 60b (see "58B" indicted by two-dot chain lines in FIG. 20) as the contraction proceeds. Therefore, it is possible to inhibit excessive contraction deformation of the fuel tank 12. When the change in the internal pressure of the fuel tank 12 is released from this state to recover the original internal pressure, the fuel tank 12 may be deformed to expand, so that the engaging pins 58 may move away from the upper surfaces of the corresponding horizontal recess portions 60b.

In this way, according to this embodiment, it is possible to inhibit not only the contraction deformation of the fuel tank 12 but also the expansion deformation of the fuel tank 12.

Further, because of the use of the twist lock mechanisms for the fixing mechanisms 52, attaching and detaching operations of the deformation inhibiting device 14 can be easily performed without need of use of fasteners, such as bolts. Similarly, because of the use of the twist lock mechanisms for the connection mechanisms 57, attaching and detaching operations of the cover member 13 with respect to the deformation inhibiting device 14 can be easily performed without the use of fasteners, such as bolts.

Figure 22:
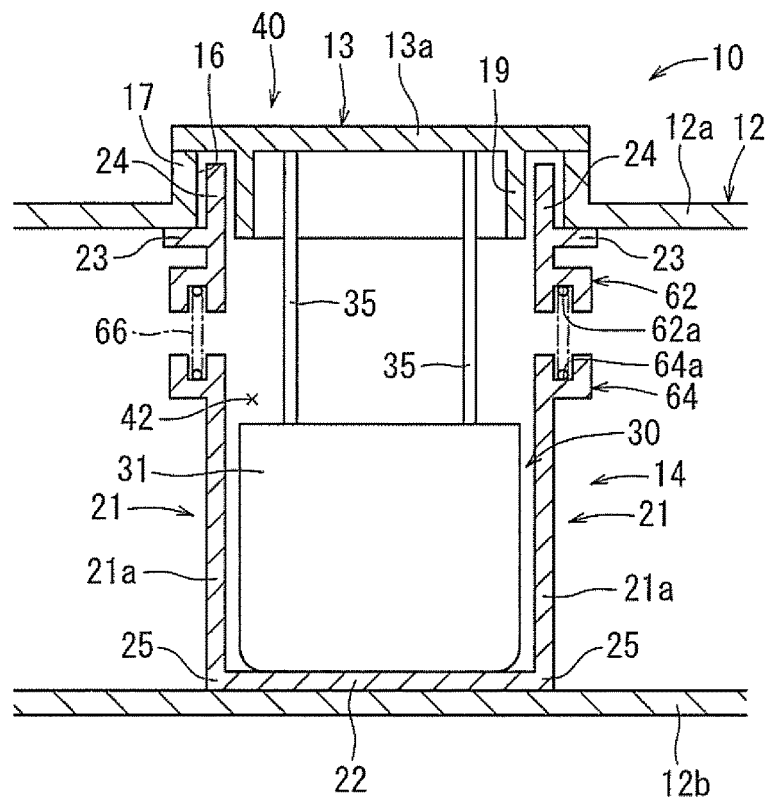
FIG. 22 is a vertical sectional view schematically illustrating a fuel tank device according to a tenth embodiment.

A tenth embodiment will now be described with reference to FIGS. 22 and 23. This embodiment is a modification of the third embodiment shown in FIG. 8 and is different from the third embodiment in the configuration of the deformation inhibiting device 14. As show in FIG. 22, in this embodiment, each of the strut portions 21 of the tank deformation inhibiting device 14 is divided into two portions, i.e., an upper half portion 62 and a lower half portion 64. The upper half portion 62 and the lower half portion 64 may have a downwardly facing surface and an upwardly facing surface, respectively, which face to each other in the vertical direction and are respectively formed with a spring support groove 62a and a spring support groove 64a each having an annular shape about the axis of the joint plate 22.

A connection spring 66 that may be a coil spring may be interposed between the upper half portion 62 and the lower half portion 64 for connecting them to each other. The upper end of the connection spring 66 may be connected to the upper half portion 62 by being fitted into the spring support groove 62a. The lower end of the connection spring 66 may be connected to the lower half portion 64 by being fitted into the spring support groove 64a. The connection spring 66 may bias the upper half portion 62 and the lower half portion 64 away from each other. Therefore, the top support portion 23 of the upper half portion 62 of each of the strut portions 21 may be biased to normally contact the opening edge portion 17 of the fuel tank 12. Further, under the normal condition of the fuel tank 12, the upper half portion 62 and the lower half portion 64 of each of the strut portions 21 are spaced from each other by a given distance in the vertical direction.

Figure 23:
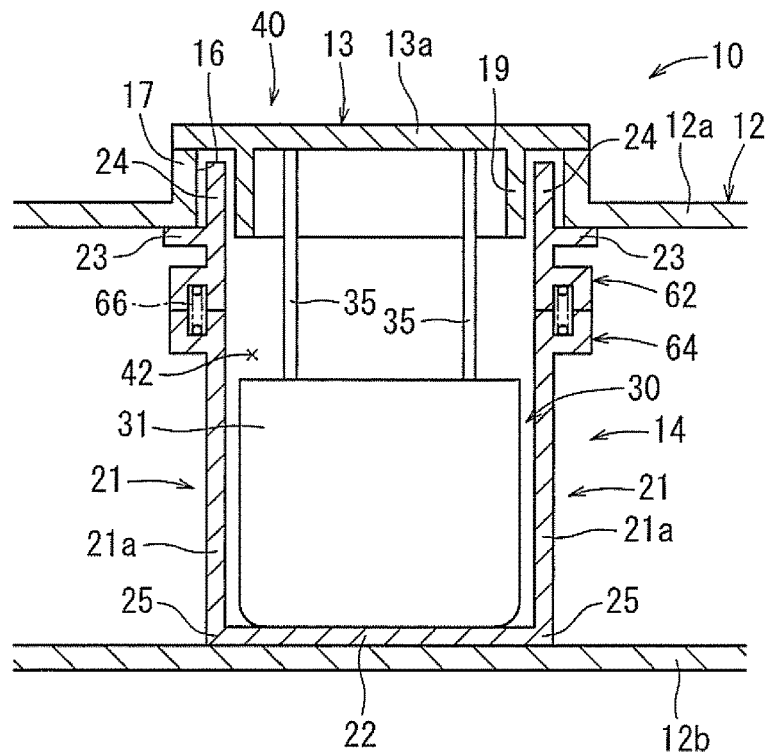
FIG. 23 is a cross-sectional side view of the fuel tank device of FIG. 22 but showing a state where a fuel tank has been deformed to contract.

According to this embodiment, if the fuel tank 12 contracts due to the change in the internal pressure, the upper half portion 62 and the lower half portion 64 of each of the strut portions 21 of the deformation inhibiting device 14 may move toward each other against the biasing force of the connection spring 66 and may eventually contact with each other (see FIG. 23). Therefore, it is possible to inhibit excessive contraction deformation of the fuel tank 12. When the change in the internal pressure of the fuel tank 12 is released from this state to recover the original internal pressure, the fuel tank 12 may be deformed to expand, so that the upper half portion 62 and the lower half portion 64 of each of the strut portions 21 may move away from each other by the biasing force of the connection spring 66.

In this embodiment, in order to insert the deformation inhibiting device 14 into the fuel tank 12 via the opening 16, the user may move or pinch the lower half portions 64 of the strut portions 21 toward each other to cause their elastic deformation until the distance between the outer ends of the top support portions 23 becomes smaller than the diameter of the opening 16.

Figure 24:
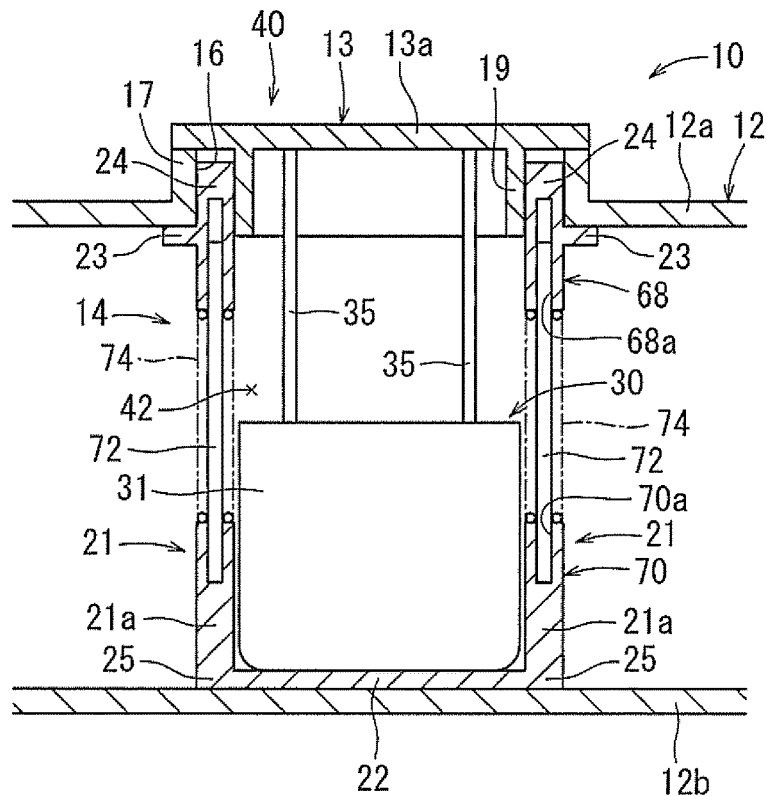
FIG. 24 is a cross-sectional side view schematically illustrating a fuel tank device according to an eleventh embodiment.

An eleventh embodiment will now be described with reference to FIGS. 24 and 25. This embodiment is a modification of the third embodiment shown in FIG. 8 and is different from the third embodiment in the configuration of the deformation inhibiting device 14. As show in FIG. 24, in this embodiment, each of the strut portions 21 of the tank deformation inhibiting device 14 is divided into two portions, i.e., an upper half portion 68 and a lower half portion 70. A pair of front and rear rod-attaching holes 70a each configured as a cylindrical hole with a closed bottom may be formed in the upper end surface of the lower half portion 70. Only one rod-attaching hole 70a is shown in FIG. 24. A pair of front and rear guide rods 72 may be fixedly attached to the lower half portion 70 and may have lower ends fixedly inserted into the front and rear rod-attaching holes 70a. The guide rod 72 may be elastically deformable (i.e., bendable) in the radial direction.

A pair of front and rear guide holes 68a each configured as a cylindrical hole with a closed top may be formed in the lower end surface of the upper half portion 68 at positions corresponding to the pair of front and rear rod-attaching holes 70a. The pair of front and rear guide rods 72 may have upper ends slidably inserted into the front and rear guide holes 68a, so that the pair of front and rear guide rods 72 can move vertically relative to the front and rear guide holes 68a within a predetermined range.

Figure 25:
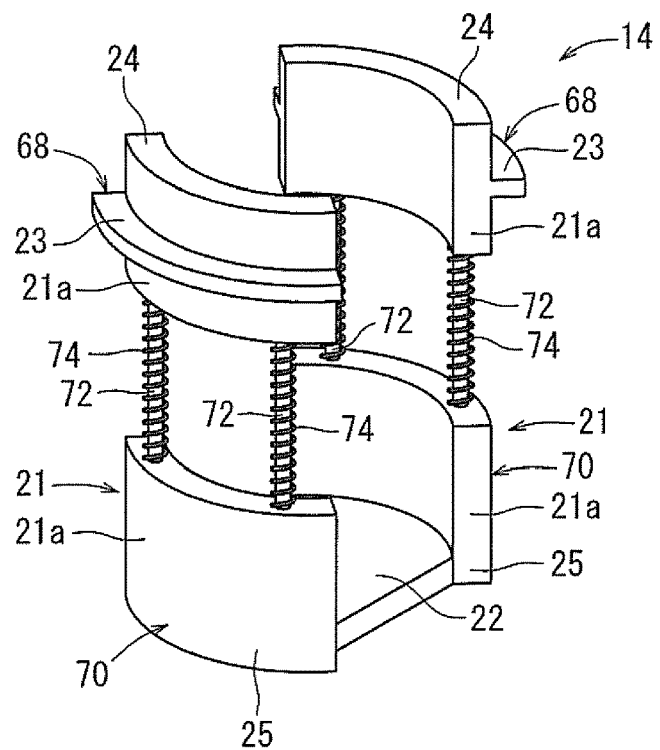
FIG. 25 is a perspective view of a deformation inhibiting device of the fuel tank device shown in FIG. 24.

A biasing spring 74 may be a coil spring and may be fitted over each of the guide rods 72 so as to be interposed between the upper half portion 68 and the lower half portion 70 (see FIG. 25). The biasing spring 74 may bias the upper half portion 68 and the lower half portion 70 away from each other, so that the top support portion 23 of the upper half portion 68 of each of the strut portions 21 may be biased to normally contact the opening edge portion 17 of the fuel tank 12.

According to this embodiment, if the fuel tank 12 contracts due to the change in the internal pressure, the upper half portion 68 and the lower half portion 70 of each of the strut portions 21 of the deformation inhibiting device 14 may move toward each other against the biasing forces of the biasing springs 74. Eventually, the upper ends of the guide rods 72 may contact the closed tops of the guide holes 68a of the upper half portion 68. Therefore, it is possible to inhibit excessive contraction deformation of the fuel tank 12. When the change in the internal pressure of the fuel tank 12 is released from this state to recover the original internal pressure, the fuel tank 12 may be deformed to expand, so that the upper half portion 68 and the lower half portion 70 of each of the strut portions 21 may move away from each other by the biasing forces of the biasing springs 74.

In this embodiment, in order to insert the deformation inhibiting device 14 into the fuel tank 12 via the opening 16, the user may move or pinch the upper half portions 68 of the strut portions 21 toward each other to cause the elastic flexural deformation (bending deformation) of the guide rods 72 and the biasing springs 74 until the distance between the outer ends of the top support portions 23 becomes smaller than the diameter of the opening 16. In an alternative embodiment, the biasing springs 74 may be omitted and the upper ends of the guide rods 72 may be fixedly attached to the upper half portion 68.

Figure 26:
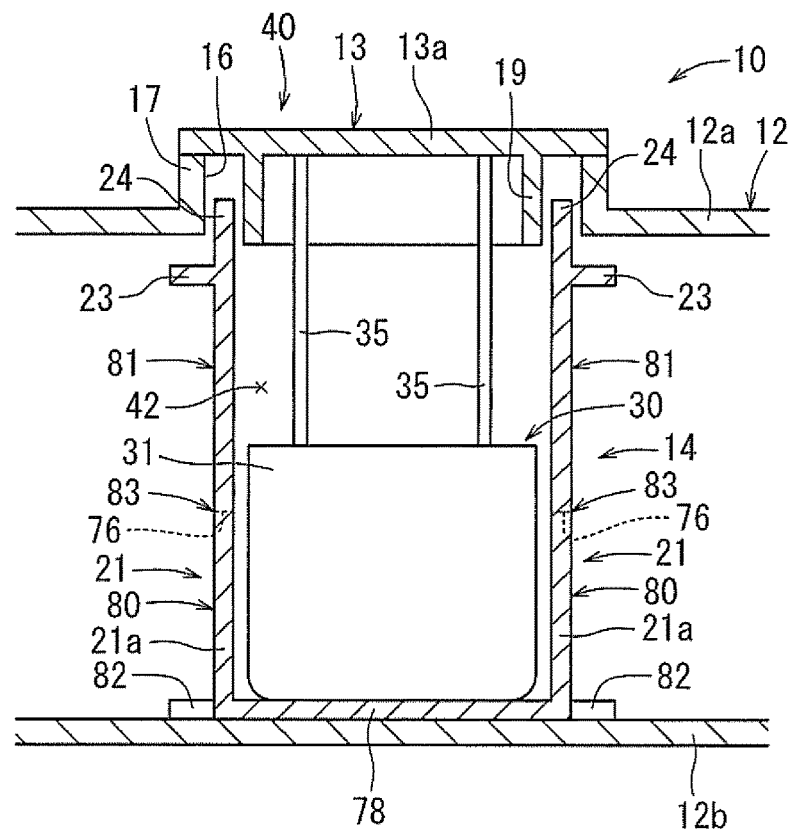
FIG. 26 is a cross-sectional side view schematically illustrating a fuel tank device according to a twelfth embodiment.
Figure 27:
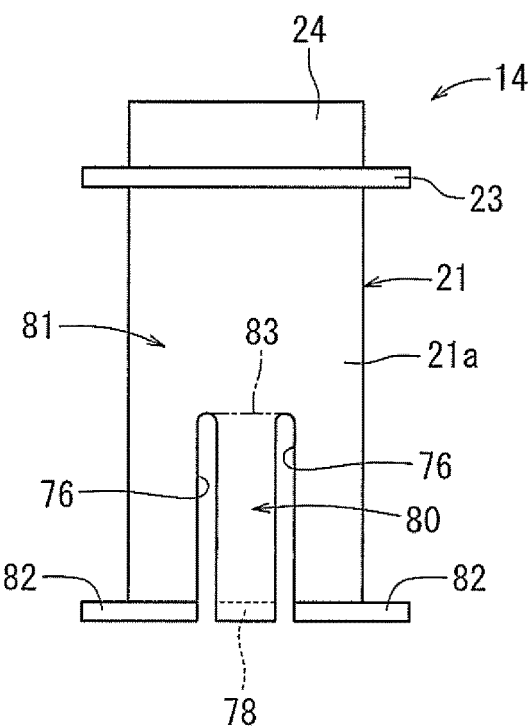
FIG. 27 is a side view of a deformation inhibiting device for a fuel tank of the fuel tank device shown in FIG. 26.
Figure 28:
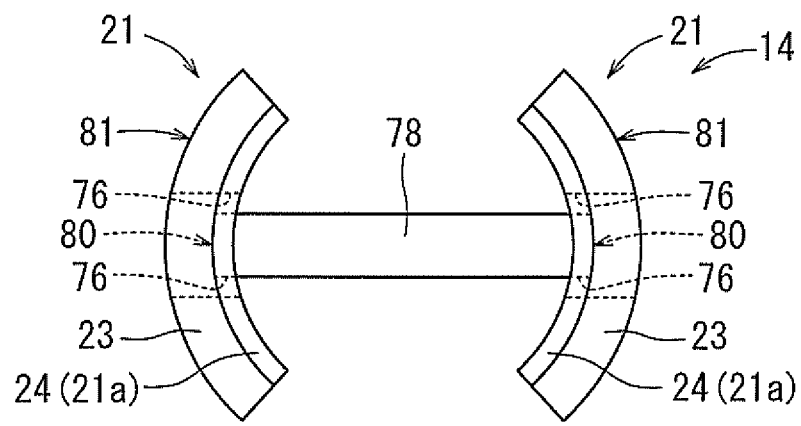
FIG. 28 is a plan view of the deformation inhibiting device shown in FIG. 27.

A twelfth embodiment will now be described with reference to FIGS. 26 to 28. This embodiment is a modification of the third embodiment shown in FIG. 8 and is different from the third embodiment in the configuration of the deformation inhibiting device 14. As show in FIG. 27, in this embodiment, a pair of front and rear slits 76 extending parallel to each other may be formed in the column portion 21a of each of the strut portions 21 of the tank deformation inhibiting device 14. More specifically, each of the slits 76 may be formed in the lower portion of the column portion 21a to extend vertically and to have a closed upper end and an open lower end. Further, in this embodiment, a lower end of a part of the lower portion of the column portion 21a located between the front and rear slits 76 of one of the strut portions 21 is joined to a lower end of a similar part of the other of the strut portions 21 via a joint plate 78. The joint plate 78 may have a shape of a band plate and may extend in the left-to-right direction (see FIG. 28). The joint plate 78 may also serve as a bottom support portion.

The part of the lower portion of the column portion 21a located between the front and rear slits 76 and connected to the joint plate 78 may serve as a fixed portion 80, and the other part of the column portion 21a may serve as a movable portion 81. A pair of front and rear bottom support portions 82 may be formed on the lower end of the movable portion 81 and may protrude radially outward therefrom (see FIG. 26). The front and rear bottom support portions 82 may have an outer diameter that may be the same or substantially the same as the outer diameter of the top support portion 23.

Figure 29:
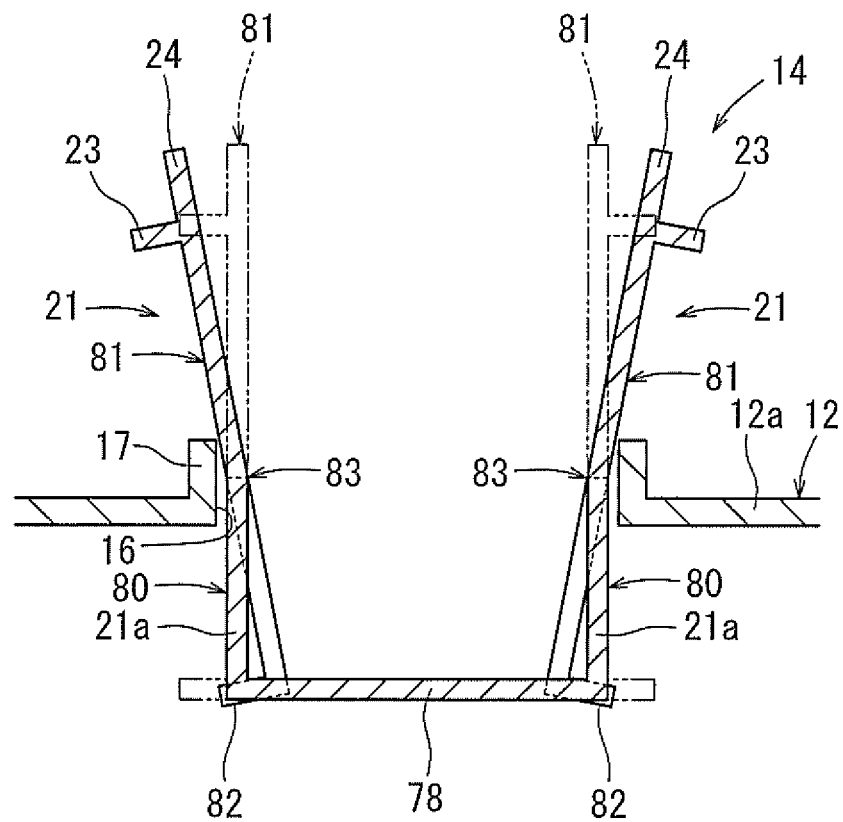
FIG. 29 is a cross-sectional side view schematically illustrating a first assembling process for assembling the deformation inhibiting device shown in FIGS. 27 and 28 into the fuel tank.
Figure 30:
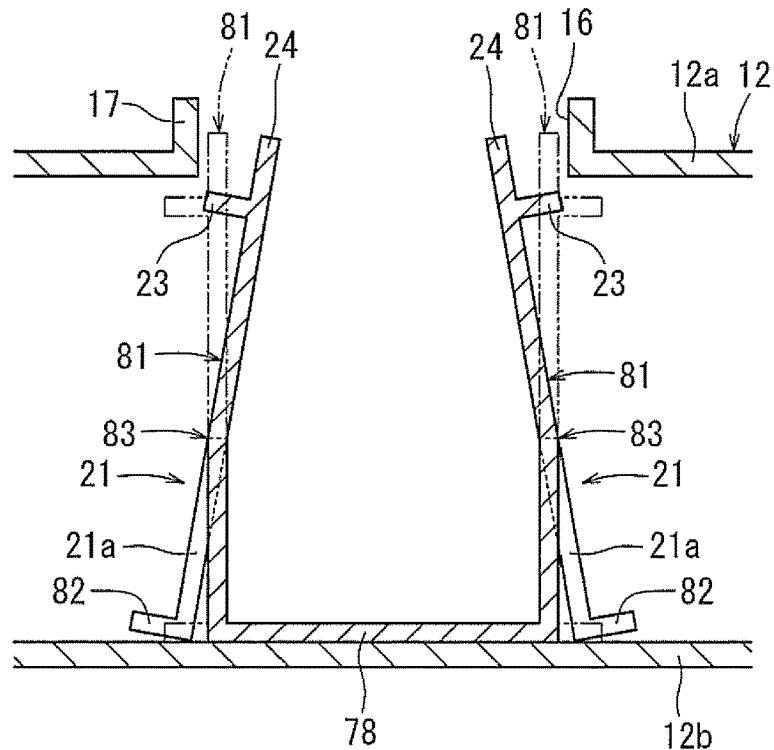
FIG. 30 is a cross-sectional side view schematically illustrating a second assembling process for assembling the deformation inhibiting device shown in FIGS. 27 and 28 into the fuel tank.

A boundary portion between the movable portion 81 and the fixed portion 82 may serve as a linear bendable portion 83, about which the movable portion 81 can be elastically deformed or flexed (bent) in the left-to-right direction (see FIGS. 29 and 30). In the following description, an elastically deformed state where the upper portions of the movable portions 81 of the column portions 21a have been moved (bent) in directions away from each other as shown in FIG. 29 will be referred to as a first insertion enabled state. On the other hand, an elastically deformed state where the upper portions of the movable portions 81 of the column portions 21a have been moved (bent) in directions toward each other as shown in FIG. 30 will be referred to as a second insertion enabled state.

In this embodiment, in order to insert the deformation inhibiting device 14 into the fuel tank 12 via the opening 16, the user may first move the upper portions of the movable portions 81 of the column portions 21a away from each other to cause elastic deformation to the first insertion enabled state. In this state, the user may insert the lower portion of the deformation inhibiting device 14 into the fuel tank 12 via the opening 16.

In the middle of the insertion process of the deformation inhibiting device 14 described above, the user may move the upper portions of the movable portions 81 of the column portions 21a in directions toward each other to cause elastic deformation to the second insertion enabled state as shown in FIG. 30. In this state, the user may insert the upper portion of the deformation inhibiting device 14 into the fuel tank 12 via the opening 16. When the joint plate 78 has contacted the bottom wall portion 12b of the fuel tank 12, the user may release the forces applied to the upper portions of the movable portions 81, so that the movable portions 81 may elastically return to their original shapes (see FIG. 26). The operations for moving the upper portions of the movable portions 81 may be made manually or by using an appropriate tool.

A thirteenth embodiment will now be described with reference to FIGS. 31 to 35. This embodiment is a modification of the third embodiment shown in FIG. 8 and is different from the third embodiment in that the deformation inhibiting device 14 is replaced with a deformation inhibiting device 84. As show in FIGS. 32 and 33, the deformation inhibiting device 84 may include three components, i.e. a joint plate 85 and a pair of left and right movable members 87.

Figure 33:
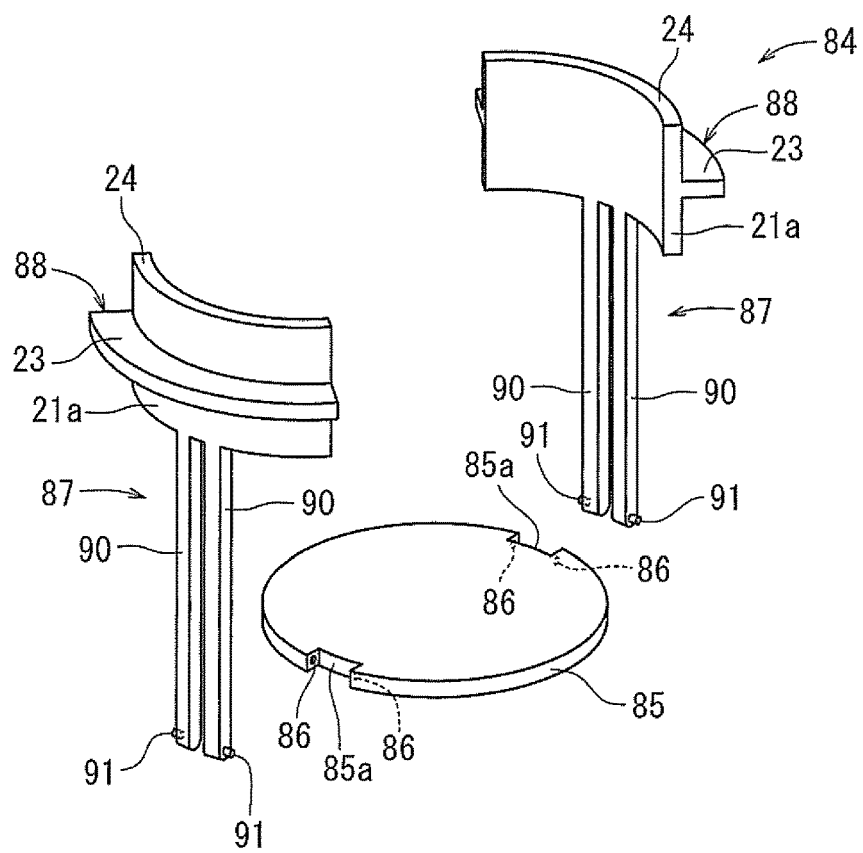
FIG. 33 is an exploded perspective view of the deformation inhibiting device shown in FIG. 32.

As shown in FIG. 33, the joint plate 85 may have a circular plate-shape and may include a pair of notched recesses 85a disposed on opposite sides in the left-to-right direction and each having a U-shape in a plan view. A pair of left and right pin-receiving holes 86 may be formed in the front and rear opposite surfaces of each notched recess 85a.

Each of the movable members 87 may include a receiving portion 88 and a pair of support legs 90. The basic structure of the receiving portion 88 may be the same as the upper half portion 68 of the eleventh embodiment (see FIG. 25). Therefore, in FIGS. 31 to 35, for the receiving portion 88, like parts are given the same reference numerals as those of the upper half portion 68 and the description of these parts will be omitted. The pair of support legs 90 may extend downward in parallel to each other from a substantially central portion with respect to the circumferential direction of the column portion 21a of the receiving portion 88 while the pair of support legs 90 are spaced from each other by a predetermined distance. Each of the support legs 90 may have a rectangular bar-shape.

Pins 91 may be respectively formed on the lower end portions of the pair of support legs 90 and may protrude in directions away from each other. The pins 91 of the pair of support legs 90 may be rotatably engaged with (inserted into) the pair of left and right pin-receiving holes 86 of a corresponding one of notched recesses 85a by utilizing elastic deformation (flexure deformation) of the support legs 90 toward each other. In this way, the movable members 87 may be joined to the joint plate 85 such that the movable members 87 can pivot in the left-to-right direction relative to the joint plate 85. In this embodiment, the movable members 87 may serve as strut portions, and the joint plate 85 may serve as a joint member or a bottom support portion.

Figure 34:
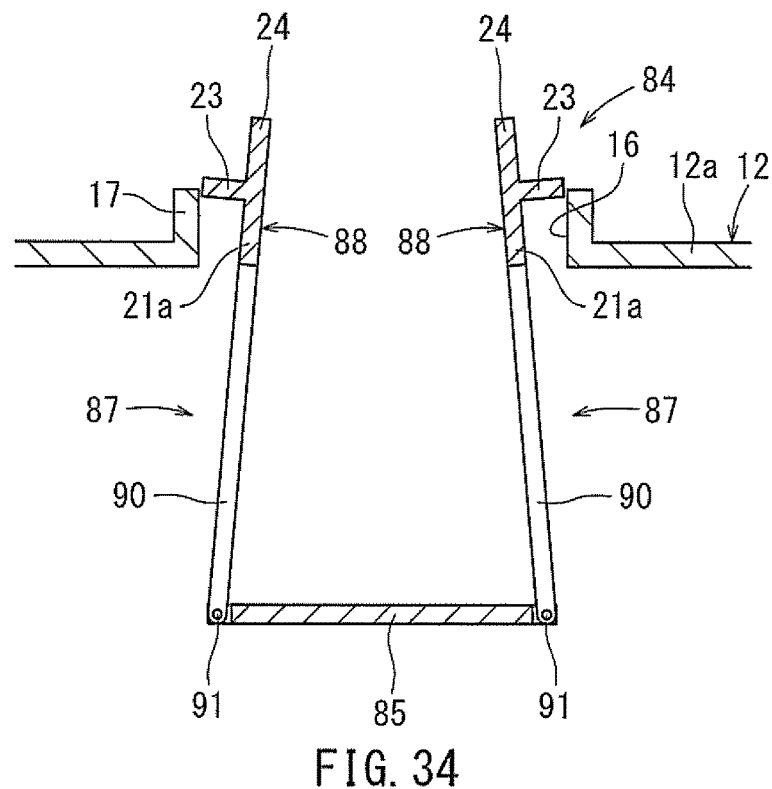
FIG. 34 is a cross-sectional side view schematically illustrating an assembling process for assembling the deformation inhibiting device shown in FIGS. 32 and 33 into the fuel tank.

An assembling process for assembling the deformation inhibiting device 84 with the fuel tank 12 will now be described. First, the movable members 87 may be pivoted (tilted) in directions toward each other and may be inserted into the fuel tank 12 via the opening 16 as shown in FIG. 34. When the joint plate 85 has contacted the bottom wall portion 12b of the fuel tank 12, the movable members 87 may be pivoted (tilted) in directions away from each other to reach uprising positions shown in FIG. 31.

Figure 35:
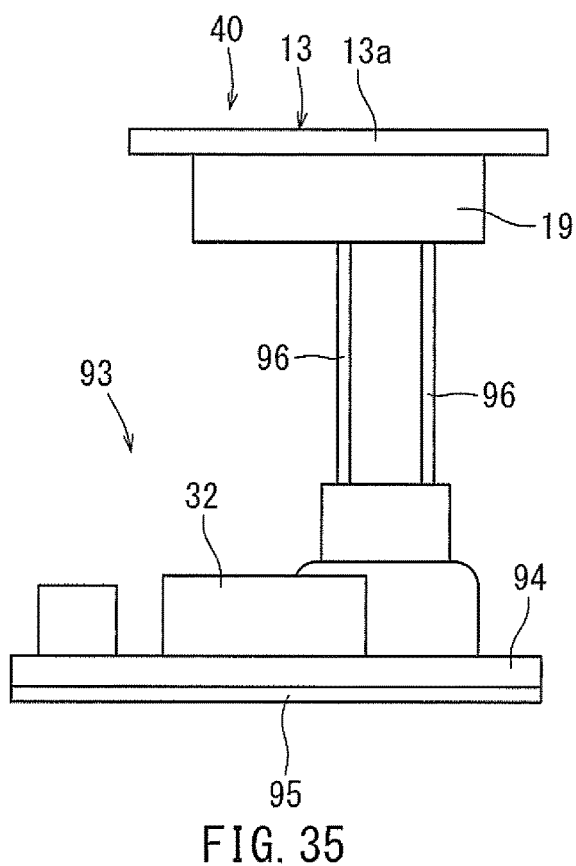
FIG. 35 is a side view schematically illustrating a fuel pump unit of the fuel tank device shown in FIG. 31

Further, the fuel supply device 40 of the fuel tank device 10 of this embodiment is different from the fuel supply device 40 of the third embodiment (see FIG. 8) in that the fuel pump unit 30 is replaced with a fuel pump unit 93 that is different in construction from the fuel pump unit 30. As shown in FIG. 35, the fuel pump unit 93 may include a sub tank 94, a fuel pump 32, etc. The fuel pump 32 may serve to pump the fuel stored in the sub tank 94 for feeding the fuel to the engine.

The sub tank 94 may have a rectangular box shape elongated in the front-to-rear direction (left-to-right direction as viewed in FIG. 35) and having a bottom opening. The bottom opening of the sub tank 94 may be covered by a fuel filter 95. The fuel pump 32 may be disposed on the upper side of the sub tank 94 so as to be arranged in a horizontally oriented state with the axial direction of the fuel pump 32 oriented in the front-to-rear direction. The front portion (right portion as viewed in FIG. 35) of the sub tank 94 may be joined to the cover member 13 via a plurality of connection shafts 96 such that the sub tank 94 is supported by the cover member 13 in a suspended manner while the sub tank 94 can move vertically relative to the cover member 13 within a predetermined range. In this embodiment, two connection shafts 96 are used. Although not shown in the drawings, a biasing device such as a spring(s) may be interposed between the cover member 13 and the sub tank 94 for biasing the cover member 13 and the sub tank 94 away from each other.

The fuel supply device 40 may be mounted within the fuel tank 12 by inserting the fuel pump unit 93 into the fuel tank 12 via the opening 16 and thereafter fixing the cover member 13 in position relative to the fuel tank 12. Therefore, the fuel pump unit 93 may be located within a space 97 surrounded by (defined between) the movable members 87 of the deformation inhibiting device 84. In this embodiment, the rear end (left end as viewed in FIG. 35) of the sub tank 94 may extend rearward (backside direction of the sheet surface of FIG. 31) beyond the space 97 surrounded by the movable members 87.

A fourteenth embodiment will now be described with reference to FIGS. 36 and 37. This embodiment is a modification of the third embodiment shown in FIG. 8 and is different from the third embodiment in that the deformation inhibiting device 14 is replaced with a deformation inhibiting device 100. As show in FIG. 36, the deformation inhibiting device 100 may include three components, i.e. a reserve cup 101 and a pair of left and right movable members 102. A strut member 104 may be constituted by the reserve cup 101 and the pair of left and right movable members 102.

The reserve cup 101 may correspond to the reserve cup 31 of the fuel pump unit 30 of the third embodiment (see FIG. 8) but may be configured as a separate member from the fuel pump unit 30. The other components, i.e., the fuel pump 32, the pressure regulator 33, etc., of the pump unit 30 than the reserve cup may be supported in a suspended manner by the cover member 13. The reserve cup 101 may have a bottomed cylindrical tubular shape. An outer diameter of the reserve cup 101 may be set to be slightly smaller than the inner diameter of the opening 16 of the fuel tank 12. A pair of left and right notched recesses 101a may be formed in the upper end surface of the reserve cup 101 to extend therethrough in the diametrical direction. Each of the notched recesses 101a may have a U-shape with an upper opening.

Figure 31:
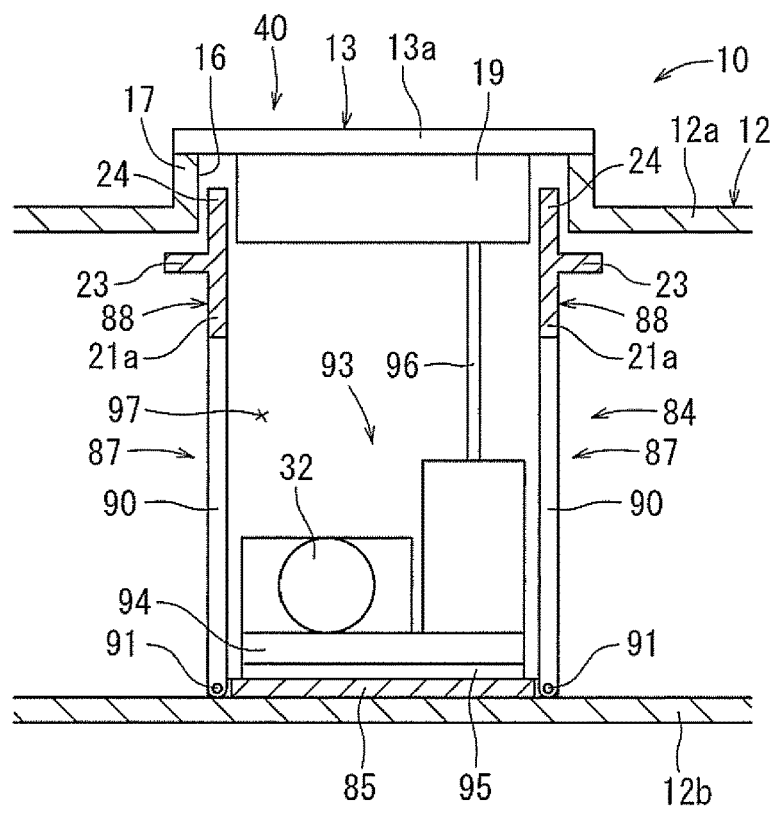
FIG. 31 is a cross-sectional side view schematically illustrating a fuel tank device according to a thirteenth embodiment.
Figure 32:
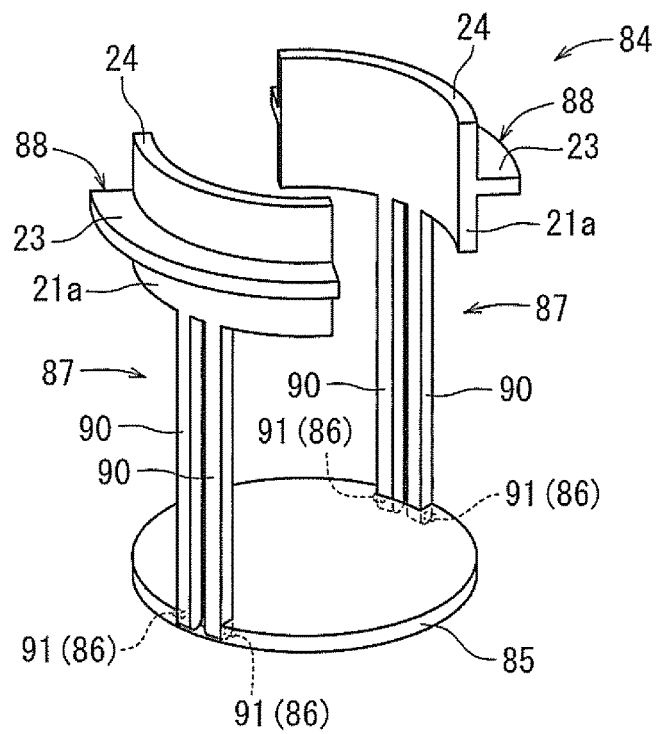
FIG. 32 is a perspective view of a deformation inhibiting device for a fuel tank of the fuel tank device shown in FIG. 31.

The basic structure of the movable member 102 may be the same as the movable member 87 of the thirteenth embodiment (see FIG. 31). Therefore, in FIGS. 36 and 37, for the movable members 102, like parts are given the same reference numerals as those of the movable members 87 and the description of these parts will be omitted. However, in this embodiment, the length of the support legs 90 of the movable members 102 is set to be shorter than the support legs 90 of the movable members 87 by a length corresponding to the length (height) of the reserve cup 101. The lower ends of the support legs 90 of each of the movable members 102 are pivotally joined to a corresponding one of the notched recesses 101a via pins 105. As a result, the movable members 102 are joined to the reserve cup 101 such that the movable members 102 can pivot (tilt) in the left and right directions relative to the reserve cup 101 (see FIG. 37). In this way, the reserve cup 101 may also serve as a joint member or a bottom support member for the movable members 102.

An assembling process for assembling the deformation inhibiting device 100 with the fuel tank 12 will now be described. First, the movable members 102 may be pivoted (tilted) in directions toward each other to enable insertion of the deformation inhibiting device 100, and in this state, the deformation inhibiting device 100 is inserted into the fuel tank 12 via the opening 16.

Figure 36:
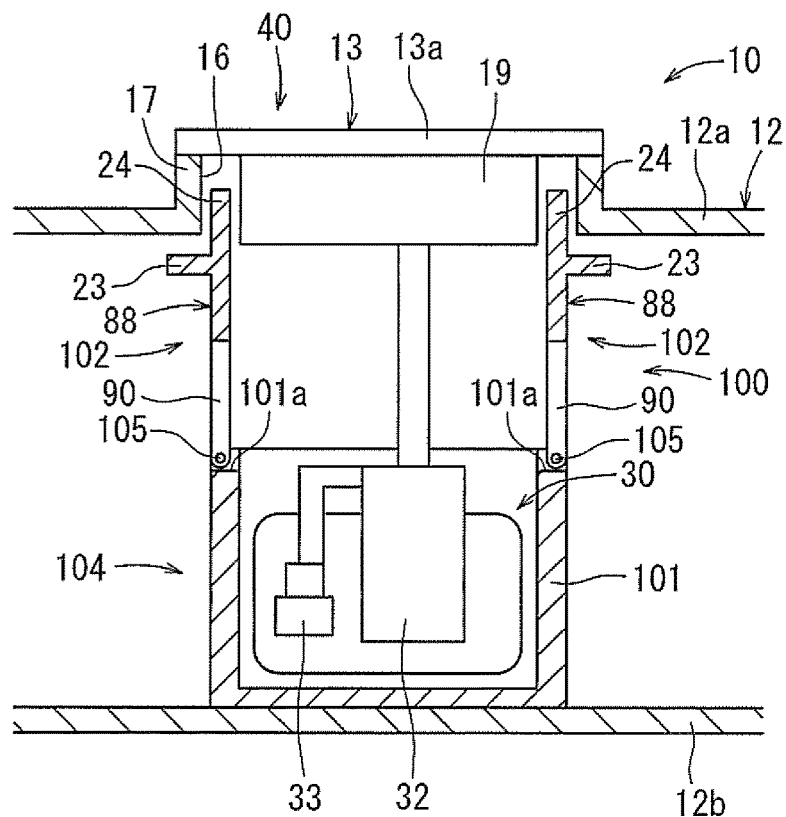
FIG. 36 is a cross-sectional side view schematically illustrating a fuel tank device according to a fourteenth embodiment.
Figure 37:
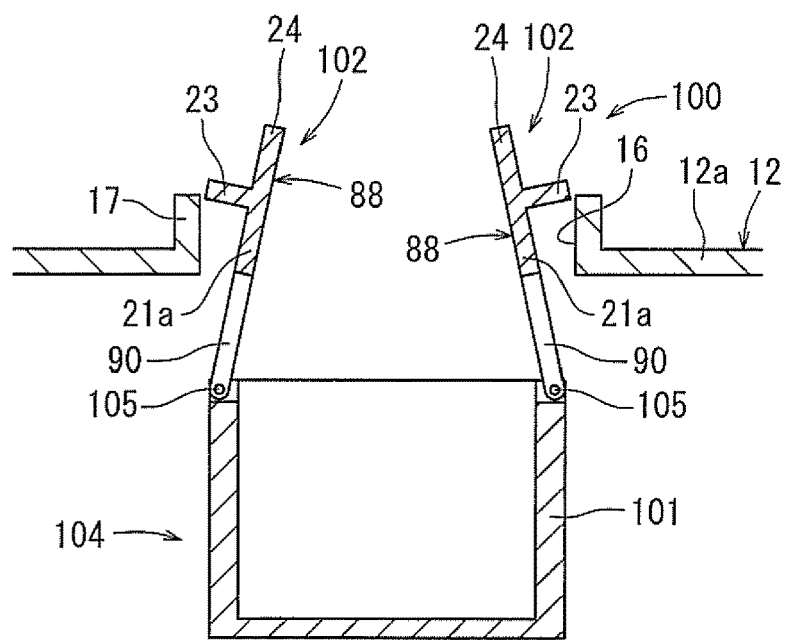
FIG. 37 is a cross-sectional side view schematically illustrating an assembling process for assembling a deformation inhibiting device into a fuel tank of the fuel tank device shown in FIG. 36.

When the reserve cup 101 has contacted the bottom wall portion 12b of the fuel tank 12, the movable members 102 may be pivoted (tilted) in directions away from each other to reach uprising positions shown in FIG. 36. After that, the other components (the fuel pump 32, the pressure regulator 33, etc.) of the fuel pump unit 30 may be inserted into the fuel tank 12 via the opening 16, and subsequently, the cover member 13 may be fixedly attached to the fuel tank 12. In this way, the other components (the fuel pump 32, the pressure regulator 33, etc.) of the fuel pump unit 30 may be arranged within the reserve cup 101.

A fifteenth embodiment will now be described with reference to FIGS. 38 and 39. This embodiment is a modification of the third embodiment shown in FIG. 8 and is different from the third embodiment in that the deformation inhibiting device 14 is replaced with a deformation inhibiting device 107. As show in FIG. 38, the deformation inhibiting device 107 may include a pair of left and right strut members 108 formed and arranged to be symmetrical with each other in the left-to-right direction with respect to the reserve cup 31. Each of the strut members 108 may include a column portion 108a as a primary portion. The column portion 108a may extend vertically. A top support portion 109 may be formed on the upper end portion of the column portion 108a, and a bottom support portion 110 may be formed on the lower end portion of the column portion 108a. The top support portions 109 of the strut members 108 may protrude from the corresponding column portions 108a in directions toward each other. Similarly, the bottom support portions 110 of the strut members 108 may protrude from the corresponding column portions 108a in directions toward each other.

The column portion 108a of each of the strut members 108 may be joined to the left side or the right side of the reserve cup 31 of the fuel pump unit 30 via a pair of upper and lower link arms 112, so that the column portion 108a can move vertically relative to the reserve cup 31. One end of each of the upper and lower link arms 112 may be pivotally joined to the reserve cup 31 via a pin 113, and the other end each of the upper and lower link arms 112 may be pivotally joined to the column portion 108a via a pin 114. Thus, each of the strut members 108 may constitute a parallel link mechanism together with the reserve cup 31 and the upper and lower link arms 112.

An assembling process for assembling the deformation inhibiting device 107 with the fuel tank 12 will now be described. First, the strut members 108 may be moved downward relative to the reserve cup 31 for moving the strut members 108 toward the reserve cup 31, so that insertion of the deformation inhibiting device 107 into the opening 16 of the fuel tank 12 is enabled, and in this state, the deformation inhibiting device 107 is inserted into the fuel tank 12 via the opening 16 together with the fuel supply device 40 as shown in FIG. 39.

Figure 38:
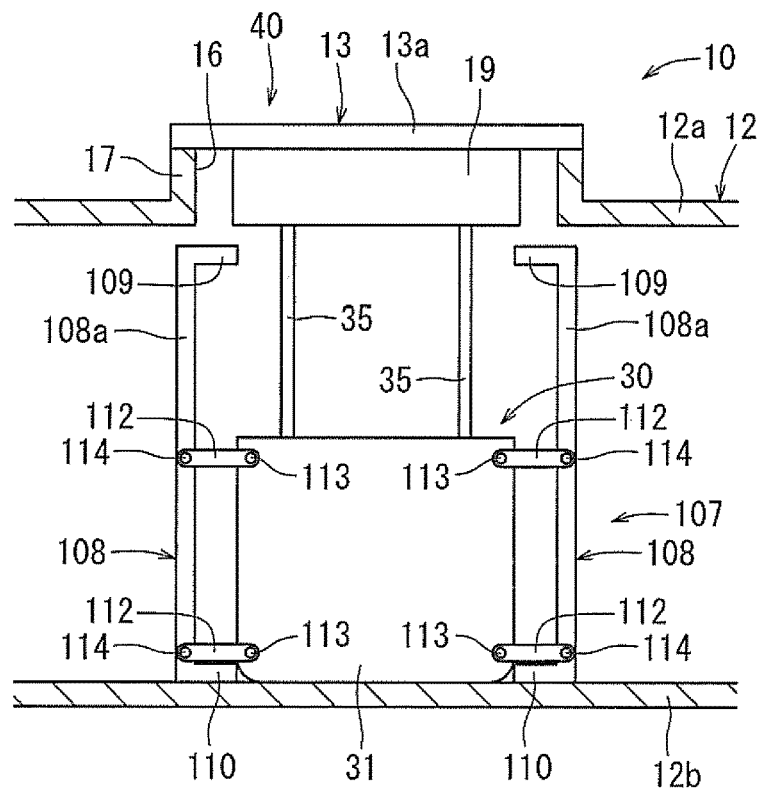
FIG. 38 is a cross-sectional side view schematically illustrating a fuel tank device according to a fifteenth embodiment.
Figure 39:
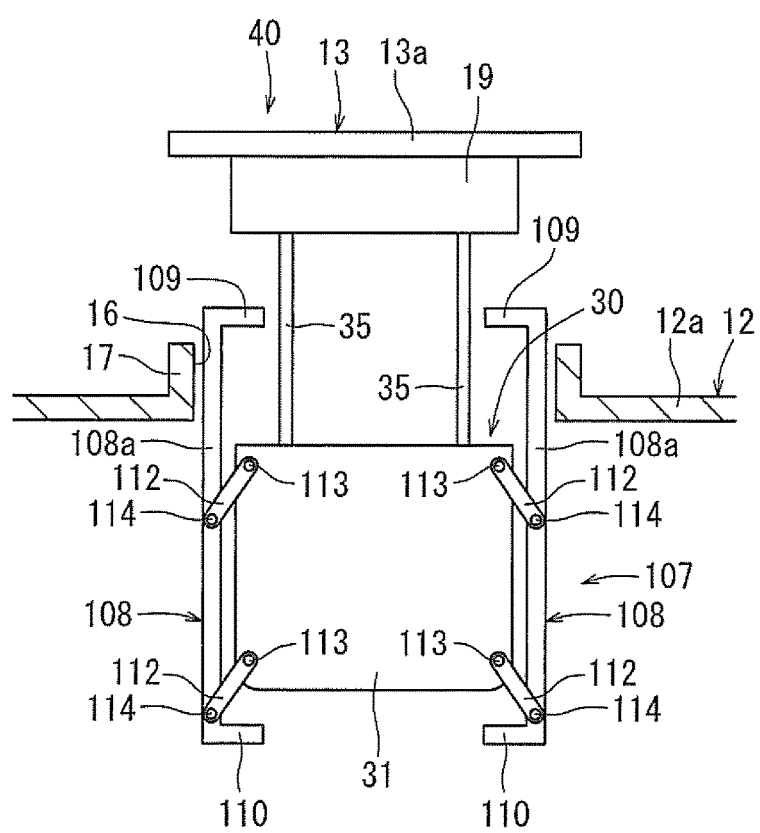
FIG. 39 is a cross-sectional side view schematically illustrating an assembling process for assembling a deformation inhibiting device into a fuel tank of the fuel tank device shown in FIG. 38.

When the bottom support portions 110 have contacted the bottom wall portion 12b of the fuel tank 12, the user may press the fuel supply device 40 downward, so that the strut members 108 may move away from each other through the pivotal movement of the link arms 112 to reach positions shown in FIG. 38. In this way, it is possible to position the strut members 108 to be interposed between the top wall portion 12a and the bottom wall portion 12b of the fuel tank 12.

Figure 40:
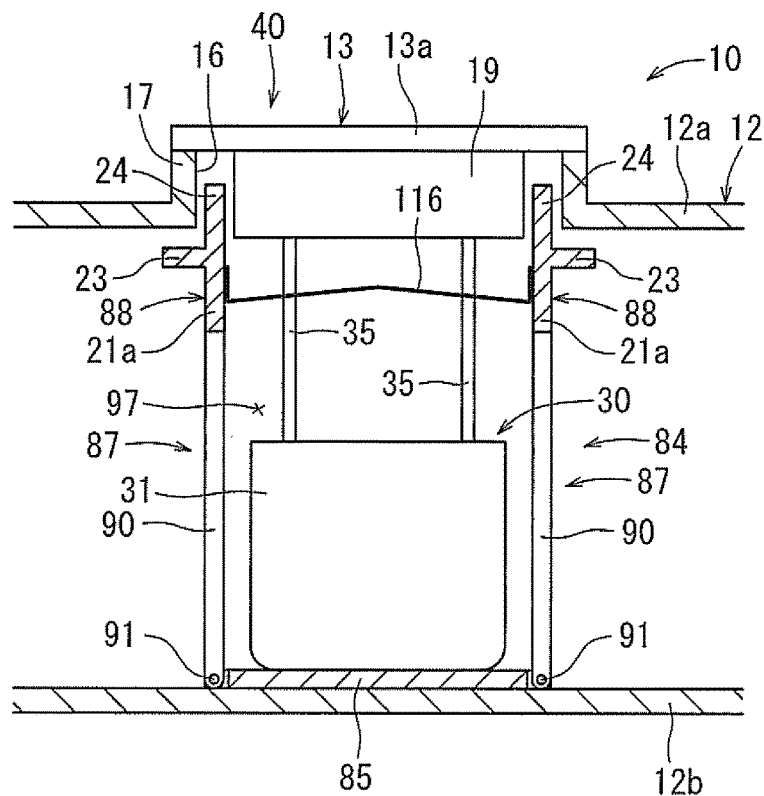
FIG. 40 is a cross-sectional side view schematically illustrating a fuel tank device according to a sixteenth embodiment.
Figure 41:
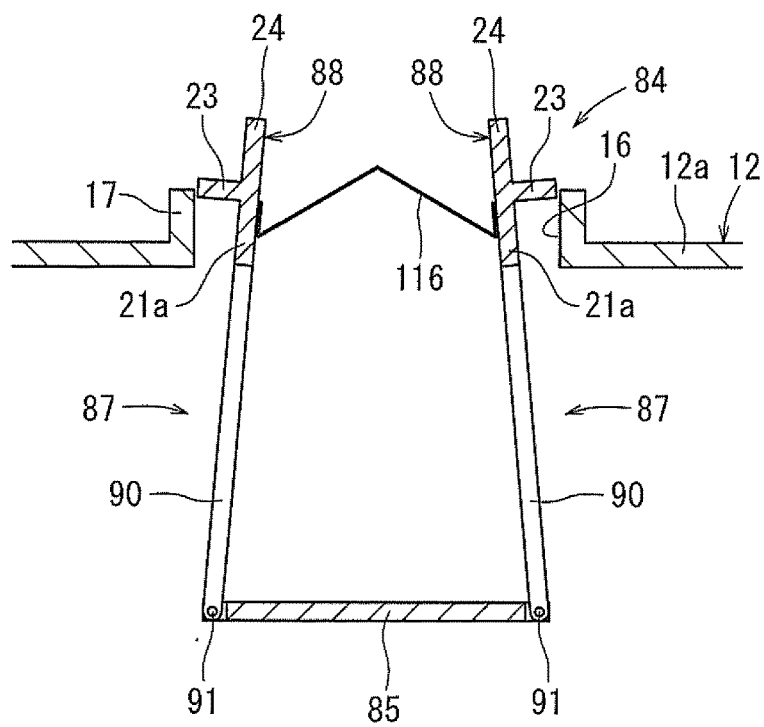
FIG. 41 is a cross-sectional side view schematically illustrating an assembling process for assembling a deformation inhibiting device into a fuel tank of the fuel tank device shown in FIG. 40.

A sixteenth embodiment will now be described with reference to FIGS. 40 and 41. As shown in FIG. 40, this embodiment is a modification of the thirteenth embodiment shown in FIG. 31 and is different from the thirteenth embodiment in that the fuel pump unit 93 is replaced with the fuel pump unit 30 of the third embodiment (see FIG. 8). In addition, in this embodiment, a biasing spring 116 formed of an angle-shaped leaf spring may be interposed between the upper end portions of the movable members 87 of the deformation inhibiting device 84. The biasing spring 116 has opposite ends respectively joined to the upper portions of the movable members 87.

An assembling process for assembling the deformation inhibiting device 84 of this embodiment with the fuel tank 12 will now be described. First, the user may move (pinch) the movable members 87 of the deformation inhibiting device 84 so as to be tilted toward each other against the biasing force of the biasing spring 116, so that insertion of the deformation inhibiting device 84 into the opening 16 of the fuel tank 12 is enabled, and in this state, the deformation inhibiting device 84 is inserted into the fuel tank 12 via the opening 16 as shown in FIG. 41. When the joint plate 85 of the deformation inhibiting device 84 has contacted the bottom wall portion 12b of the fuel tank 12, the user may release the moving forces (pinching forces) applied to the movable members 87, so that the movable members 87 may move (tilt) away from each other to reach uprising positions shown in FIG. 40 by the biasing force of the biasing spring 116.

Figure 42:
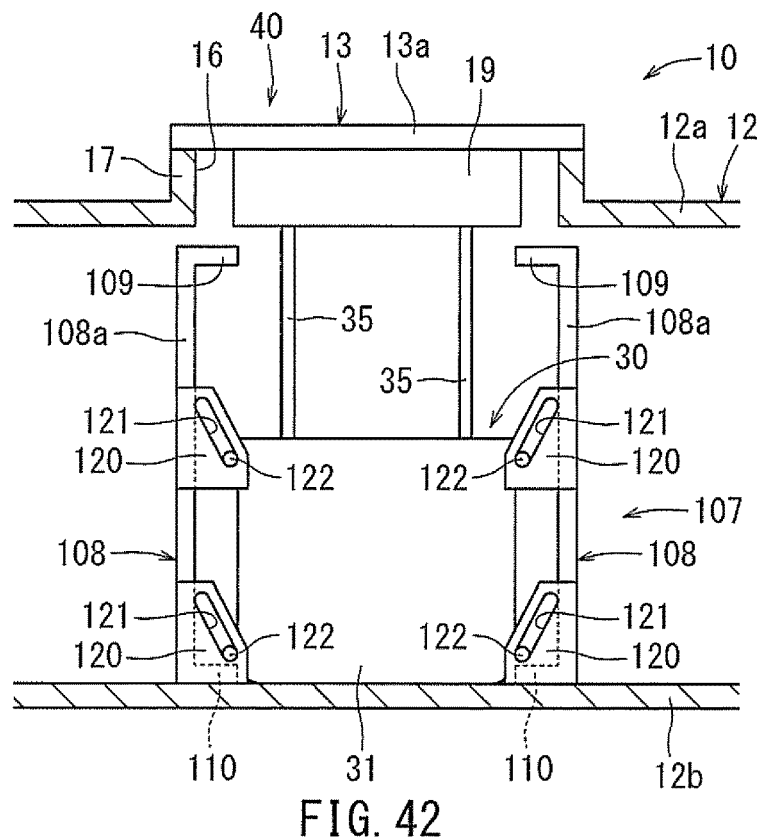
FIG. 42 is a cross-sectional side view schematically illustrating a fuel tank device according to a seventeenth embodiment.
Figure 43:
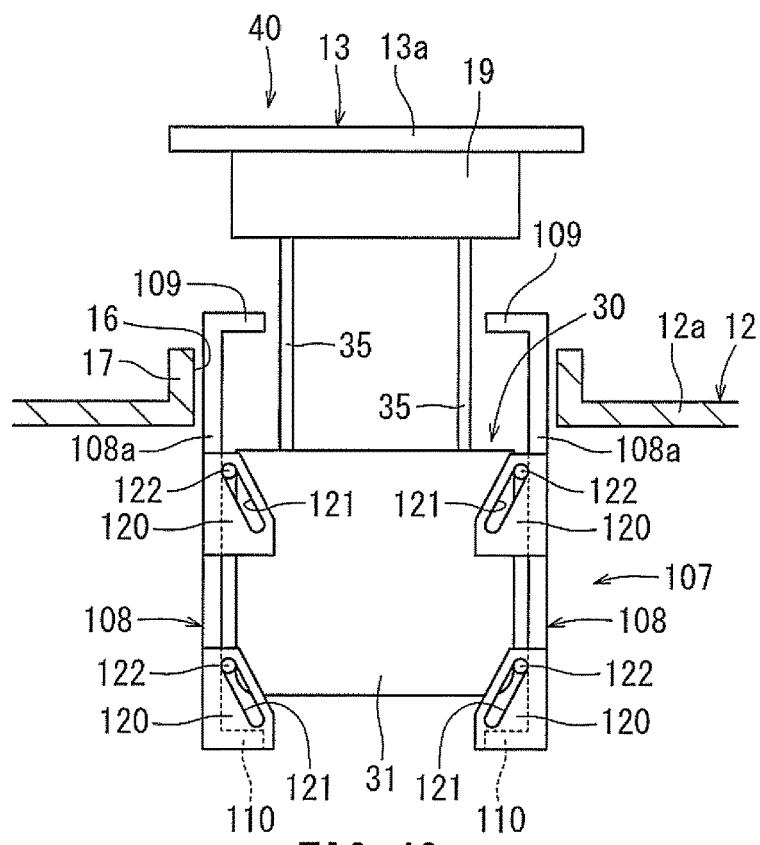
FIG. 43 is a cross-sectional side view schematically illustrating an assembling process for assembling a deformation inhibiting device into a fuel tank of the fuel tank device shown in FIG. 42.

A seventeenth embodiment will now be described with reference to FIGS. 42 and 43. As shown in FIG. 42, this embodiment is a modification of the fifteenth embodiment shown in FIG. 38 and is different from the fifteenth embodiment in that the parallel link mechanism that joins the strut member 108 to the reserve cup 31 is replaced with a cam mechanism. The cam mechanism may include a pair of upper and lower cam plates 120 and a pair of pins 122. The cam plates 120 may be attached to the column portion 108a of each of the strut members 108, and the pins 122 may be attached to the reserve cup 31. Each of the cam plates 120 may include an elongated cam slot 121 extending obliquely downward from the side of the strut member 108 toward the side of the reserve cup 31. The pair of pins 122 may respectively slidably engage the cam slots 121 of the pair of upper and lower cam plate 120.

An assembling process for assembling the deformation inhibiting device 107 of this embodiment with the fuel tank 12 will now be described. First, the strut members 108 may be moved downward relative to the reserve cup 31, so that the strut members 108 moves toward the reserve cup 31. Hence, insertion of the deformation inhibiting device 107 into the opening 16 of the fuel tank 12 is enabled. Thus, in this state, each of the pins 122 may be positioned at the upper end of the corresponding cam slot 121, so that each of the strut members 108 is positioned closer to the reserve cup 31. The deformation inhibiting device 107 may then be inserted into the fuel tank 12 via the opening 16 together with the fuel supply device 40.

When the bottom support portions 110 have contacted the bottom wall portion 12b of the fuel tank 12, the user may press the fuel supply device 40 downward, so that the strut members 108 may move away from each other through the sliding movement of the pins 122 along the corresponding cam slots 121 of the cam plates 120 to reach positions shown in FIG. 42. In this way, it is possible to position the strut members 108 to be interposed between the top wall portion 12a and the bottom wall portion 12b of the fuel tank 12.

Figure 44:
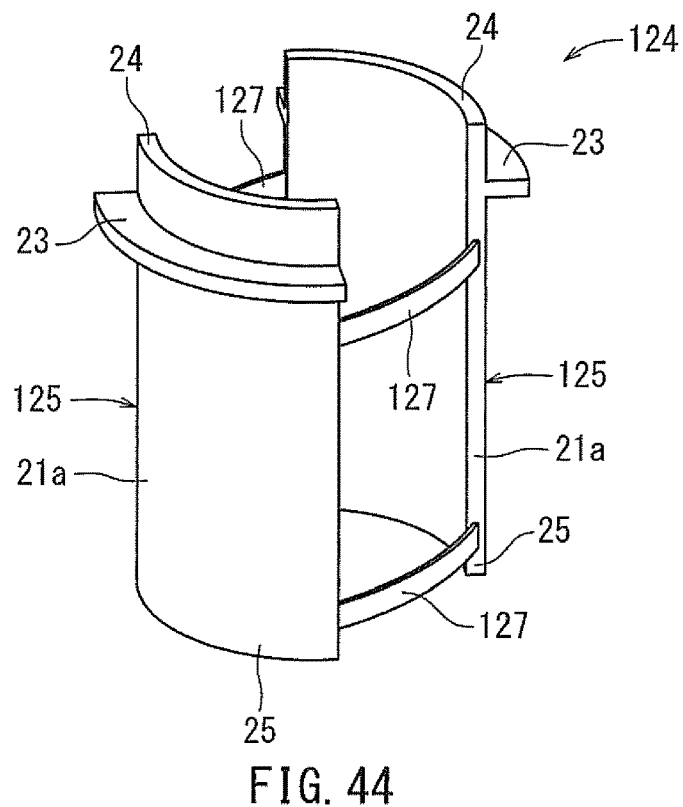
FIG. 44 is a perspective view illustrating a deformation inhibiting device for a fuel tank according to an eighteenth embodiment.

An eighteenth embodiment will now be described with reference to FIG. 44. Referring to FIG. 44, there is shown a deformation inhibiting device 124 that is a modification of the deformation inhibiting device 14 of the first embodiment (see FIG. 3). In the deformation inhibiting device 124, the joint plate 22 provided in the deformation inhibiting device 14 is omitted. Therefore, the strut portions 21 (see FIG. 3) of the first embodiment are modified as strut portions 125 that are separate components from each other. The strut portions 125 may be joined to each other via front and rear connection devices each including a pair of upper and lower connection springs 127 that may be band-shaped leaf springs. The deformation inhibiting device 124 may be deformed to be able to be inserted into the fuel tank 12 via the opening 16 by moving the strut portions 21 toward each other through elastic deformation of the connection springs 127. For this reason, in this embodiment, it is not necessary that the strut portions 125 themselves can elastically deform.

Figure 45:
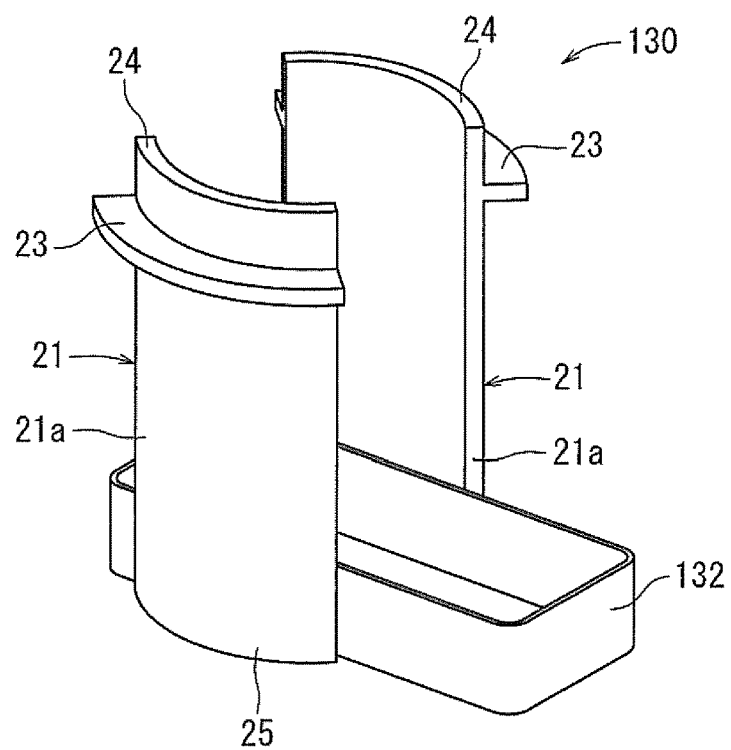
FIG. 45 is a perspective view illustrating a deformation inhibiting device for a fuel tank according to a nineteenth embodiment.

A nineteenth embodiment will now be described with reference to FIG. 45. Referring to FIG. 45, there is shown a deformation inhibiting device 130 that is a modification of the deformation inhibiting device 14 of the first embodiment (see FIG. 3). In the deformation inhibiting device 130, the joint plate 22 provided in the deformation inhibiting device 14 is replaced with a reserve cup portion 132. The reserve cup portion 132 is formed to have a rectangular box shape elongated in the front-to-rear direction and having an upper opening. The lower ends of the strut portions 21 may be joined to the left and right side outer surfaces of the reserve cup portion 132. In this way, the reserve cup portion 132 may serve as the joint member or the bottom support portion.

Figure 46:
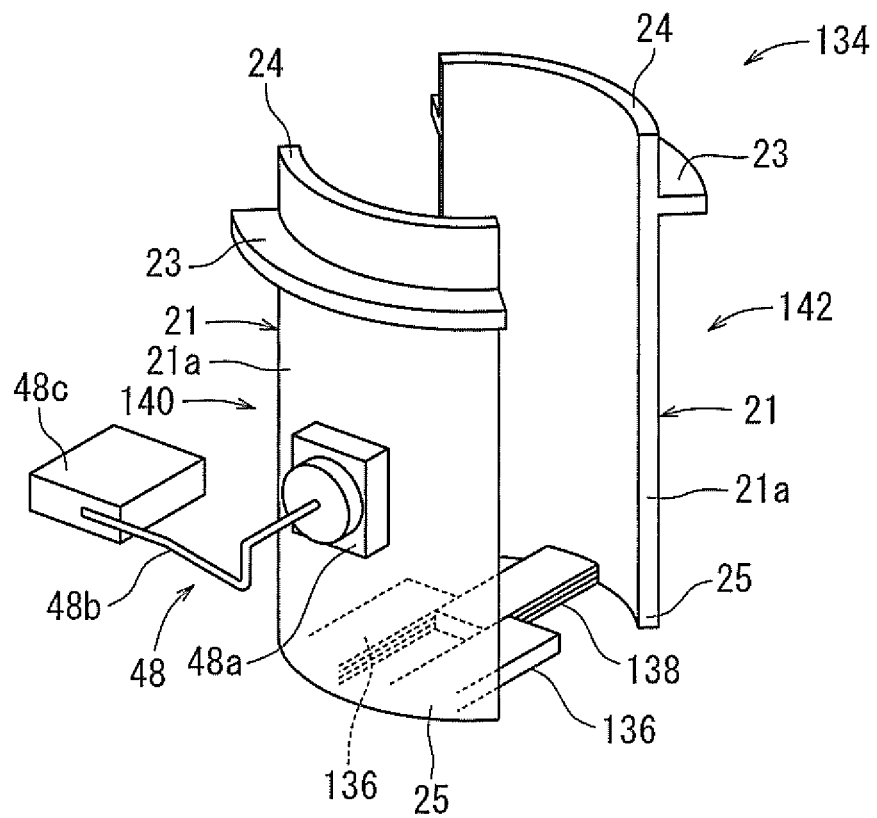
FIG. 46 is a perspective view illustrating a deformation inhibiting device for a fuel tank according to a twentieth embodiment.
Figure 47:
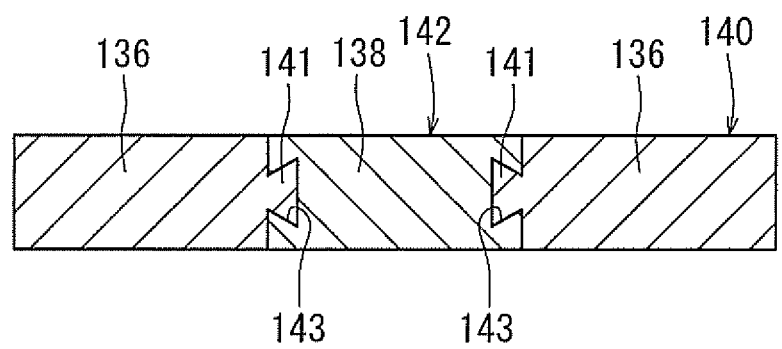
FIG. 47 is a cross-sectional side view of a slide mechanism of the deformation inhibiting device shown in FIG. 46.

A twentieth embodiment will now be described with reference to FIGS. 46 and 47. Referring to FIG. 46, there is shown a deformation inhibiting device 134 that is a modification of the deformation inhibiting device 14 of the first embodiment (see FIG. 3). In the deformation inhibiting device 134, the joint plate 22 provided in the deformation inhibiting device 14 is replaced with a pair of left side plate portions 136 and a right side plate portion 138. The pair of left side plate portions 136 may be formed integrally with the lower end portion of one of the strut portions 21 disposed on the left side, and the right side plate portion 138 may be formed integrally with the lower end portion of the other of the strut portions 21 disposed on the right side. The pair of left side plate portions 136 may be arranged in the front-to-rear direction such that the right side plate portion 138 is positioned between the pair of left side plate portions 136. The left side strut portion 21 and the pair of left side plate portions 136 may constitute a left side strut member 140, and the right side strut portion 21 and the right side plate portion 138 may constitute a right side strut member 142.

The left side strut member 140 and the right side strut member 142 are joined to each other such that they can slide relative to each other in the left-to-right direction. To this end, as shown in FIG. 47, a guide projection 141 configured like a dovetail tenon may be formed on one side of each of the left side plate portions 136 facing the right side strut member 142, and a pair of guide grooves 143 configured like dovetail grooves may be formed on opposite sides of the right side plate portion 138 for slidably engaging the guide projections 141 of the left side plate portions 136. Therefore, the guide projections 141 and the guide grooves 143 may constitute a slide mechanism for the left and right side strut members 140 and 142. In this way, the plate portions 136 and 138 may serve as joint device or a bottom support device.

The deformation inhibiting device 124 may be deformed to be able to be inserted into the fuel tank 12 via the opening 16 by slidably moving the left and right side strut members 140 and 142 toward each other. The strut members 140 and 142 may be interposed between the top wall portion 12a and the bottom wall portion 12b of the fuel tank 12 by slidably moving the strut members 140 and 142 away from each other. For this reason, in this embodiment, it is not necessary that the strut portions 21 themselves can elastically deform.

Further, in this embodiment, the sender gauge 48 as explained in connection with the fifth embodiment (see FIGS. 10 and 11) may be attached to the outer side surface of the strut portion 21 of one of the left and right strut members 140 and 142. In this embodiment, the sender gauge 48 is attached to the strut portion 21 of the left side strut member 140. More specifically, the gauge body 48a of the sender gauge 48 is attached to the strut portion 21 of the left side strut member 140. Therefore, the sender gauge 48 can be inserted into the fuel tank 12 via the opening 16 together with the deformation inhibiting device 124. Therefore, the assembling operation of the sender gauge 48 into the fuel tank 12 can be efficiently performed. In addition, in comparison with the arrangement in which the sender gauge 48 is disposed on the side of the fuel pump unit, it is possible to minimize the size of the fuel pump unit.

Figure 48:
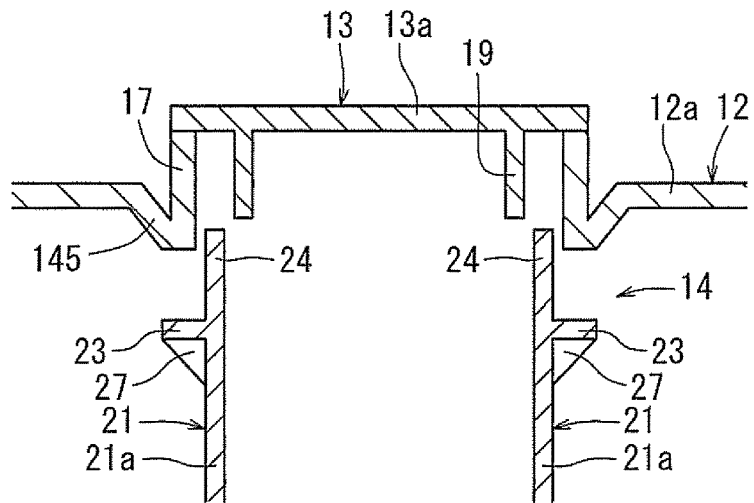
FIG. 48 is a cross-sectional side view schematically illustrating an opening edge portion of a fuel tank according to a twenty-first embodiment.
Figure 49:
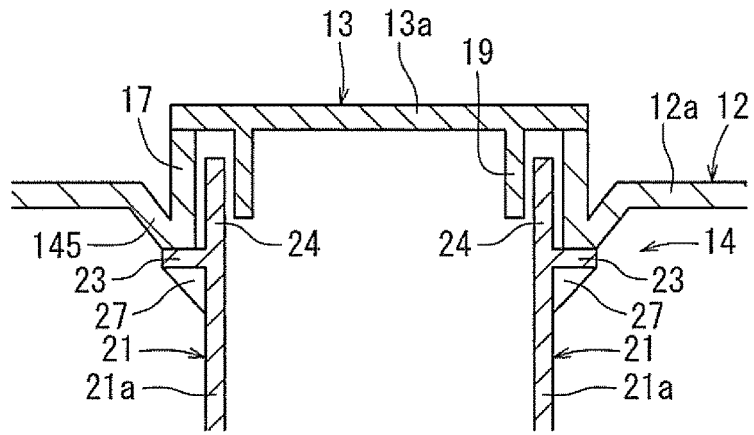
FIG. 49 is a cross-sectional side view of the opening edge portion of the fuel tank of FIG. 48 similar to FIG. 48 but illustrating a state where the fuel tank has been deformed to contract.

A twenty-first embodiment will now be described with reference to FIGS. 48 and 49. As shown in FIG. 48, the twenty-first embodiment is a modification of the first embodiment (see FIG. 1) and is different from the first embodiment in the configuration of the fuel tank 12. More specifically, an annular concave wall portion 145 having a substantially U-shape (or V-shape) in a cross section is formed on the upper wall portion 12a of the fuel tank 12 to surround the opening edge portion 17 in continuity therewith. Therefore, the length of the opening edge portion 17 in the axial direction (i.e., the vertical direction) of this embodiment is longer than the length of the opening edge portion 17 of the first embodiment. As a result, it is possible to increase a range for allowance of expanding/contracting deformation of the fuel tank 12 caused by the change in its internal pressure. FIG. 49 schematically illustrates the opening edge portion 17 of the fuel tank 12 of this embodiment when the fuel tank 12 has contracted.

Figure 50:
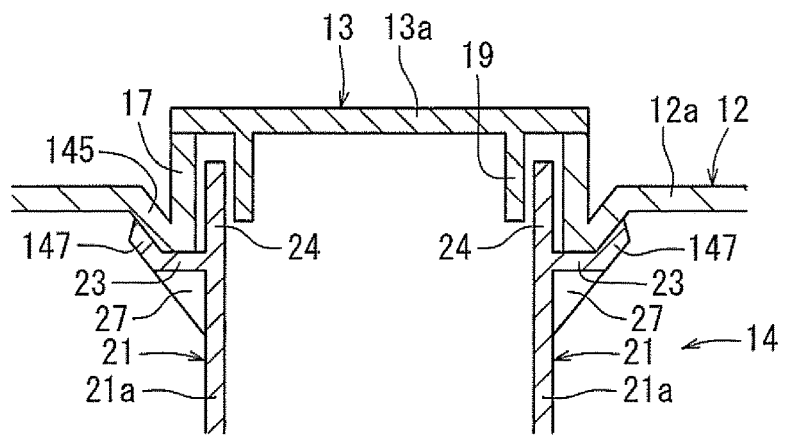
FIG. 50 is a cross-sectional side view schematically illustrating an opening edge portion of a fuel tank according to a twenty-second embodiment.

A twenty-second embodiment will now be described with reference to FIG. 50. As shown in FIG. 50, the twenty-second embodiment is a modification of the twenty-first embodiment (see FIG. 49) and is different from the twenty-first embodiment in that an annular surrounding wall 147 is formed on the outer periphery of the top support portion 23 of the deformation inhibiting device 14. The annular surrounding wall 147 may be configured to fit with the annular concave wall portion 145 when the fuel tank 12 has contracted as shown in FIG. 50. Therefore, it is possible to reliably inhibit the horizontal shifting movement of the deformation inhibiting device 14 relative to the fuel tank 12.

Figure 51:
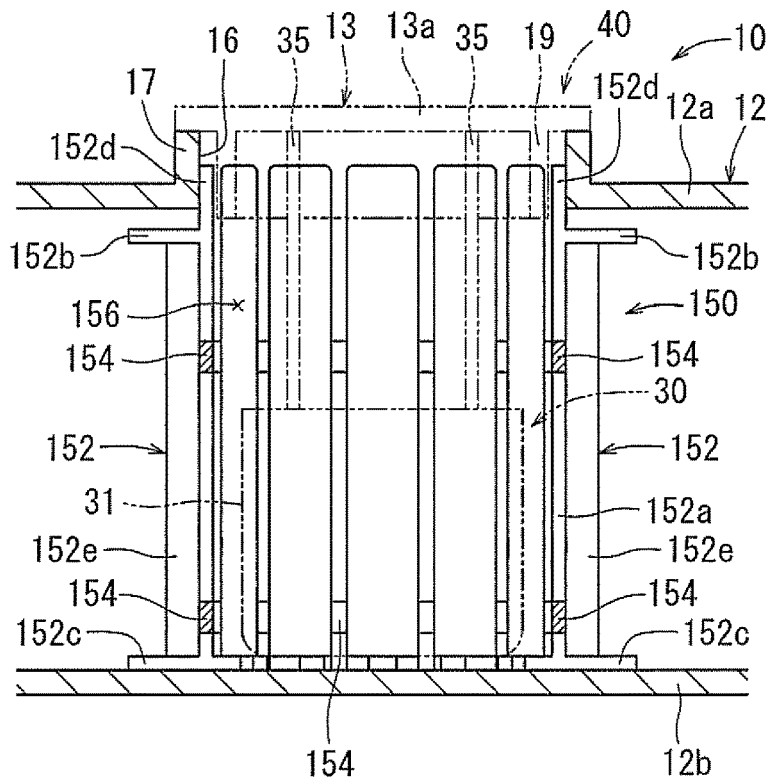
FIG. 51 is a cross-sectional side view schematically illustrating a fuel tank device according to a twenty-third embodiment.
Figure 52:
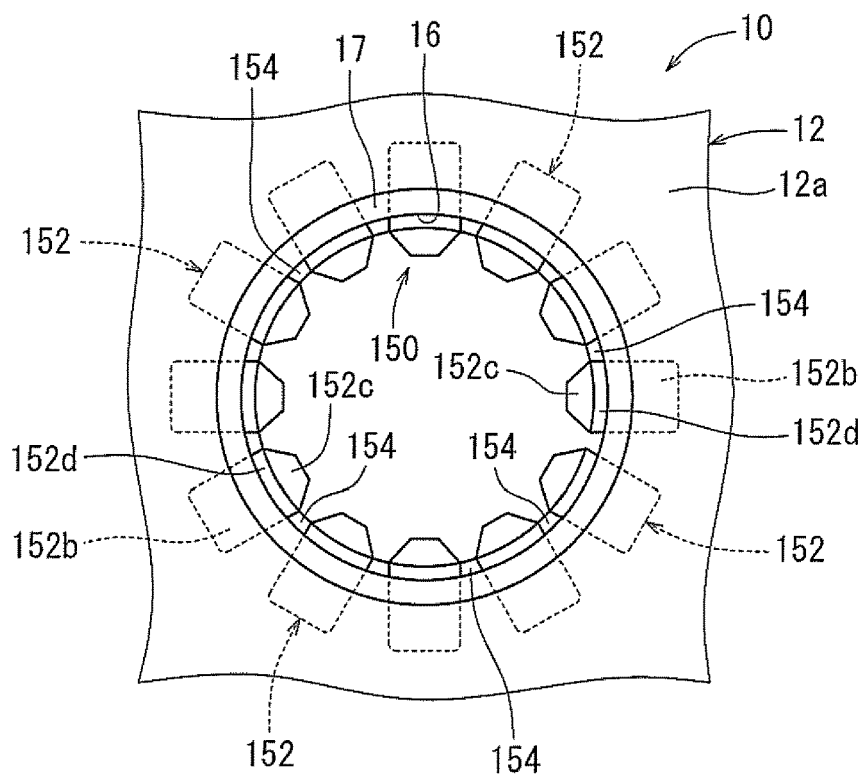
FIG. 52 is a plan view illustrating an opening edge portion of a fuel tank of the fuel tank device shown in FIG. 51.

A twenty-third embodiment will now be described with reference to FIGS. 51 to 55. Referring to FIGS. 51 and 52, a deformation inhibiting device 150 of this embodiment may have a substantially hollow cylindrical tubular shape when arranged within the fuel tank 12. The deformation inhibiting device 150 may have a substantially flat shape when it is developed as shown in FIG. 53.

Figure 53:
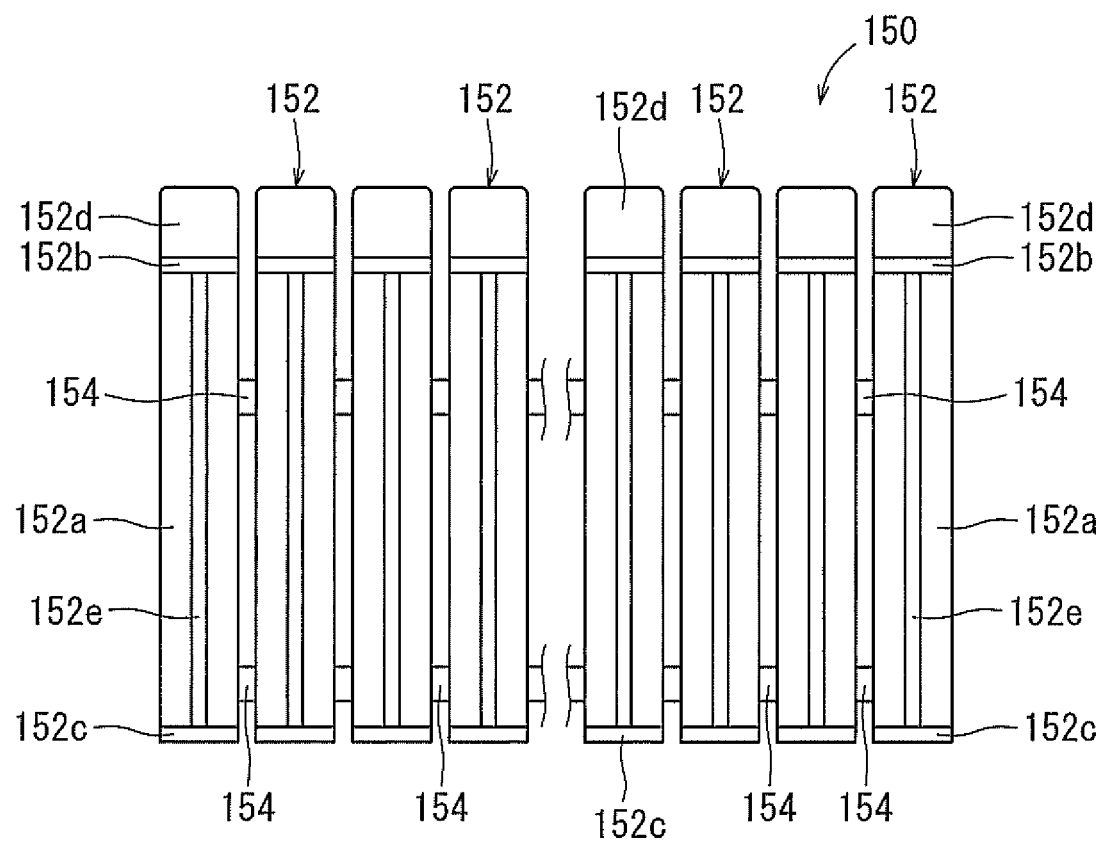
FIG. 53 is a front view in a developed form of a deformation inhibiting device for the fuel tank of the fuel tank device shown in FIG. 51.
Figure 54:
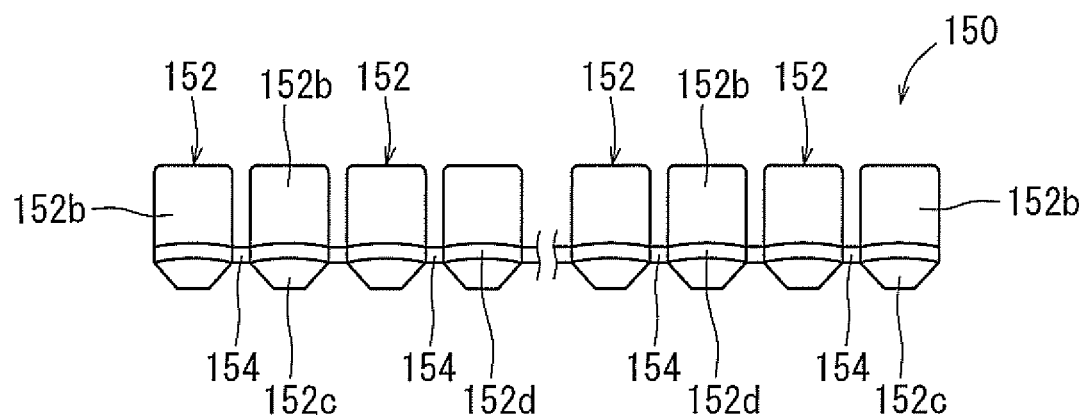
FIG. 54 is a plan view in the developed form of the deformation inhibiting device shown in FIG. 53.
Figure 55:
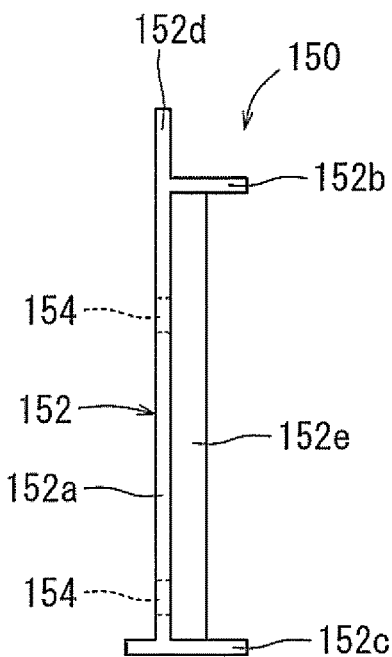
FIG. 55 is a side view in the developed form of the deformation inhibiting device shown in FIG. 53.

As shown in FIGS. 53 and 54, the deformation inhibiting device 150 may include a plurality of strut members 152 and a pair of upper and lower joint members 154 that may join the strut members 152 to each other such that the strut members 152 are arranged in series with each other. As shown in FIG. 55, each of the strut members 152 may include a strut portion 152a having a shape of a band plate and extending in the vertical direction, an top support portion 152b protruding outward (rightward as viewed in FIG. 55) from the upper end of the strut portion 152a, and a bottom support portion 152c protruding both outward and inward (both rightward and leftward as viewed in FIG. 55) from the lower end of the strut portion 152a. An engaging portion 152d may be formed on the upper end of the strut portion 152a to extend upward therefrom, so that the engaging portion 152d is positioned on the upper side of the top support portion 152c. A linear rib 152c is formed on the outer side surface (right side surface as viewed in FIG. 55) of the strut portion 12a to extend vertically along the outer side surface (see FIG. 53).

The upper and lower joint members 154 may have elasticity or flexibility and may extend across the strut members 152 arranged in series with each other.

Figure 56:
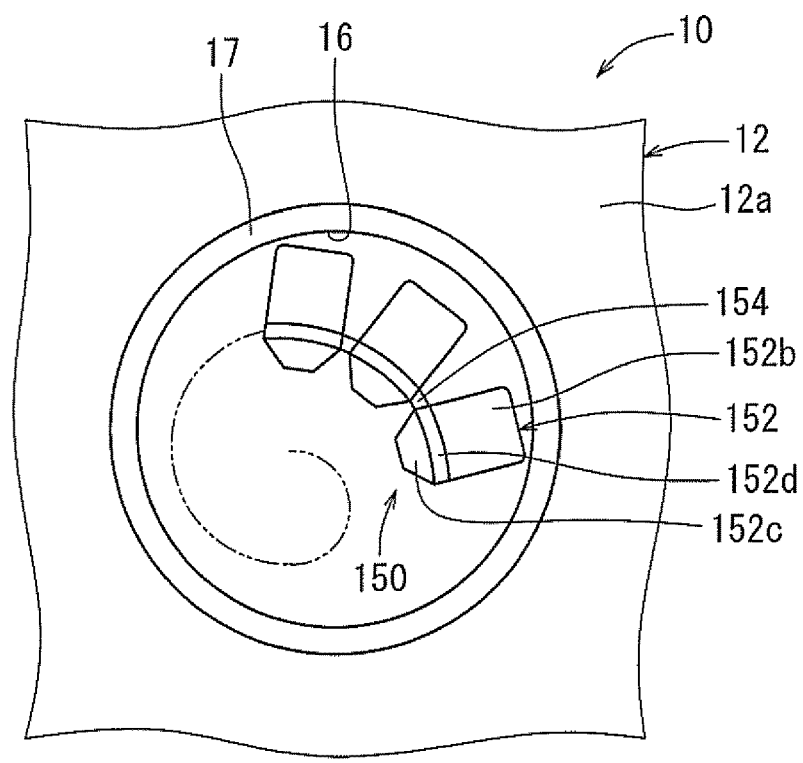
FIG. 56 is a plan view in an insertion enabled state of the deformation inhibiting device shown in FIG. 53.

An assembling process for assembling the deformation inhibiting device 150 of this embodiment with the fuel tank 12 will now be described. First, the user may roll the deformation inhibiting device 150 into a spiral form and insert it into the fuel tank 12 via the opening 16 as shown in FIG. 56.

When the bottom support portions 152c of the strut members 152 have contacted the bottom wall portion 12b of the fuel tank 12, the user may develop the deformation inhibiting device 150 from the spiral form into a substantially tubular form such that the engaging portions 152d contact the opening edge portion 17 or are positioned proximal to the opening edge portion 17 as shown in FIGS. 51 and 52. As a result, it is possible to position the strut members 152 to be interposed between the top wall portion 12a and the bottom wall portion 12b of the fuel tank 12.

The fuel supply device 40 as described in connection with the third embodiment (see FIG. 8) may be used in this embodiment, and after the aforementioned process, the fuel supply device 40 may be inserted into the fuel tank 12 (see two-dot chain lines 40 in FIG. 51), so that the fuel pump unit 30 may be located within a space 156 surrounded by the strut members 152.

According to this embodiment, because the reserve cup 31 may be surrounded by the strut members 153 of the deformation inhibiting device 150, it may be possible to reduce a potential sloshing noise. In addition, it may be possible to inhibit spilling of the fuel from the reserve cup 31.

Figure 57:
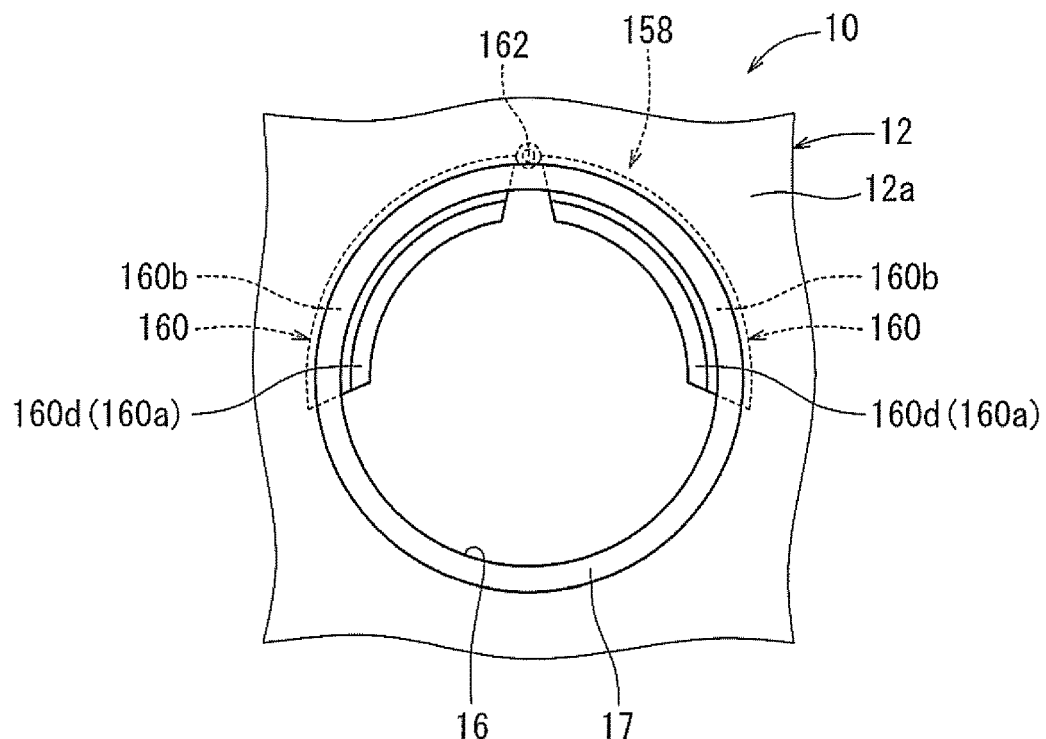
FIG. 57 is a plan view illustrating a peripheral portion of an opening of a fuel tank of a fuel tank device according to a twenty-fourth embodiment.
Figure 58:
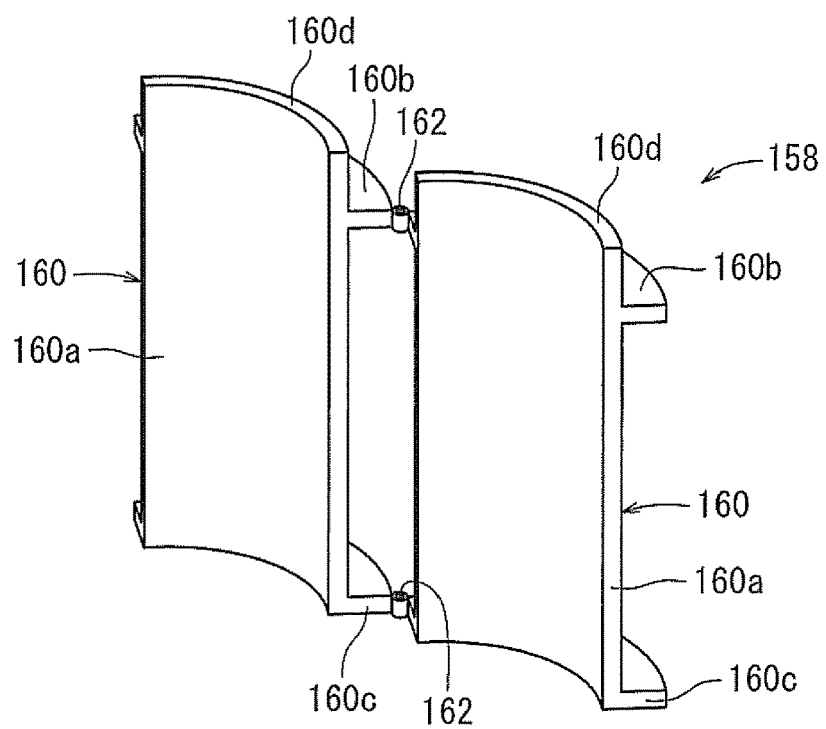
FIG. 58 is a perspective view of a deformation inhibiting device for the fuel tank of the fuel tank device shown in FIG. 57.
Figure 59:
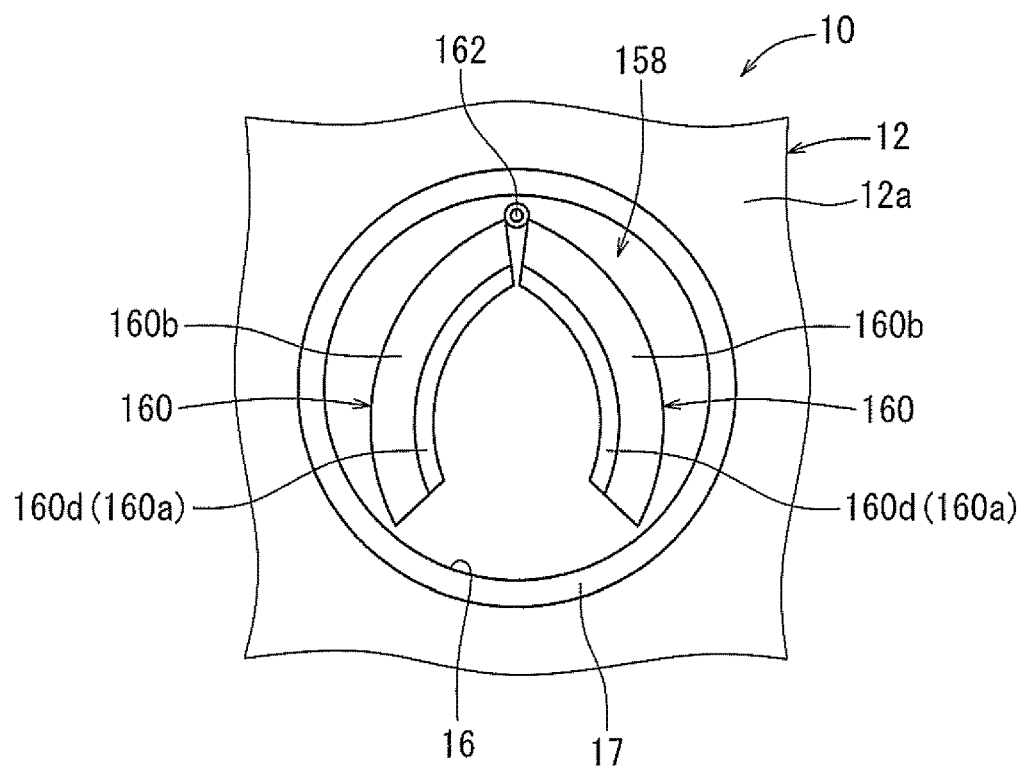
FIG. 59 is a plan view similar to FIG. 57 but showing the deformation inhibiting device in a folded state.

A twenty-fourth embodiment will now be described with reference to FIGS. 57 to 59. As shown in FIG. 58, a deformation inhibiting device 158 of this embodiment may include a pair of strut members 160. Each of the strut members 160 may include a column portion 160a extending in the vertical direction and having a plate shape curved along an arc, an top support portion 160b protruding radially outward from the upper end of the column portion 160a, and a bottom support portion 160c protruding radially outward from the lower end of the column portion 160a. An engaging portion 160d may be formed on the upper end of the column portion 160a to extend upward therefrom, so that the engaging portion 160d is positioned on the upper side of the top support portion 160b.

The strut members 160 may be arranged side-by-side and may be pivotally joined to each other via upper and lower hinge pins 162 respectively connecting between the corner portions of the top support portion 160b and between the corner portions of the bottom support portions 160c. In this way, the hinge pins 162 may serve as a joint device for joining the strut members 160 to each other.

An assembling process for assembling the deformation inhibiting device 158 of this embodiment with the fuel tank 12 will now be described. First, the user may pivot the strut members 160 toward each other to fold the deformation inhibiting device 158 as shown in FIG. 59, so that insertion of the deformation inhibiting device 158 into the opening 16 of the fuel tank 12 is enabled. In this state, the deformation inhibiting device 158 may be inserted into the opening 16 of the fuel tank 12. After that, the strut members 160 may be pivoted away from each other to develop the deformation inhibiting device 158 such that the engaging portions 160d of the strut members 160 contact the opening edge portion 17 or are positioned proximal to the opening edge portion 17.

Figure 60:
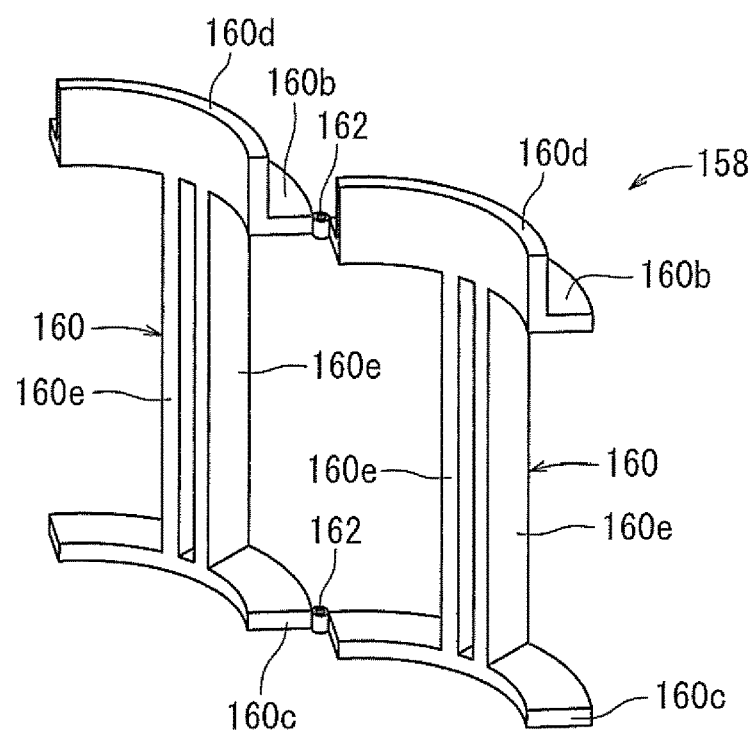
FIG. 60 is a perspective view of a deformation inhibiting device for a fuel tank according to a twenty-fifth embodiment.

A twenty-fifth embodiment will now be described with reference to FIG. 60. This embodiment is a modification of the twenty-fourth embodiment (see FIG. 58) and is different from the twenty-fourth embodiment in that the column portion 160a of each of the strut members 160 is replaced with a pair of column portions 160e each having a band-plate shape. More specifically, the column portions 160e may be arranged parallel to each other with their thickness directions oriented in the circumferential direction of the top support portion 160b or the lower support portion 160c. The number of the column portions 160e may not be limited to two but may be three or more.

Figure 61:
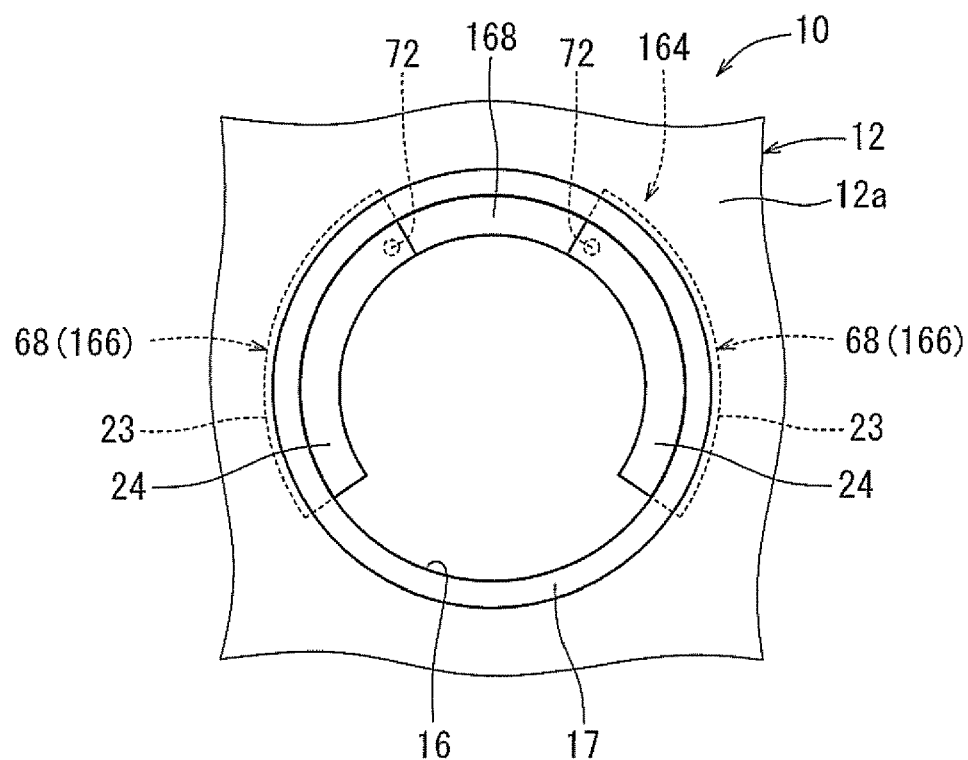
FIG. 61 is a plan view illustrating a peripheral portion of an opening of a fuel tank of a fuel tank device according to a twenty-sixth embodiment.
Figure 62:
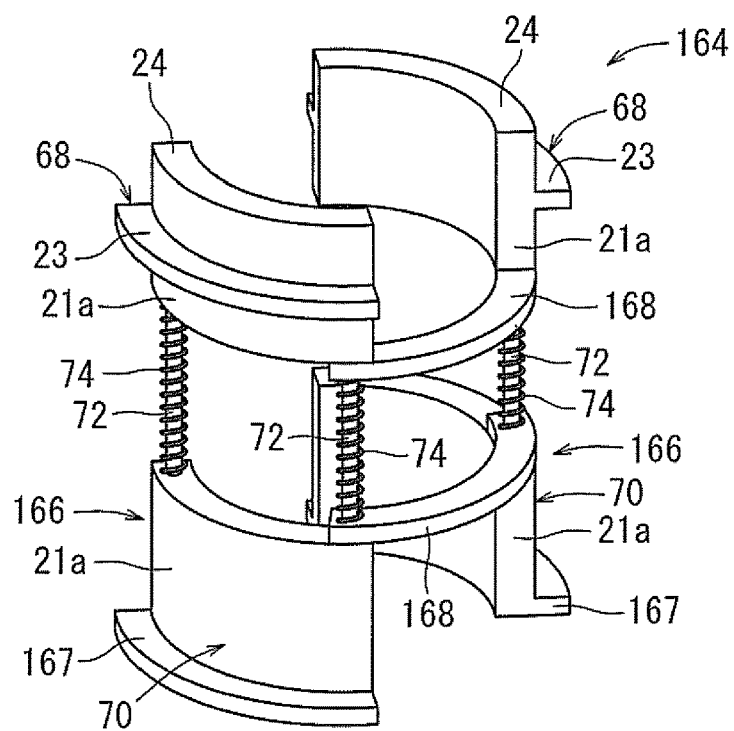
FIG. 62 is a perspective view of a deformation inhibiting device for the fuel tank of the fuel tank device shown in FIG. 61.

A twenty-sixth embodiment will now be described with reference to FIGS. 61 and 62. This embodiment is a modification of the eleventh embodiment (see FIG. 25) and is different from the eleventh embodiment in that a deformation inhibiting device 164 is not provided with the joint plate 22 that is provided in the deformation inhibiting device 14 of the eleventh embodiment. In this connection, the strut portions 21 of the tank deformation inhibiting device 14 are modified as separate strut members 166, and a bottom support portion 167 is formed on the lower end of each of the lower half portions 70 to protrude radially outward therefrom. The deformation inhibiting device 164 may include a pair of upper and lower joint arms 168 each having an arcuate plate shape. Each of the upper and lower joint arms 168 may have opposite circumferential ends that are respectively pivotally joined to one of the guide rods 72 of one of the strut members 166 and to one of the guide rods 72 of the other of the strut members 166. The upper joint arm 168 may be interposed between the upper half portions 68 and the biasing springs 74, and the lower joint arm 168 may be interposed between the lower half portions 70 and the biasing springs 74. In this way, the joint arms 168 may serve as a joint device for joining the strut members 166 to each other.

Figure 63:
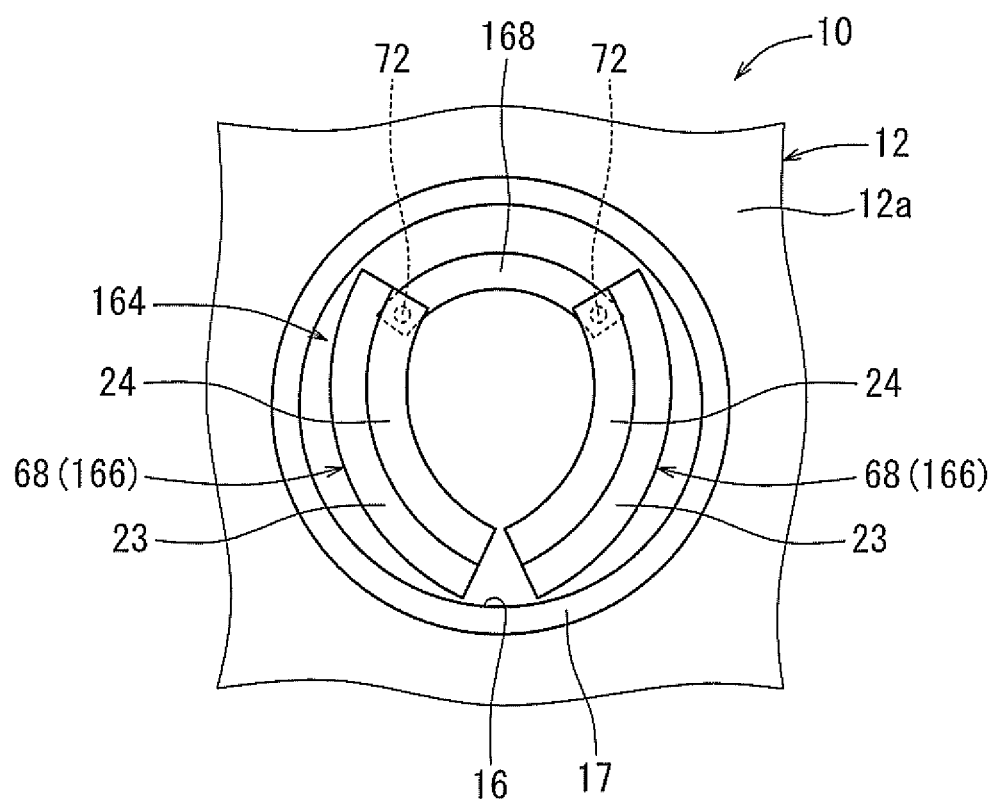
FIG. 63 is a plan view similar to FIG. 61 but showing the deformation inhibiting device in a folded state.

An assembling process for assembling the deformation inhibiting device 164 of this embodiment with the fuel tank 12 will now be described. First, the user may pivot the strut members 166 relative to the joint arms 168 such that the strut members 166 move toward each other to fold the deformation inhibiting device 164 as shown in FIG. 63, so that insertion of the deformation inhibiting device 164 into the opening 16 of the fuel tank 12 is enabled. In this state, the deformation inhibiting device 164 may be inserted into the opening 16 of the fuel tank 12. After that, the strut members 166 may be pivoted away from each other to develop the deformation inhibiting device 164 such that the engaging portions 24 of the strut members 166 contact the opening edge portion 17 or are positioned proximal to the opening edge portion 17.

Figure 64:
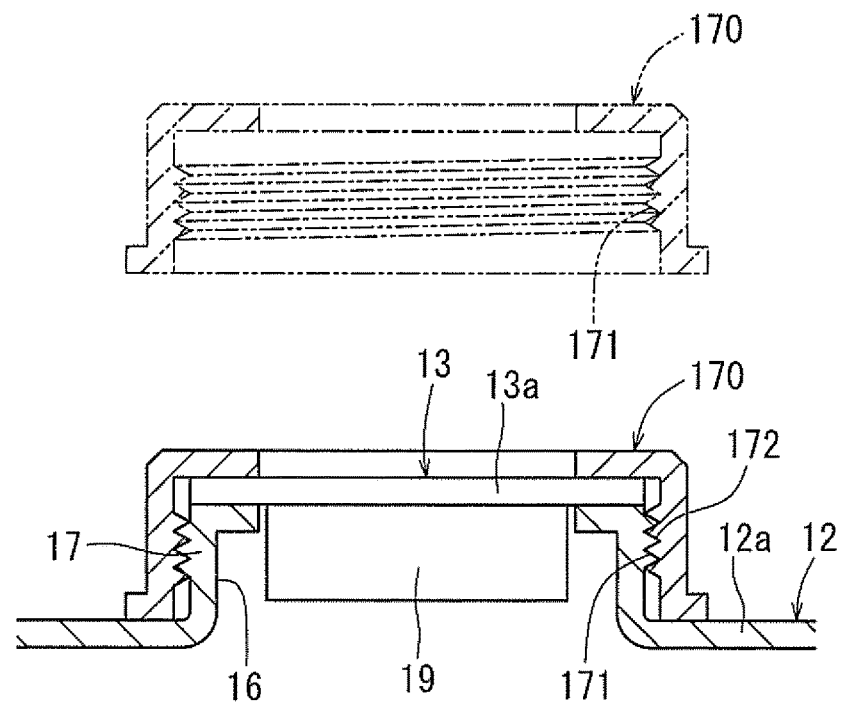
FIG. 64 is a cross-sectional side view illustrating a fixing structure for a cover member of a fuel tank according to a twenty-seventh embodiment.

A twenty-seventh embodiment will now be described with reference to FIG. 64. This embodiment relates to a fixing structure applied to the cover member 13 of the fuel tank 12 according to the first embodiment. However, this embodiment may be also applied to the fuel tank 12 of any of the embodiments described above. As shown in FIG. 64, the fixing structure of this embodiment may include an annular washer-faced nut 170 with a female thread 171 formed on the inner peripheral surface thereof. On the other hand, a male thread 172 may be formed on the outer peripheral surface of the opening edge portion 17. In the state where the opening 16 of the fuel tank 12 is closed by the cover member 13, the female thread 171 of the washer-faced nut 170 may be engaged with the male thread 172 of the opening edge portion 17, and the washer-faced nut 170 may be rotated in a tightening direction, so that the cover member 13 can be fixed in position relative to the opening edge portion 17. The cover member 13 can be removed by loosening and removing the washer-faced nut 170. The fixing structure of this embodiment is suitably applied in the case that the fuel tank 12 is made of resin. In an alternative embodiment, the washer-faced nut 170 may be replaced with a cap nut.

Figure 65:
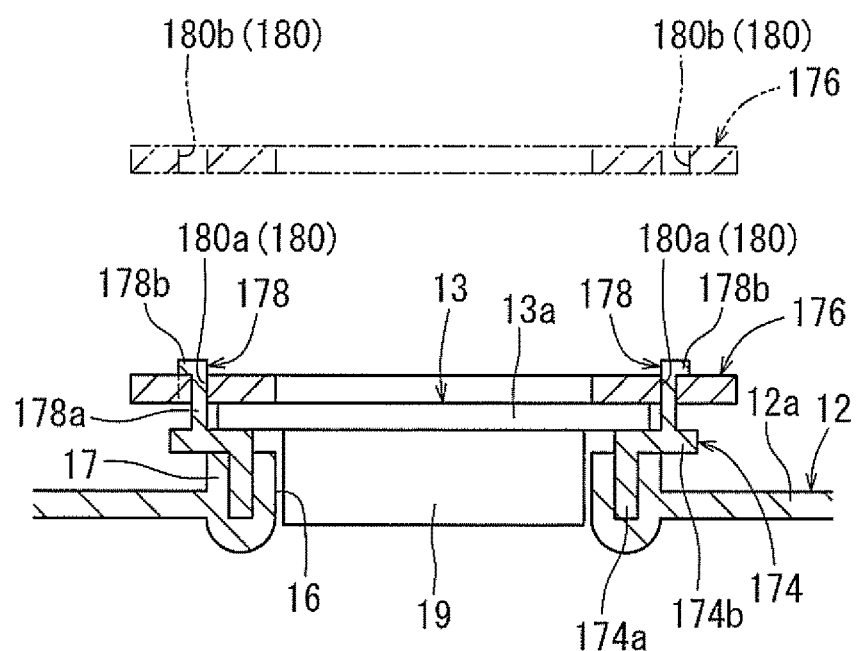
FIG. 65 is a cross-sectional side view illustrating a fixing structure for a cover member of a fuel tank according to a twenty-eighth embodiment.
Figure 66:
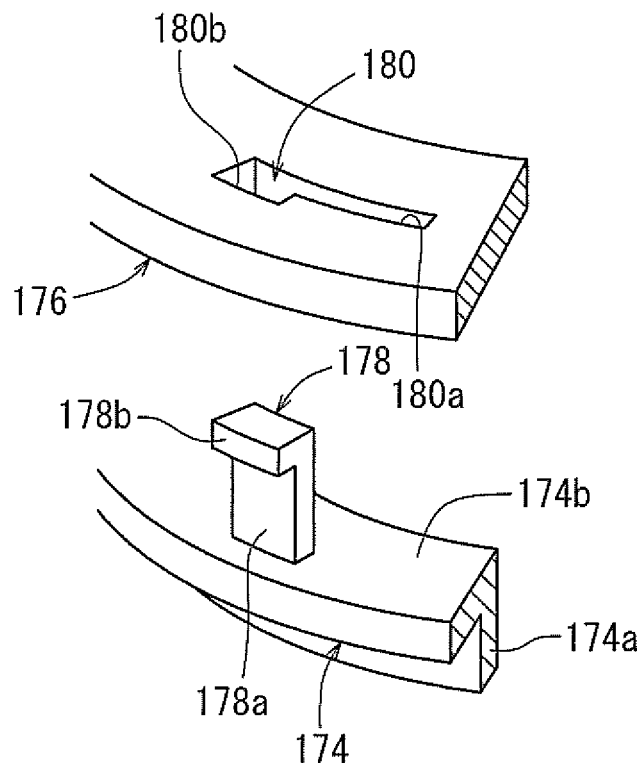
FIG. 66 is an exploded perspective view of a twist lock mechanism of the filing structure shown in FIG. 65

A twenty-eighth embodiment will now be described with reference to FIGS. 65 and 66. Also, this embodiment relates to a fixing structure applied to the cover member 13 of the fuel tank 12 according to the first embodiment. However, this embodiment may be applied to the fuel tank 12 of any of the embodiments described above. As shown in FIG. 65, the fixing structure of this embodiment may include an annular mouthpiece member 174 and a lock member 176 having an annular plate shape. The mouthpiece member 174 may have an inverted L-shape in a cross section and may include a cylindrical tubular portion 174a and an annular plate portion 174b protruding radially outward from the upper end of the cylindrical tubular portion 174a. The mouthpiece member 174 may be integrated with the opening edge portion 17 of the fuel tank 12. For example, the cylindrical tubular portion 174a may be embedded into the opening edge portion 17 by an insertion molding process in which the fuel tank 12 is molded while the mouthpiece member 174 is inserted into a part of a mold cavity for molding the opening edge portion 17. The annular plate portion 174b may be positioned on the outer peripheral portion of the opening edge portion 17. The cover member 13 may be placed such that the outer peripheral portion of the cover plate portion 13a is positioned on the inner peripheral portion of the opening edge portion 17.

A plurality of inverted L-shaped engaging portions 178 may be formed on the outer peripheral portion of the annular plate portion 174b and may be spaced equally from each other in the circumferential direction. In this embodiment, two engaging portions 178 are provided. As shown in FIG. 66, each of the engaging portions 178 may include an uprising portion 178a and an engaging projection 178b protruding radially outward from the upper end of the uprising portion 178a.

On the other hand, as shown in FIG. 65, a plurality of engaging holes 180 may be formed in the lock member 176. The number and the positions of the engaging holes 180 may correspond to those of the engaging portions 178. As shown in FIG. 66, each of the engaging holes 180 may include a narrow width portion 180a extending in the circumferential direction, and a broad width portion 180b disposed at one end (e.g., one end in the clockwise direction as viewed in a plan view) of the narrow width portion 180a. The broad width portion 180b may be configured to have a width increased in the radially outward direction from the width of the narrow width portion 180a. The engaging portions 178 and the engaging holes 180 may constitute a twist lock mechanism.

In order to fix the cover member 13 to the opening edge portion 17 of the fuel tank 12, the cover member 13 may be positioned to cover the opening 16 of the fuel tank 12. In this state, the lock member 176 may be laid over the cover plate portion 13a of the cover member 13 by engaging the broad width portions 180b of the engaging holes 180 of the lock member 176 with the engaging projections 178b of the engaging portions 178 of the mouthpiece member 174. After that, the user may rotate the lock member 176 in the clockwise direction as viewed in the plan view relative to the mouthpiece member 174, so that the narrow width portions 180a of the engaging holes 180 may engage the uprising portions 178a of the engaging portions 178. As a result, the cover member 13 may be fixed in position (clamped) between the lock member 176 and the mouthpiece member 174. The cover member 13 may be removed by rotating the lock member 176 in the counterclockwise direction to release the clamped state and removing the lock member 176 from the mouthpiece member 174. The number of the engaging portions 178, i.e., the number of the engaging holes 180 may not be limited to two but may be three or more. Further, the lock member 176 may not be limited to have an annular plate shape but may have a circular plate shape.

Figure 67:
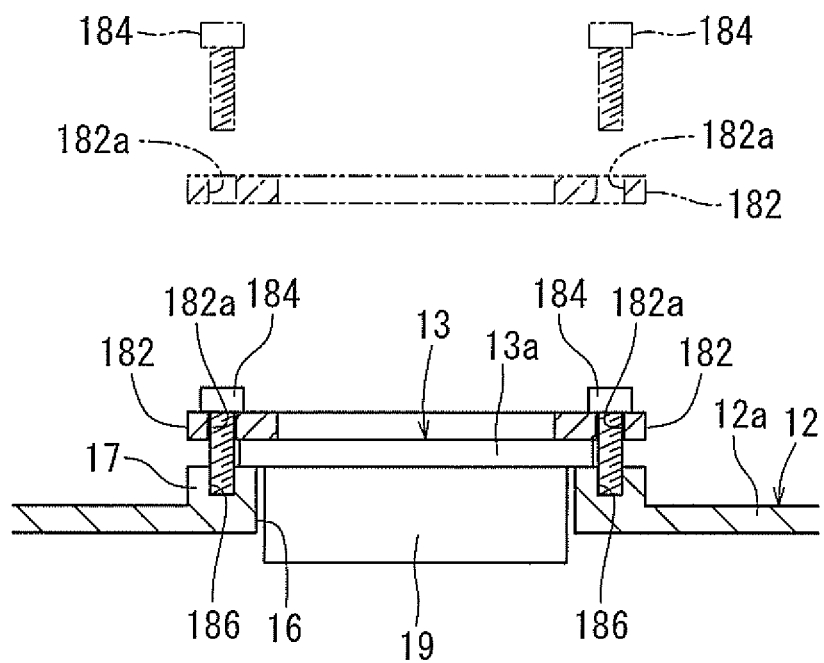
FIG. 67 is a cross-sectional side view illustrating a fixing structure for a cover member of a fuel tank according to a twenty-ninth embodiment.

A twenty-ninth embodiment will now be described with reference to FIG. 67. Also, this embodiment relates to a fixing structure applied to the cover member 13 of the fuel tank 12 according to the first embodiment. However, this embodiment may be applied to the fuel tank 12 of any of the embodiments described above. As shown in FIG. 67, the fixing structure of this embodiment may include a pressing plate 182 and a plurality of bolts 184. The pressing plate 182 may have an annular plate shape. Two bolts 184 are provided in this embodiment. In this connection, a plurality of threaded holes 186 corresponding to the plurality of bolts 184 are formed in the upper surface of the opening edge portion 17 of the fuel tank 12, and a plurality of bolt insertion holes 182*a* corresponding to the plurality of threaded holes 186 may be formed in the pressing plate 182.

In order to fix the cover member 13 to the opening edge portion 17 of the fuel tank 12, the cover member 13 may be positioned to cover the opening 16 of the fuel tank 12. In this state, the pressing plate 182 may be laid over the cover member 13. After that, the bolts 184 may be inserted into the bolt insertions holes 182*a* of the pressing plate 182 and subsequently engaged with and tightened into the threaded holes 186 of the opening edge portion 17. As a result, the cover member 13 may be fixed in position (clamped) between the pressing plate 182 and the opening edge portion 17. The cover member 13 may be removed by loosening the bolts 184 and removing the pressing plate 182. The fixing structure of this embodiment may be suitably applied in the case that the fuel tank 12 is made of metal. The number of the bolts 184, i.e., the number of the bolt insertion holes 182*a* or the number of the threaded holes 186 may not be limited to two but may be three or more. Further, the pressing plate 182 may not be limited to have an annular plate shape but may have a circular plate shape.

Figure 68:
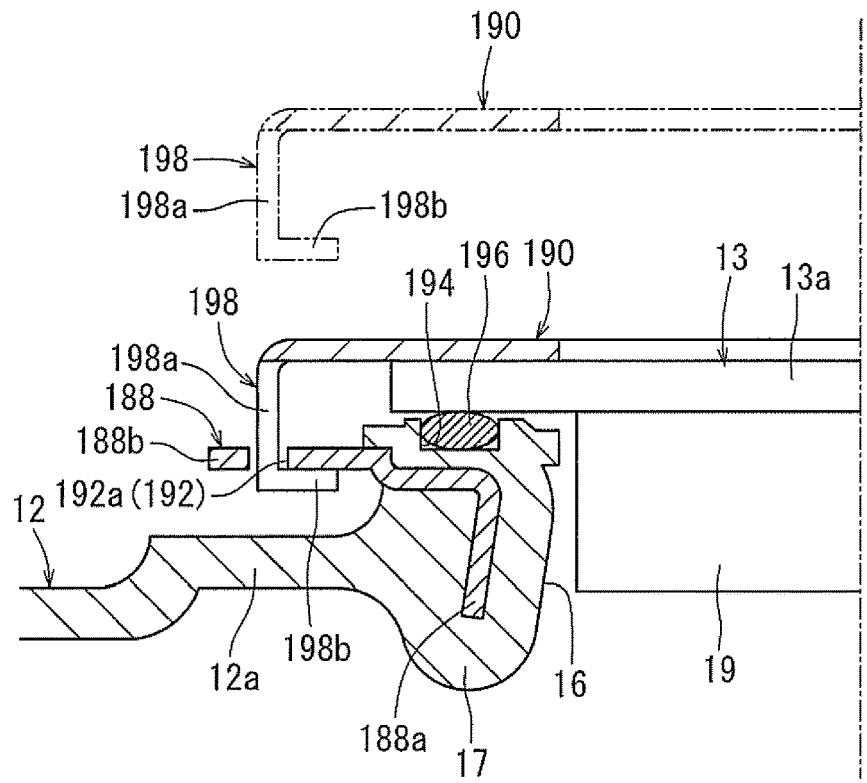
FIG. 68 is a cross-sectional side view illustrating a fixing structure for a cover member of a fuel tank according to a thirtieth embodiment.

A thirtieth embodiment will now be described with reference to FIGS. 68 and 69. Also, this embodiment relates to a fixing structure applied to the cover member 13 of the fuel tank 12 according to the first embodiment. However, this embodiment may be applied to the fuel tank 12 of any of the embodiments described above. As shown in FIG. 68, the fixing structure of this embodiment may include an annular mouthpiece member 188 and an annular lock member 190. The mouthpiece member 188 may have an inverted L-shape in a cross section and may include a cylindrical tubular portion 188*a* and an annular plate portion 188*b* protruding radially outward from the upper end of the cylindrical tubular portion 188*a*. The mouthpiece member 188 may be integrated with the opening edge portion 17 of the fuel tank 12. For example, the cylindrical tubular portion 188*a* and the inner peripheral portion of the annular plate portion 188*b* may be embedded into the opening edge portion 17 by an insertion molding process in which the fuel tank 12 is molded while the mouthpiece member 188 is inserted into a part of a mold cavity for molding the opening edge portion 17. A plurality of engaging holes 192 (only one hole 192 is shown in FIG. 68) may be formed in the outer peripheral portion of the annular plate portion 188*b* and may be uniformly circumferentially-spaced.

Figure 69:
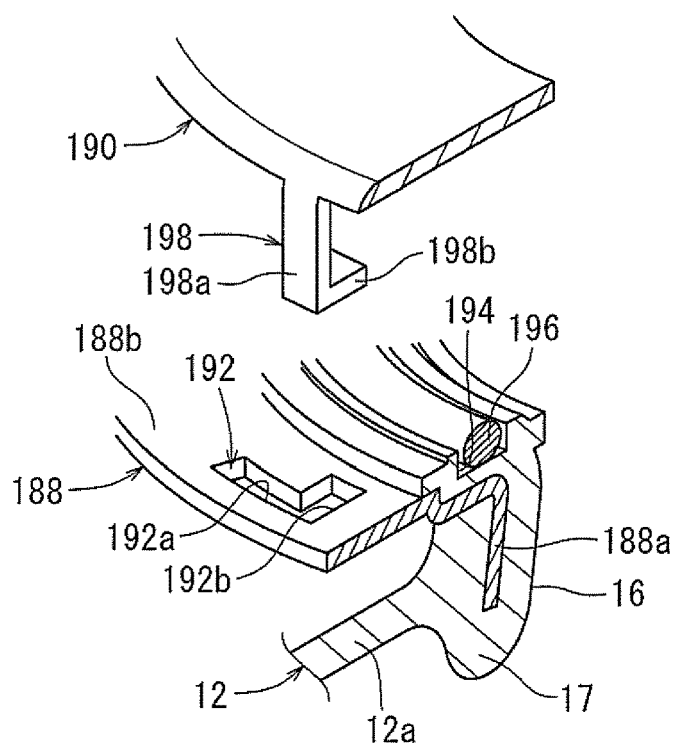
FIG. 69 is an exploded perspective view of a twist lock mechanism of the filing structure shown in FIG. 68.

As shown in FIG. 69, each of the engaging holes 192 may include a narrow width portion 192*a* extending in the circumferential direction, and a broad width portion 192*b* disposed at one end (e.g., one end in the counterclockwise direction as viewed in a plan view) of the narrow width portion 192*a*. The broad width portion 192*b* may be configured to have a width increased in the radially outward direction from the width of the narrow width portion 192*a*. An annular groove 194 may be formed in the upper surface of the opening edge portion 17. An O-ring 196 may be fitted into the annular groove 194 for sealing between the opening edge portion 17 and the cover plate portion 13*a* of the cover member 13 (see FIG. 68).

A plurality of inverted L-shaped engaging portions 198 corresponding to the number of the engaging holes 192 may be formed on the outer peripheral portion of the lock member 190. Each of the engaging portions 198 may include a downwardly extending portion 198*a* and an engaging projection 198*b* protruding radially inward from the downwardly extending portion 198*a*. The engaging portions holes 192 and the engaging portions 198 may constitute a twist lock mechanism.

In order to fix the cover member 13 to the opening edge portion 17 of the fuel tank 12, the cover member 13 may be positioned to cover the opening 16 of the fuel tank 12. In this state, the lock member 190 may be laid over the cover plate portion 13*a* of the cover member 13 by engaging the engaging projections 198*b* of the engaging portions 198 of the lock member 190 with the broad width portions 192*b* of the engaging holes 192 of the mouthpiece member 188. After that, the user may rotate the lock member 190 in the clockwise direction as viewed in the plan view relative to the mouthpiece member 188, so that the downwardly extending portions 198*a* of the engaging portions 198 may engage the narrow width portions 192*a* of the engaging holes 192. As a result, the cover member 13 may be fixed in position (clamped) between the lock member 190 and the opening edge portion 17. The cover member 13 may be removed by rotating the lock member 190 in the counterclockwise direction to release the clamped state and removing the lock member 190 from the mouthpiece member 188. The number of the engaging holes 192, i.e., the number of the engaging portions 198 may be two or more. Further, the lock member 190 may not be limited to have an annular plate shape but may have a circular plate shape.

The above embodiments may be modified in various ways. For example, the above teachings may be also applied to fuel tanks of various vehicles other than automobiles. Further, in each embodiment, the number of in-tank components of the fuel pump unit and/or the deformation inhibiting device arranged within the fuel tank may be increased or decreased, or alternatively, some of the in-tank components may be replaced with other components. The in-tank components may include a jet pump, various kinds of valves, a fuel pump controller (FPC), etc., other than the sender gauge. Further, the deformation inhibiting devices of the above embodiments may be also applied to a saddle-type fuel tank including a plurality of fuel storing sections, for example, by applying the deformation inhibiting device to one of the fuel storing sections. Further, the fuel tank 12 may be made of any other materials than those described in the above embodiments. Furthermore, the deformation inhibiting devices of the above embodiments may be modified in various ways. For example, in an alternative embodiment, the deformation inhibiting device in the above embodiments may include only one strut member. Furthermore, the fixing structures of the cover member 13 of the above embodiments may be modified in various ways. Furthermore, the fixing structures may be used for fixing any other attaching members than the cover member 13 to the fuel tank 12. The attaching members may have various shapes, such as a circular-plate shape, an annular plate shape, etc.

What is claimed is:

1. A fuel tank device comprising:
a fuel tank including a top wall portion, a bottom wall portion, and an opening formed in the top wall portion; and
a deformation inhibiting device configured to be disposed within the fuel tank, wherein the deformation inhibiting device comprises a plurality of strut members;
wherein each strut member includes a bottom support portion and a top support portion configured to support the bottom wall portion and the top wall portion, respectively, of the fuel tank when the strut member is positioned within the fuel tank;
wherein the deformation inhibiting device is configured to transition between a first state for arrangement within the fuel tank and a second state for insertion into the fuel tank via the opening;
wherein when the deformation inhibiting device is in the first state, the top support portions of the plurality of strut members extend to a first diameter that is larger than a diameter of the opening of the fuel tank; and
wherein when the deformation inhibiting device is in the second state, the top support portions of the plurality of strut members extend to a second diameter that is smaller than a diameter of the opening of the fuel tank.

2. The fuel tank device according to claim 1, further comprising:
a joint member configured to join the plurality of strut members to each other.

3. The fuel tank device according to claim 1, wherein for each strut member of the plurality of strut members:
the top support portion includes an engaging portion configured to contact an inner peripheral surface of the opening of the fuel tank.

4. The fuel tank device according to claim 1, wherein for each strut member of the plurality of strut members:
the top support portion includes a projection extending horizontally from the strut member; and
a guide portion is disposed between the projection and a part of an outer peripheral surface of the strut member on a lower side of the projection, wherein the guide portion connects the projection to the part of the outer peripheral surface.

5. The fuel tank device according to claim 1, wherein for each strut member of the plurality of strut members:
the strut member is configured such that an in-tank component for arrangement within the fuel tank is capable of being disposed at the strut member.

6. The fuel tank device according to claim 1, wherein the deformation inhibiting device further includes a longitudinal axis, and wherein the deformation inhibiting device is configured to deform a greater amount in a radial direction than in an axial direction with respect to the longitudinal axis.

7. A fuel tank device comprising:
a fuel tank having a top wall portion, a bottom wall portion, and an opening formed in the top wall portion;
a cover member configured to cover the opening of the fuel tank; and
a deformation inhibiting device including a longitudinal axis and configured to inhibit deformation of a fuel tank along the longitudinal axis when the deformation inhibiting device is disposed within the fuel tank, the deformation inhibiting device comprising:
a strut member including a bottom support portion and a top support portion configured to support the bottom wall portion and the top wall portion, respectively, of the fuel tank when the deformation inhibiting device is disposed within the fuel tank;
wherein the too support portion of the strut member is configured to shift radially inward toward the longitudinal axis for insertion of the deformation inhibiting device into the fuel tank via the opening; and
wherein the cover member includes a restricting portion configured to axially overlap with at least a portion of the strut member when the cover member is coupled to the opening to restrict a radially inward shift of the strut member.

8. The fuel tank device according to claim 7, further comprising:
a fixing device fixedly coupling the deformation inhibiting device to the bottom wall portion of the fuel tank; and
a connection device connecting the deformation inhibiting device and the cover member relative to each other so as to be movable in a vertical direction within a predetermined range.

9. The fuel tank device according to claim 7, further comprising:
a cup member configured to temporarily store a part of the fuel within the fuel tank;
wherein the cup member is configured to restrict the radially inward shift of the strut member with respect to the longitudinal axis.

10. The fuel tank device according to claim 7, wherein:
the deformation inhibiting device further comprises a second strut member;
the fuel tank device further comprises a fuel pump unit configured to feed fuel from within the fuel tank to an outside of the fuel tank; and
the fuel pump unit is disposed within a space surrounded by the strut member and the second strut member.

11. The fuel tank device according to claim 7, wherein the deformation inhibiting device further comprises:
a second strut member; and
a joint member configured to join the strut member and the second strut member.

12. The fuel tank device according to claim 7, wherein:
the top support portion of the strut member of the deformation inhibiting device is formed with an engaging portion configured to contact an inner peripheral surface of the opening of the fuel tank.

13. The fuel tank device according to claim 7, wherein:
the top support portion of the strut member of the deformation inhibiting device includes a projection extending horizontally outward from the strut member; and
a guide portion between the projection and a part of an outer peripheral surface of the strut member on a lower side of the projection, wherein the guide portion connects the projection to the part of the outer peripheral surface.

14. The fuel tank device according to claim 7, wherein:
the strut member of the deformation inhibiting device is configured such that an in-tank component for arrangement within the fuel tank is capable of being disposed at the strut member.

15. The fuel tank device according to claim 7, wherein the restricting portion of the cover member is radially spaced from the strut member when the cover member is coupled to the opening.

16. The fuel tank device according to claim 7, wherein the portion of the cover member is annularly shaped and extends along the longitudinal axis of the deformation inhibiting device when the cover member is coupled to the opening.

17. A deformation inhibiting device for inhibiting deformation of a fuel tank having a top wall portion, a bottom wall portion, and an opening formed in the top wall portion, the deformation inhibiting device comprising:
- a strut device configured to selectively transition between a first configuration and a second configuration, wherein:
- the strut device in the first configuration is configured to be inserted from an outer side of the fuel tank into the fuel tank via the opening;
- the first configuration is configured to transition to the second configuration after insertion of the strut device into the fuel tank;
- the strut device in the second configuration within the fuel tank is interposed between the top wall portion and the bottom wall portion of the fuel tank;
- the strut device comprises a plurality of strut members;
- the deformation inhibiting device further comprises a joint plate coupling the plurality of strut members to each other;
- each of the strut members includes a top support portion and a bottom support portion configured to face the top wall portion and the bottom wall portion, respectively, of the fuel tank in a vertical direction when the strut device is inserted into the fuel tank and has the second configuration;
- the plurality of strut members are joined to each other by the joint plate at the bottom support portions;
- the joint plate is configured to contact the bottom wall portion of the fuel tank and is sized to be capable of being inserted into the opening of the fuel tank;
- each of the plurality of strut members is configured to change the position of the top support member relative to the joint plate;
- the plurality of strut members are elastically deformable to move the top support portions toward and away from each other;
- in the first configuration, the plurality of strut members are deformed to move the top support portions toward each other; and
- in the second configuration, the plurality of strut members are released from the elastic deformation.

* * * * *